US010108693B2

(12) United States Patent
Edecker et al.

(10) Patent No.: US 10,108,693 B2
(45) Date of Patent: Oct. 23, 2018

(54) SYSTEM AND METHOD FOR INTERACTING WITH VIRTUAL MAPS

(71) Applicant: Xdyne, Inc., Earlville, IL (US)

(72) Inventors: Ada Mae Edecker, Earlville, IL (US); Alex Siyanko, Kiev (UA)

(73) Assignee: XDYNE, INC., Earlville, IL (US)

( * ) Notice: Subject to any disclaimer, the term of this patent is extended or adjusted under 35 U.S.C. 154(b) by 568 days.

(21) Appl. No.: 14/209,366

(22) Filed: Mar. 13, 2014

(65) Prior Publication Data
US 2014/0280180 A1    Sep. 18, 2014

Related U.S. Application Data

(60) Provisional application No. 61/783,689, filed on Mar. 14, 2013.

(51) Int. Cl.
*G06F 7/00* (2006.01)
*G06F 17/30* (2006.01)
*G06F 13/14* (2006.01)

(52) U.S. Cl.
CPC .. *G06F 17/30598* (2013.01); *G06F 17/30867* (2013.01)

(58) Field of Classification Search
CPC ......... G06F 17/30241; G06F 17/30395; G06F 17/30864; G06F 17/30; G06F 17/30061
USPC ........ 701/532, 437, 533, 469; 707/741, 743, 707/E17.009, 999.001, 999.003, 999.006, 707/802, 602, 687, 788, E17.014, 769
See application file for complete search history.

(56) References Cited

U.S. PATENT DOCUMENTS

| | | |
|---|---|---|
| 5,276,785 A | 1/1994 | Mackinlay et al. |
| 5,301,284 A | 4/1994 | Estes et al. |
| 5,362,239 A | 11/1994 | Pfuetze |
| 5,675,746 A | 10/1997 | Marshall |
| 5,675,748 A | 10/1997 | Ross |
| 5,767,855 A | 6/1998 | Bardon et al. |
| 5,808,614 A | 9/1998 | Nagahara et al. |
| 5,821,925 A | 10/1998 | Carey et al. |
| 5,826,266 A | 10/1998 | Honda |

(Continued)

OTHER PUBLICATIONS

Microsoft Flight Simulator 2000, Pilot's Handbook, 1983-1999.
(Continued)

*Primary Examiner* — Syling Yen
*Assistant Examiner* — Cecile Vo
(74) *Attorney, Agent, or Firm* — K&L Gates LLP

(57) ABSTRACT

The disclosed system provides a computerized map system with map elements represented by markers. The system arranges map elements by category and subcategory, with each type of marker corresponding to a category. The system may divide the geographic area based on neighborhood and city area. The system also provides the user with controls to search the objects, to display results in layers, to navigate the objects, and to quickly compare information about the objects using standardized positions for similar kinds of information. The system also enables users to memorize searches and browsing by pinning map objects that the user is interested in. In an embodiment, a number of tiers of advertising are also provided, such that business owners as clients can pay for advertising content and customizability appropriate for their businesses.

19 Claims, 33 Drawing Sheets

(56) References Cited

U.S. PATENT DOCUMENTS

| | | | |
|---|---|---|---|
| 5,835,094 | A | 11/1998 | Ermel et al. |
| 5,867,495 | A | 2/1999 | Eliott et al. |
| 5,880,733 | A | 3/1999 | Horvitz et al. |
| 5,884,029 | A | 3/1999 | Brush, II et al. |
| 5,889,951 | A | 3/1999 | Lombardi |
| 5,900,879 | A | 5/1999 | Berry et al. |
| 5,903,271 | A | 5/1999 | Bardon et al. |
| 5,908,465 | A | 6/1999 | Ito et al. |
| 5,911,045 | A | 6/1999 | Leyba et al. |
| 5,917,436 | A | 6/1999 | Endo et al. |
| 5,923,324 | A | 7/1999 | Berry et al. |
| 5,926,179 | A | 7/1999 | Matsuda et al. |
| 5,956,038 | A | 9/1999 | Rekimoto |
| 5,958,012 | A | 9/1999 | Battat et al. |
| 5,973,697 | A | 10/1999 | Berry et al. |
| 5,974,876 | A | 11/1999 | Hijkata et al. |
| 5,982,372 | A | 11/1999 | Brush, II et al. |
| 5,999,208 | A | 12/1999 | McNerney et al. |
| 5,999,944 | A | 12/1999 | Lipkin |
| 5,999,994 | A | 12/1999 | Wakeland et al. |
| 6,012,072 | A | 1/2000 | Lucas et al. |
| 6,014,145 | A | 1/2000 | Bardon et al. |
| 6,023,270 | A | 2/2000 | Brush, II et al. |
| 6,025,839 | A | 2/2000 | Schell et al. |
| 6,026,376 | A | 2/2000 | Kenney |
| 6,052,123 | A | 4/2000 | Lection et al. |
| 6,057,856 | A | 5/2000 | Miyashita et al. |
| 6,058,397 | A | 5/2000 | Barrus et al. |
| 6,064,389 | A | 5/2000 | Berry et al. |
| 6,081,270 | A | 6/2000 | Berry et al. |
| 6,081,271 | A | 6/2000 | Bardon et al. |
| 6,085,256 | A | 7/2000 | Kitano et al. |
| 6,088,032 | A | 7/2000 | Mackinlay |
| 6,094,196 | A | 7/2000 | Berry et al. |
| 6,119,147 | A | 9/2000 | Toomey et al. |
| 6,154,211 | A | 11/2000 | Kamachi |
| 6,167,433 | A | 12/2000 | Maples et al. |
| 6,219,045 | B1 | 4/2001 | Leahy et al. |
| 6,249,294 | B1 | 6/2001 | Lefebrve et al. |
| 6,271,854 | B1 | 6/2001 | Light |
| 6,271,843 | B1 | 8/2001 | Lection et al. |
| 6,289,380 | B1 | 9/2001 | Battat et al. |
| 6,348,927 | B1 | 2/2002 | Lipkin |
| 6,349,301 | B1 | 2/2002 | Mitchell et al. |
| 6,377,263 | B1 | 4/2002 | Falacara et al. |
| 6,381,583 | B1 | 4/2002 | Kenney |
| 6,381,613 | B1 | 4/2002 | Gallery et al. |
| 6,386,985 | B1 | 5/2002 | Rackham |
| 6,421,047 | B1 | 7/2002 | de Groot |
| 6,476,830 | B1 | 11/2002 | Farmer et al. |
| 6,496,207 | B1 | 12/2002 | Matsuda et al. |
| 6,798,407 | B1 | 9/2004 | Benman |
| 6,825,837 | B1 | 11/2004 | Sakagawa et al. |
| 6,854,012 | B1 | 2/2005 | Taylor |
| 6,857,021 | B1 | 2/2005 | Schuster et al. |
| 6,880,157 | B1 | 4/2005 | Havemose |
| 6,907,579 | B2 | 6/2005 | Chang |
| 6,909,708 | B1 | 6/2005 | Krishnaswamy et al. |
| 6,912,565 | B1 | 6/2005 | Powers |
| 7,069,271 | B1 | 6/2006 | Fadel et al. |
| 7,145,898 | B1 | 12/2006 | Eliott |
| 7,197,491 | B1 | 3/2007 | Chou et al. |
| 7,269,632 | B2 | 9/2007 | Edecker et al. |
| 7,477,243 | B2 | 1/2009 | Ogawa et al. |
| 7,570,261 | B1 | 8/2009 | Edecker et al. |
| 8,150,941 | B2 | 4/2012 | Edecker et al. |
| 8,539,085 | B2 | 9/2013 | Edecker et al. |
| 2002/0002491 | A1 | 6/2002 | Whitfield |
| 2002/0128952 | A1 | 9/2002 | Melkomian et al. |
| 2003/0207237 | A1 | 11/2003 | Glezerman |
| 2009/0089254 | A1* | 4/2009 | Von Kaenel ...... G06F 17/30241 |
| 2012/0303263 | A1* | 11/2012 | Alam ............... G01C 21/32 701/410 |
| 2013/0066880 | A1* | 3/2013 | Schramm ............ G01C 21/32 707/743 |

OTHER PUBLICATIONS

Groove Product Backgrounder (white paper, datasheet and groove brief) written by Groove Networks, Inc. published in 2001.
Non-Final Office Action dated Oct. 2, 2012 for U.S. Appl. No. 13/228,036.
Non-Final Office Action dated Oct. 4, 2012 for U.S. Appl. No. 13/228,107.
Non-Final Office Action dated Oct. 5, 2012 for U.S. Appl. No. 13/228,119.
Non-Final Office Action dated Dec. 2, 2004 for U.S. Appl. No. 09/874,022.
Non-Final Office Action dated Apr. 25, 2014 for U.S. Appl. No. 13/228,119.
Final Office Action dated Dec. 10, 2013 for U.S. Appl. No. 13/228,119.
Non-Final Office Action dated May 2, 2013 for U.S. Appl. No. 13/228,119.
Notice of Allowance dated May 21, 2013 for U.S. Appl. No. 13/228,107.
Final Office Action dated May 24, 2012 for U.S. Appl. No. 13/228,107.
Non-Final Office Action dated Dec. 27, 2011 for U.S. Appl. No. 13/228,107.
Notice of Allowance dated Dec. 14, 2011 for U.S. Appl. No. 13/228,093.
Notice of Allowance dated Oct. 22, 2012 for U.S. Appl. No. 13/228,065.
Non-Final Office Action dated Apr. 25, 2012 for U.S. Appl. No. 13/228,065.
Examiner-Inititated Interview Summary conducted Nov. 9, 2012 and Notice of Allowance dated Dec. 6, 2012 for U.S. Appl. No. 13/228,052.
Non-Final Office Action dated Jun. 6, 2012 for U.S. Appl. No. 13/228,052.
Notice of Allowance dated Oct. 15, 2013 for U.S. Appl. No. 13/228,036.
Non-Final Office Action dated Apr. 25, 2012 for U.S. Appl. No. 13/228,036.
Notice of Allowance dated Oct. 9, 2013 for U.S. Appl. No. 11/893,400.
Final Office Action dated Dec. 20, 2012 for U.S. Appl. No. 11/893,400.
Final Office Action dated Jun. 27, 2011 for U.S. Appl. No. 11/893,400.
Non-Final Office Action dated Sep. 13, 2010 for U.S. Appl. No. 11/893,400.
Notice of Allowance dated May 3, 2007 for U.S. Appl. No. 09/874,022.
Non-Final Office Action dated Dec. 4, 2006 for U.S. Appl. No. 09/874,022.
Final Office Action dated Jul. 19, 2005 for U.S. Appl. No. 09/874,022.
Non-Final Office Action dated Mar. 3, 2006 for U.S. Appl. No. 09/874,022.
Distributed Virtual Reality—An Overview written by www.ece.uwaterloo.ca/~broehl/distrib.html published Jun. 1995 (Printed Oct. 11, 2001).
Dive: A scalable network architecture for distributed virtual environments written by www.sics.se/emmanuel/publications/dsej/dsej.html published in Sep. 1998 (Printed Oct. 11, 2001).
The 3D Entertainment written by www.worlds.com/3dcd/3dcdtech.html published date unknown (printed Oct. 11, 2001).
The Architecture of a Distributed Virtual Worlds System written by Microsoft Corporation published in 2000.
Overview of Activeworlds written by www.activeworlds.com/overview.asp (Activeworlds Corp.) published in 1997-2001 (printed Oct. 11, 2001).
Virtual Worlds Platform 5—Product Specification written by blaxxum interactive published in 2001.
Maxis, "Sim City 4" Screenshot, Jan. 17, 2003.
Adobe Atmosphere (1.0 Browser User Guide) written by Adobe Systems Incorporated published in 2001.

* cited by examiner

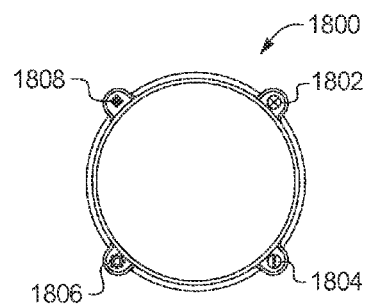
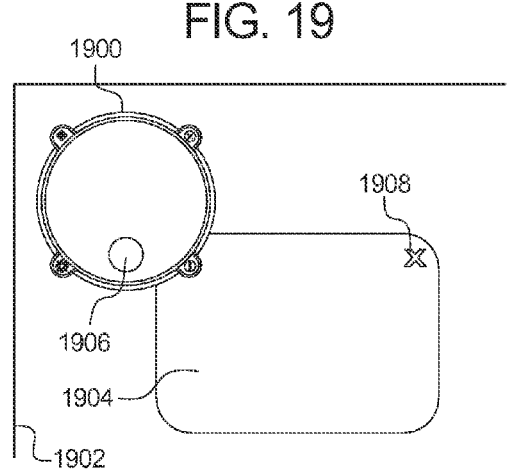
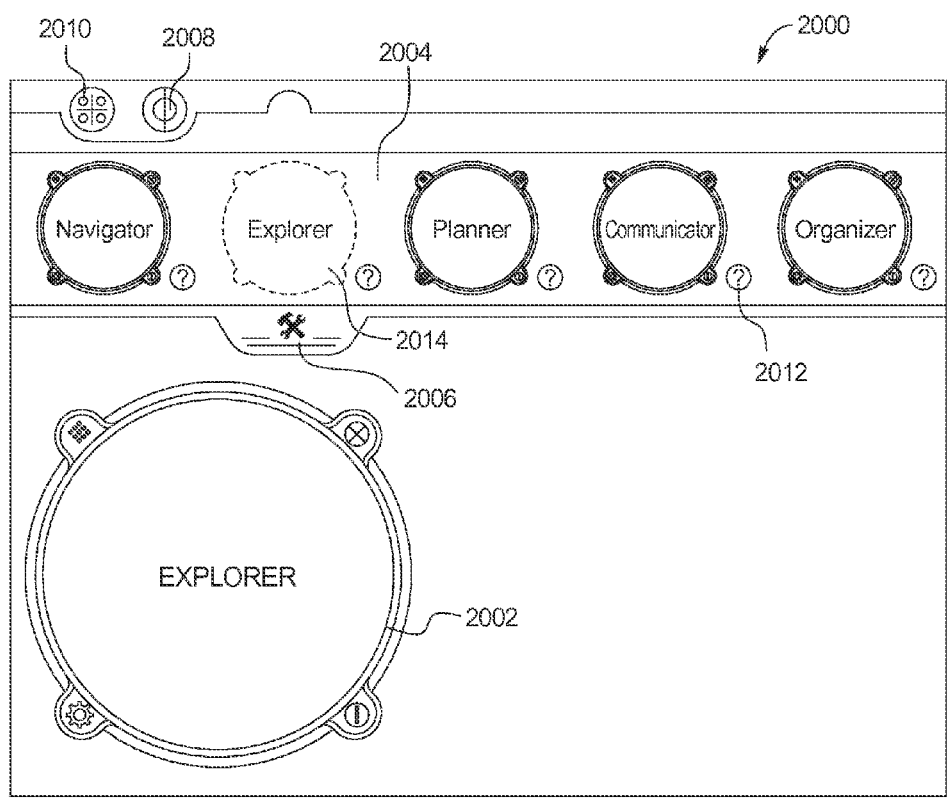

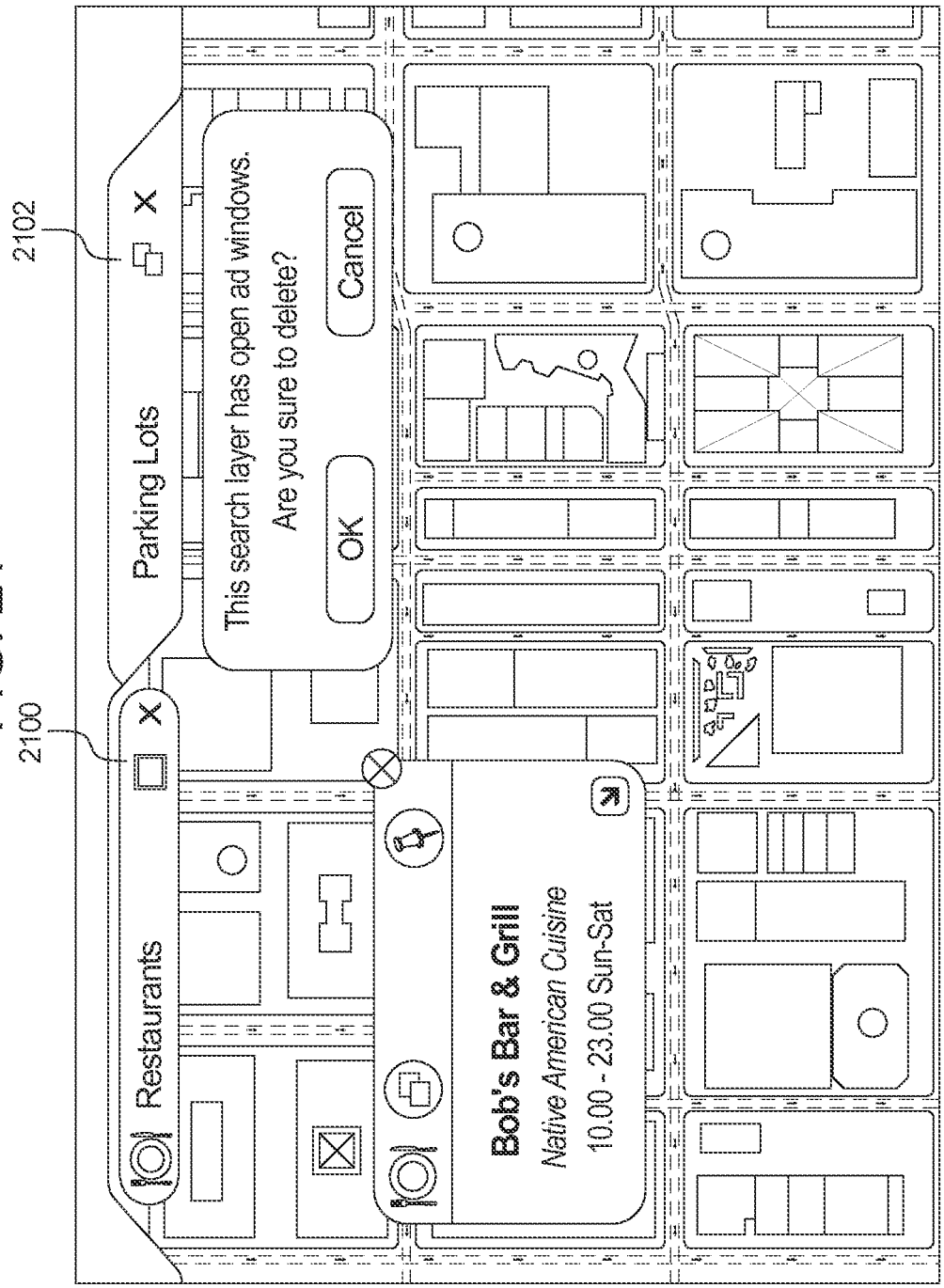

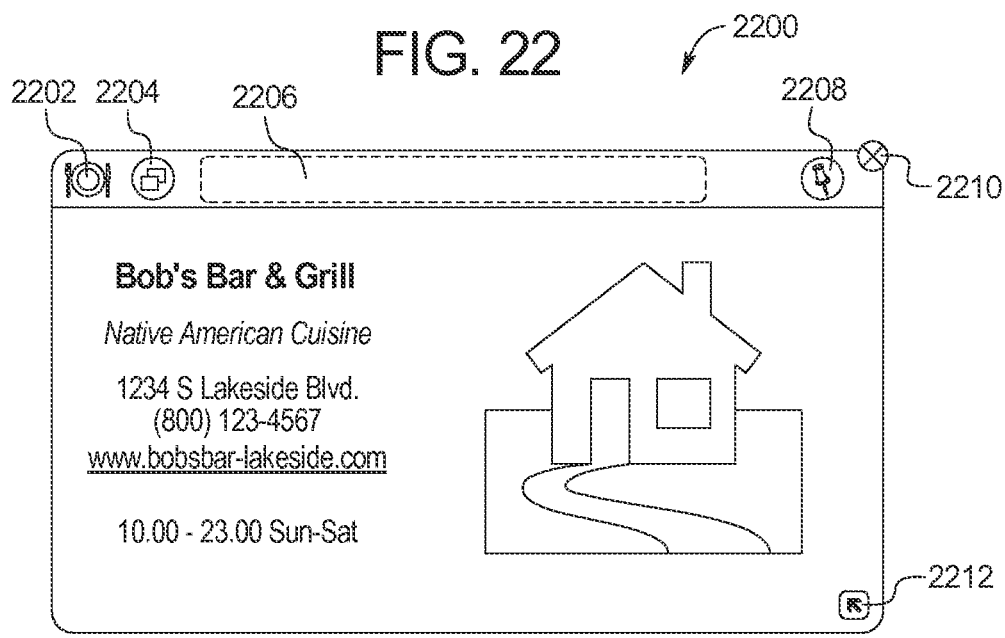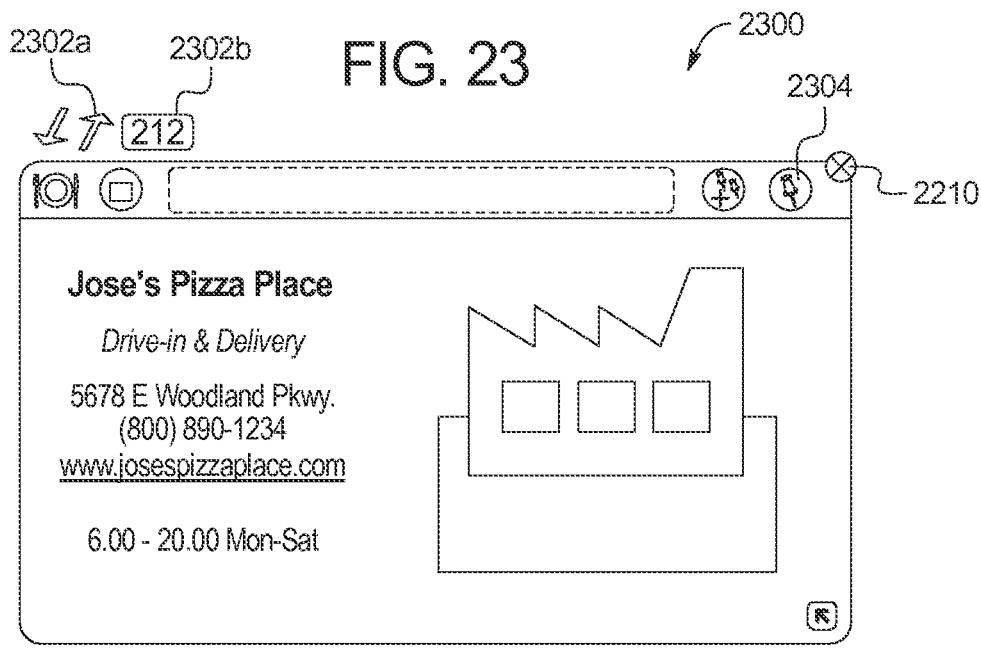

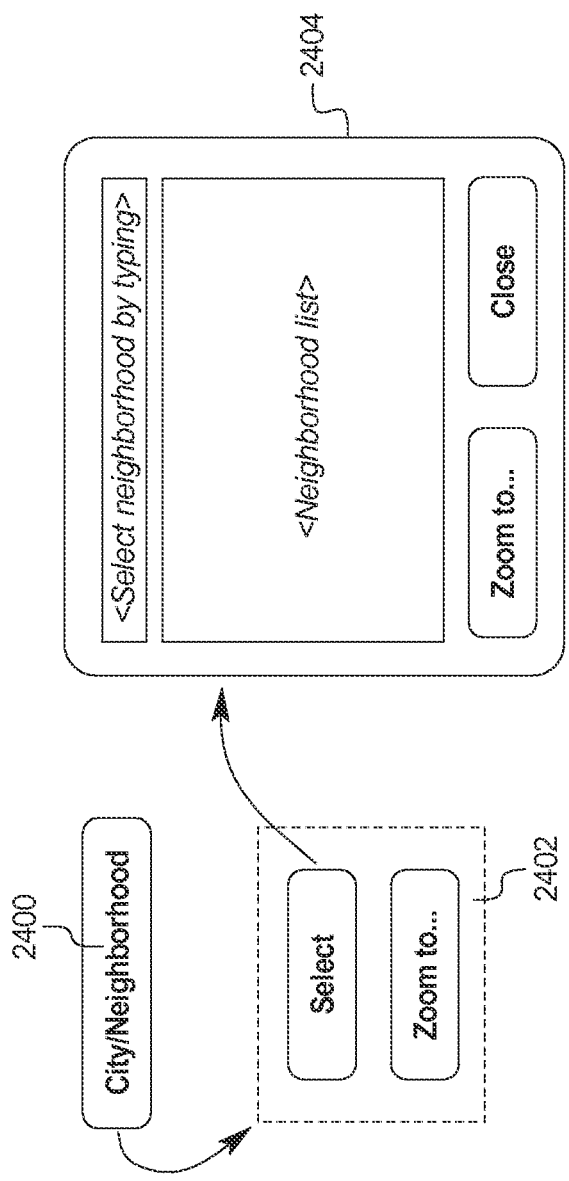

FIG. 38

SYSTEM AND METHOD FOR INTERACTING WITH VIRTUAL MAPS

PRIORITY CLAIM

This application is a non-provisional of, and claims priority to and the benefit of U.S. Provisional Patent Application No. 61/783,689, filed on Mar. 14, 2013, which is incorporated by reference herein in its entirety.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

TECHNICAL FIELD

The present disclosure relates in general to a system and method for displaying one or more controls to enable a user to easily navigate a graphical user environment. More specifically, the present disclosure relates to a system and method for displaying certain controls to a user of a computerized virtual map system, which controls enable the user to easily navigate the map and to cause the map to display pertinent information in an intuitive way.

BACKGROUND

Known map systems are available in which a user can navigate a map of an actual geographic region, such as a city, and can view certain information about the map and elements displayed on the map. For example, certain known map systems display information about what buildings are located at what intersections, and display information about other geographic features of an actual area corresponding to the computerized map. Known map systems are relatively unsophisticated and deficient in a number of ways, some of which are described below.

First, known map systems are deficient in that they do not provide intuitive, robust, and easy-to-use controls to enable a user to readily navigate and search the map. Many known map systems rely solely on text entry boxes, in which a user can enter a search phrase or word, and the display of simple indicators over the map, such as dots, for aspects of the map pertinent to the search.

In addition, while known maps rely on rudimentary map markers, these implementations have several drawbacks. For example, certain known systems implement map marker groups in which a pop-up box is displayed when user places a mouse cursor over a group marker. These systems may be hard to work with, since the pop-up box stays on the map only as long as mouse cursor is kept within the box. This is especially inconvenient when the pop-up box lists more elements than can be simultaneously displayed on the screen, and thus requires scrolling. Finally, known map marker grouping interfaces are not well scalable, since when the list of locations included in the group becomes large, the problems described above are magnified.

Known computerized map systems are also deficient because they do not provide a convenient way for users to compare advertisements and business-specific information among a plurality of map elements or markers. First, relevant markers are frequently obscured by opened pop-up windows. Second, the requirement of closing pop-up windows after studying them means the user may have difficulty remembering which markers have been clicked, and the content of each clicked marker. Third, markers may be located at a relatively large spatial distance from each other. In this situation, a user may be forced to alter the zoom level of the map to see all the desired map objects together at the same time, which can be a time-consuming and annoying process. Finally, if a system requires a user to close currently open informational window to open a different, subsequent window, the time that passes between the closing and the next opening causes the user to forget more information (or remember less information) about previously analyzed map objects.

Known map systems are also deficient in that they do not provide revenue generation opportunities to the map implementer. Specifically, known map systems do not provide clients with an opportunity to purchase advertisements from the provider of the map, and thus also do not enable the clients to purchase advertisements of varying sophistication. This also means that known map systems do not enable entities whose businesses are represented by map objects to provide customized advertisements to the map implementer for display to users of the map system.

Known computer-based systems, and especially current computer-based map display systems, do not provide adequate controls for enabling a user to navigate hierarchical information. Specifically, current graphical map systems do not include three-dimensional controls that display hierarchical information, organized by category and sub-category, such that a user can easily navigate the hierarchical information to display appropriate details of only desired aspects of the graphical interface. Thus, controls for navigation of hierarchical information displayable on a virtual map are needed.

In many known systems, electronic maps are constructed from a generic base and contain added information such as transportation routes and markings, major landmarks and terrain elements. In many instances, paper maps include a legend and inserts to maximize the information.

It is an advantage of the present disclosure to describe a computerized map system that remedies the deficiencies with known systems mentioned above and to provide a comprehensive, rich experience to users navigating computerized maps and to business entities wishing to advertise goods and services on computerized maps.

SUMMARY

Various embodiments of the disclosed system display interactive virtual maps to users and provide tools to enable users to interact in a user friendly, meaningful way with the map. For example, various embodiments of the disclosed system enable users to interact with a map whose map elements are marked with map markers that easily indicate the category of the element, such as by being color coded to a set of categories. Various embodiments of the disclosed system also provide tools to enable users to search map elements by category, sub-category, or by name and address. In further embodiments, fuzzy logic enables searches to be performed that return a larger universe of results, but that reflect a user's uncertainty about precisely the results that are desired.

The disclosed system also enables clients of the map system, such as entities responsible for operating real-world entities with virtual presences in the map, to purchase advertising space on the map depending on the needs of that entity. For example, some advertising options provide relatively minimal opportunity for customization through multimedia, while other options are highly customizable and enable an advertiser to rely on images, sound, and other features to advertise its business. In various embodiments, advertisements of different types are reflected by different icons being used as map markers, enabling a user to readily distinguish between various kinds of advertising content attached to the mapped businesses (regardless of the category of those businesses).

The disclosed system also enables a user interacting with a virtual computerized map to readily compare information (such as advertising information) about a number of different map elements. In one such embodiment, the disclosed system enables a user to cycle quickly through information, displayed in a similarly structured window, so that the user can easily compare information about a plurality of different map elements.

The disclosed system enables a user to create a custom map for use as that user sees fit. As an example, if a user is interested in taking a trip to a large city, the disclosed system provides certain pinning functionality that enables the user to plan out his or her whole trip and view the information about that trip on a single map. If the user selects a hotel, the user can pin the hotel for easily viewing and research. Thereafter, the disclosed system enables the user to search for restaurants and other entertainment near the hotel, and to pin the points of interest for potential further investigation or visiting. Moreover, by creating such a customized map, the disclosed system enables the user to save and share those maps. If, for example, the user is part of a travel group, the user can easily share a customized map of the travel group's destination, with points of interest pinned for easy access, with the other members of the group.

In various embodiments, the maps disclosed herein are two-dimensional, three-dimensional, or hybrid two- and three-dimensional maps. For example, in one embodiment, the maps disclosed herein display three-dimensional renderings approximating the shapes of certain elements, such as buildings, and two dimensional representations of other elements, such as roads and highways. In various embodiments, digital map system disclosed herein further advantageously enables information to be layered on top of the map, thus enabling increased facts and details to be displayed on the map.

One embodiment disclosed herein includes a nested control having a dimensional circular shape approximating a watch or a compass. In this embodiment, the control includes a plurality of nested portions that can slide out from the body of the control like a series of nesting, sliding panels. In this embodiment, selecting a category from the nested version of the control causes a first level of the control to expand, such as by extending upward. In this embodiment, the expanded first level displays a plurality of sub-categories associated with the selected category. In a further embodiment, upon selection of one of the plurality of sub-categories, the control is displayed as further expanding by a second level of the control extending further upward. In this embodiment, the second level displays a plurality of other options, such that selection of one of the further options causes the display of pertinent information in a graphical user interface, such as a map interface, associated with the control.

In one embodiment, the disclosed system can be characterized as a tightly integrated, interactive mapping system with interconnected tools, overlays, and gadgets. In this embodiment, the disclosed system combines a map, factual information, color, texture, animation and instinctive (natural, intuitive, spontaneous) design, displays and functions that engage and immerse the user. In these embodiments, the disclosed system enables users not only to view a destination but to explore elements in the vicinity of the destination. As a result, the disclosed system provides a convenient, enticing venue for advertising and community interaction.

In one embodiment, the disclosed system can be conceptualized as constituting a map and a unique set of virtual tools that can interact with each other and the map. In this embodiment, the map component of the disclosed system is a customized rendition of actual geography and structures. In one embodiment, the disclosed system presents a map that contains standard map markings (roads, railroads, waterways, terrain, etc.), information, enticing colors, depth, textures, animations and sounds. In this embodiment, the system provides the map to enable a new kind of search, in which a user can explore rather than searching the map for a particular element. In an embodiment, the disclosed system displays a frame that holds a tool drawer with tools and a city and neighborhood title overlay display box, such that the user can tell at a glance what neighborhood he or she is interacting with.

In one embodiment, the disclosed system includes a plurality of tools. Some of these tools are described briefly herein, and are described in more detail below. In one embodiment, the disclosed system displays tools as lifelike, stand-alone devices and enables the user to provide inputs to the system to freely move the tools over and around the map surface. In an embodiment, the provided tools each share a standard set of commands (open, close, help, and move), bubbles or markers, pop-up boxes but each have their own distinct purpose. In one embodiment, a navigator tool enables the user to provide inputs to move around the map, in detail or overview and mark and save inquires. In one embodiment, an explorer tool enables the user to provide inputs to choose and pick categories by name, phrases or area, in detail or in overview. In a further embodiment, the explorer tool enables the user to explore ad windows, such as sign posts, billboards, storefronts, and associated photos, animation, videos, sound effects, and music to create atmosphere to encourage "sell & buy." In a further embodiment, the explorer tool enables the user to compare and browse ads, and to view directories listing advertisers or other occupants of a building. In various embodiments, the disclosed system provides a planner tool to aid in the planning of a trip, an organizer tool to organize information gathered while using the map, a communicator tool to email, print, and share maps, layers, and other sets of data, and a magnifier tool to magnify or reduce the scope of an explored portion of a map.

In an embodiment, the disclosed system provides for layers or overlays, which can be conceptualized as processes that overlay the map like virtual sheets and can be switched on, combined or altered, or shut off.

In an embodiment, the disclosed system also provides a newsstand tool or gadget. In this embodiment, the newsstand includes links to newspapers, magazines, neighborhood flyers, tours, games and a store for postcards and souvenirs. In a further embodiment, the newsstand includes an interface to enable a user to access historical tours, and to view advertising information associated with a particular area of the map.

In various embodiments, the disclosed virtual map system advantageously combines realistic and detailed cartographic representation of a cityscape or other geographic area, comprehensive map data and user models, and an extensible set of user-friendly cartographic tools, which cumulatively provide a plurality of new ways to work or interact with maps, as well as use maps as a user-to-user and user-to-advertiser interactive communication vehicle. In these embodiments, user tools are tightly integrated with the underlying base map object model and provide rich model-driven set of map interaction methods. In various embodiments, the interactions enabled by the disclosed system include, but are not limited to:

(1) intelligent data-driven map navigation methods;

(2) methods for category-, locality- and relevancy-based map object search, screening and visualization;

(3) map exploration methods utilizing city anchor buildings, building-by-building business directories, various business or other associative relationships between map objects, as well as map-based visualizations of city and local news feeds, event venues, and virtual thematic tours;

(4) methods for efficient visual analysis and comparison of search results;

(5) methods for creating thematic or situational user maps and trip/route planning; and (6) map-based inter user communication methods.

As will be described in detail below, the result of the disclosed interactions in one embodiment is the creation of a database to present a customized map to users for interaction and sharing. In this embodiment, the system disclosed herein stores a map object, such as a two-dimensional or three-dimensional representation of a city, that is both accurate geographically and aesthetically pleasing. In this embodiment, the system also displays information about a plurality of geographic elements represented by the map object. For example, the disclosed system may information representing which of a plurality of categories and sub-categories certain map elements fall into, thus creating a robust database categorizing the plurality of map elements.

In an embodiment, by using the categorical database of information, the map enables users to search within or among different categories, narrowing their searches not only by map element name (as is conventional) but also but category and sub-category of map elements. In one embodiment, the disclosed system stores a user's search results in a plurality of layers, with each layer representing search results in a particular category or sub-category. In this embodiment, the system enables users (either the searching user or future users) to explore search results by layer, activating or de-activating layers depending on the categories of information the user wishes to view. In a further embodiment, search results in active layers are easily visible and are interactive, while search results in a non-active layer are grayed out or otherwise downplayed, and are not interactive.

In various embodiments, the system also enables easy comparison of search results by enabling users to click or otherwise select map elements of a particular layer to view advertising information about that element. In one such embodiment, the system enables the user to select a plurality of map elements (such as all map elements of a particular, active layer) and compare the advertising information of each element by flipping through the advertising information like a deck of note cards. In this embodiment, the system advantageously displays similar information (e.g., hours of operation, business name, etc.) in a similar location on each "card," such that the user can quickly recognize each successive card. In one embodiment, in which the system enables advertisers to purchase ads of differing detail and size, the system nonetheless presents compared results in a standardized, easy-to-understand way.

In one embodiment, the disclosed system includes a maps toolset made up of the following tools, the details of which are described in more detail below as appropriate:

(1) Navigator Tool—enables a user to move around the map, locate specific city buildings, streets, street intersections, businesses, institutions and organizations by their addresses or names, as well as map city neighborhood boundaries and navigate to neighborhood areas.

(2) Explorer Tool—enables a user to search and display multiple business locations on the city map according to user search criteria. Businesses can be searched by category and/or keywords. Advanced search options allow filtering of search results by various attributes, pertinent to specific category.

(3) Magnifier/Observer Tool—at high altitudes (magnifier mode) the tool helps to explore portions of the city map at detailed zoom levels by placing the tool at specific location over the map. At low altitudes (observer mode) the tool displays a mini-map of an area, surrounding visible map portion.

(4) Planner Tool—provides features for discovering optimal routes, measuring distances and accomplishing trip planning tasks according to user preferences.

(5) Communicator Tool—gives the user the ability to print, e-mail, save and publish map graphical images on web sites and social networks, as well as enables live communication using shared map view with other users of the disclosed system.

(6) Organizer Tool—enables the user to save customized maps for subsequent use and systematically organize them according to user needs. Stored map data encompasses selected search layers and search options, pinned map locations, trip plans and routes, user notes and other relevant information.

(7) Informer/News Stand Tool—provides links to local media and enables the user to search and browse through city news, events, local promotions and advertisements, as well as get access to city and neighborhood guides and useful information.

(8) Analyst Tool—enables the disclosed system to display and visually analyze various map statistical data based on geographical constraints (e.g., by neighborhood). Examples include, but are not limited to, data about population, crime level, average household income, etc.

Further advantages of the instant disclosure will be apparent from the following detailed description and associated figures.

BRIEF DESCRIPTION OF THE FIGURES

FIG. 9 is a schematic representation of the extracted neighborhood mode tool with the show city areas control turned on.

FIG. 18 is a schematic illustration of a general tool design according to one embodiment of the disclosed system.

FIG. 19 is an example of a generic tool positioned in the upper left portion of a screen and having an additional panel extended therefrom.

FIG. 20 is a schematic diagram of an alternative embodiment of a tool drawer as described herein.

FIG. 21 is a schematic illustration of a map as disclosed herein including a plurality of layers, one of which is illustrated as active, and including an ad window in the active layer.

FIG. 22 is an example illustration of a normal operation mode of an ad browser window as disclosed herein.

FIG. 23 is an example illustration of a compare operation mode of an ad browser window as disclosed herein.

FIG. 24 is a schematic representation of an alternative embodiment of a City/Neighborhood mode control block.

FIG. 38 is a schematic illustration of an embodiment of the disclosed system being used to search within a Parking Facilities subcategory.

DETAILED DESCRIPTION

Figure 1:
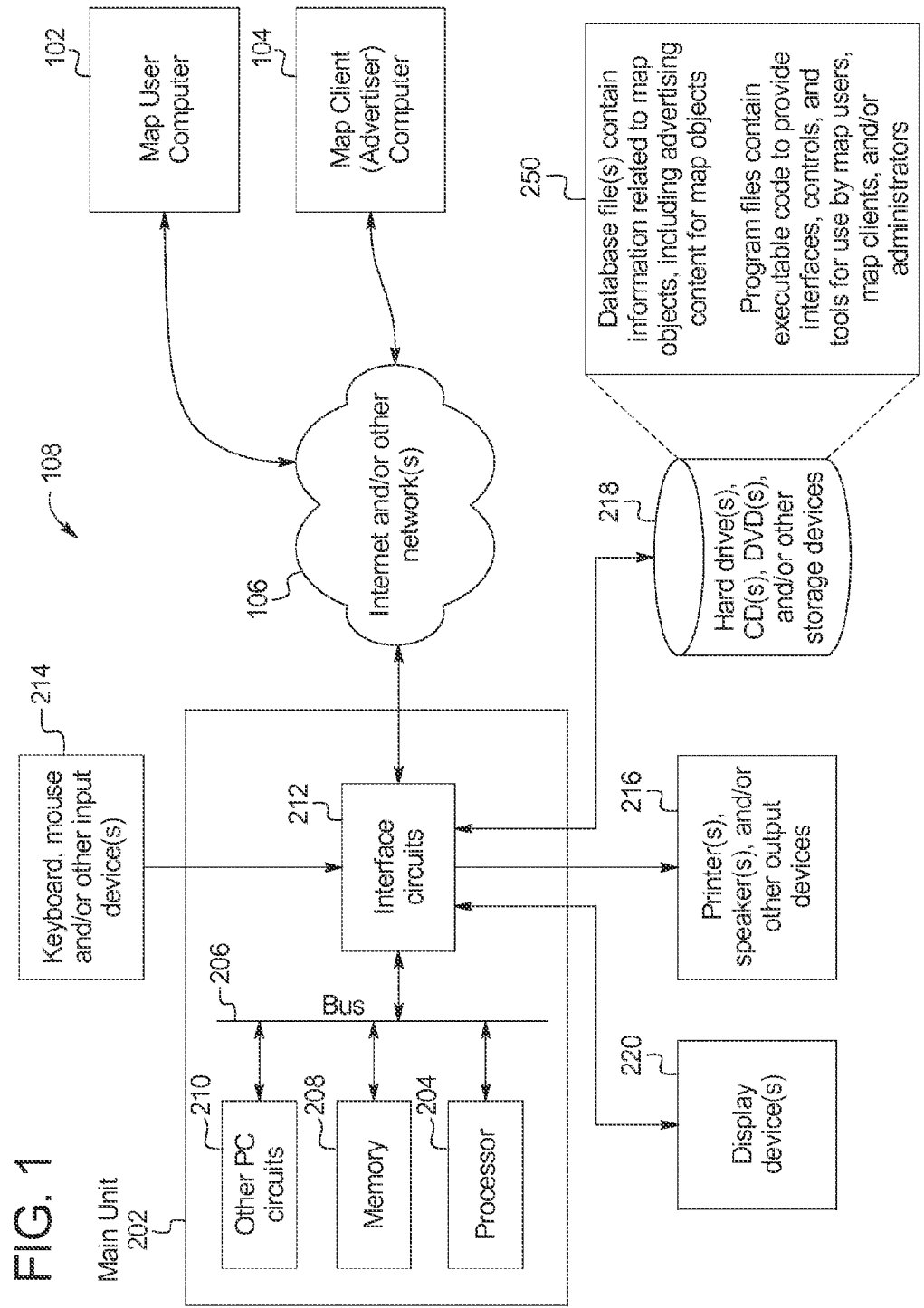
FIG. 1 is a block diagram illustrating an example of the electrical systems of a host device usable to implement the computerized map display system disclosed herein.

The computerized map system disclosed herein provides a robust map interface that enables users to utilize various navigational and search tools to quickly and easily locate particular information from the universe of information originally contained in the map and subsequently add to the map by advertisers and users. The disclosed system also enables clients or advertisers to specify information to be provided to users upon user search and navigation in a customizable way according to specifics of the advertiser's business. To accomplish this, the disclosed system provides for a set of tiered advertisements, with each tier providing different space for presentation of information, different options for multimedia presentation of information, and different mechanisms for indicating a business' presence on a map prior to the user even selecting the business while browsing the map. Finally, the disclosed system displays a new kind of control for browsing and searching hierarchical information that takes the form of a plurality of nesting geometrically solid objects, with each nested level representing a different category or subcategory of information. In various embodiments, the disclosed system displays a two-dimensional map, a three-dimensional map, or a hybrid map in which certain elements are illustrated in two dimensions and certain elements are represented in three dimensions.

In various embodiments, the system disclosed herein is characterized in that it provides a new kind of map that, among other benefits, encourages users to explore even if they are not looking for anything in particular. That is, in various embodiments, the disclosed system enables a user to experience the topography of the map, picking and choosing map elements to further explore along the way.

As an example of this enhanced capability, the disclosed system enables a user to interact with a map in neighborhood mode. In these embodiments, the geographic area described by a particular view of the map may encompass neighborhoods, districts, wards, communities, boroughs, and/or zip codes, as appropriate to the design of the map. In this mode, the user can explore map elements of any type within a particular neighborhood of interest, rather than requiring the user to specifically search for a particularly desired map element. The disclosed system in one embodiment further provides an "exploration map" by displaying local situational animations on the map that are linked to local businesses or events. In this embodiment, the user can explore the businesses or events associated with the animations without specifically needing to search for the businesses or events. Another example of a way in which the disclosed system encourages users to explore the map is through the provision of tours, such as commercial sales & events tours or historical tours.

The map provided by the system disclosed herein also advantageously enables a user to interact with various layers akin to pieces of cellophane stacked on top of the map. In one such embodiment, the disclosed system includes a plurality of tabs, wherein each tab constitutes a layer over the map. In this embodiment, then, the user can control whether certain layers are displayed, the content of certain layers, and can even share layers with other users to view the results of another user's exploration of the disclosed map.

FIG. 1 is a block diagram illustrating an example of the electrical systems of a host device (e.g., host device 108) usable to implement the computerized map system disclosed herein. In one embodiment, the host device 108 illustrated in FIG. 1 corresponds to computerized map system host device to enable users and clients (i.e. advertisers) of the map system to access and interact with one or more computerized maps. In this embodiment, the users and clients of the map system interact with the host device 108 using user device 102 and/or client device 104.

In the example architecture illustrated in FIG. 1, the host device 108 includes a main unit 202 which preferably includes one or more processors 204 electrically coupled by an address/data bus 206 to one or more memory devices 208, other computer circuitry 210, and/or one or more interface circuits 212. The one or more processors 204 may be any suitable processor, such as a microprocessor from the INTEL PENTIUM® family of microprocessors. PENTIUM® is a trademark registered to Intel Corporation and refers to commercially available microprocessors.

In one embodiment, host device 108 includes memory 208. Memory 208 preferably includes volatile memory and non-volatile memory. Preferably, the memory 208 stores one or more software programs that interact with the hardware of the host device 108 and with the other devices in the system as described below. In addition or alternatively, the programs stored in memory 208 may interact with one or more user computers 102 or client computers 104 to provide those devices with a user interface into the computerized map system implemented by host device 108. The programs stored in memory 208 may be executed by the processor 204 in any suitable manner.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system. In one embodiment, wherein the host device 108 is designed to be operated or interacted with only via remote devices, the host device 108 does not include input devices 214.

One or more displays 220, printers, speakers, and/or other output devices 216 may also be connected to the main unit 202 via the interface circuit 212. The display 220 may be a cathode ray tube (CRT), liquid crystal display (LCD), or any other type of display. The display 220 generates visual representations of data during operation of the host device 108. For example, the display 220 may be used to display a representation of a map displayable by the host, and to enable a user at the host 108 to interact with the map in a debugging or maintenance role.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the host device 108. In one example described in more detail below, the storage device 218 stores database information 250 including web site data, tool data, and advertising data needed to provide a robust computerized map with the functionality described elsewhere herein. Further, the storage device 218 may also include database 250 that includes data needed to facilitate the online computerized map disclosed herein, such as web site information, purchasing software including software to enable a user to complete an application or provide an indication of an acceptance of an offer and the like.

In one embodiment, this connection of devices (i.e., the host device 108, the user computer 102, and the client (advertiser) computer 104 is facilitated by a network connection over the Internet and/or other networks, illustrated in FIG. 1 by cloud 106. The network connection may be any suitable network connection, such as an Ethernet connection, a digital subscriber line (DSL), a WiFi connection, a cellular data network connection, a telephone line-based connection, a connection over coaxial cable, or another suitable network connection.

Access to host device 108, user computer 102, and client (advertiser) computer 104 may be controlled by appropriate security software or security measures. An individual user's access can be defined by the host device 108 and limited to certain data and/or actions. Accordingly, users of the system may be required to register with the host device 108 before accessing the computerized map system, and clients may be required to provide payment for advertising opportunities with host device 108, prior to enabling those various entities to interact with the host device as described herein.

In a preferred embodiment, each of the user computer 102 and the client (advertiser) computer 104 has a similar structural or architectural makeup to that described above with respect to the host device 108. That is, each remote device in on embodiment includes a display device, at least one input device, at least one memory device, at least one storage device, at least one processor, and at least one network interface device. It should be appreciated that by including such components, which are common to well-known desktop, laptop, or mobile computer systems (including smart phones, tablet computers, and the like), user computer 102 and client (advertiser) computer 104 facilitate interaction among and between each other by users of the respective systems.

In various embodiments, devices 102, 104, and/or 108 as illustrated in FIG. 1 may in fact be implemented as a plurality of different devices. For example, the host device 108 may in actuality be implemented as a plurality of server devices operating together to implement the computerized map system described herein. In various embodiments, one or more additional devices, not shown in FIG. 1, interacts with the host device 108 to display a map to a user. For example, in one embodiment the host device 108 communicates via network 106 with one or more public repositories of information, such as city address record databases, to present a more robust map experience.

Map System Navigation and Search Tools

The disclosed system advantageously provides a user with the ability to interact with computerized virtual maps. The disclosed system also advantageously provides a plurality of user interface tools and operational modes for the computerized map, facilitating easy and efficient browsing and searching of a virtual map. The following discussion details a number of the pertinent user interface tools, graphical design, and operational modes provided by various embodiments of the system disclosed herein.

In various embodiments, while interacting with the computerized map disclosed herein, users can apply a number of different tools to modify the current map view or perform other useful actions. In many applications and on web sites, user tools are represented and accessed via menu items or buttons located at various tool bars. To make the user interface more intuitive and appealing to users, the computerized map disclosed herein takes an "everyday life experience" approach to the user interface design, where tools look more like physical objects and have some feel to them. For example, depending on their function, tools may take on the form of a gadget, a remote control device or other relevant physical items.

In one embodiment, the disclosed computerized map graphical interface does not have any dedicated tool bars located over or aside the map. Instead, in this embodiment, all tools for the computerized map are displayed over the map surface and can be moved around the map's surface per user's discretion.

In one embodiment, the disclosed computerized map interface also provides the possibility to take tools away from the map, if not needed, and to place them back on the map when the user needs them again. In this embodiment, placing tools directly over the map instead of arranging menus and/or tool bars around it provides an unobstructed view and increases the size of the map window. At the same time, since the user can place tools as desired on the map surface, move them around, or take them away entirely, there is no need to pan and/or zoom the map in or out in order to see map portions obscured by tools. In one embodiment, this provides a substantial benefit since changing the current map view causes modification of the structure and number of visible object markers displayed over the map (such as searched business locations, etc.). Moving tools rather than the map itself is more natural and provides better usability.

In one embodiment, since tools are displayed over the computerized map, the disclosed system displays the tools in a semi-transparent way so that the features and contours of the map itself are visible through or under the tools.

In one embodiment, one or more tool sets feature one or more functions, which together enables a user to complete a specific task or a group of similar tasks. In one embodiment, the tool sets look like known toolkits, except that the body of the tool set (e.g., an area around the tools themselves) is only displayed when a user places the mouse cursor within the area of the toolkit. In this way, the body of the toolkit in one embodiment appears to fade in and out as the user moves the mouse cursor within or outside the toolkit body.

In one embodiment, the toolkit is displayed with its body having a semi-transparent appearance, such that map features under the toolkit are visible through the body. In one embodiment, this aspect of the toolkit causes the toolkit to look visually less heavy and less obstructive to the map as a whole.

In one embodiment, the arrangement of tools within the toolkit is fixed, although the toolkit itself can be freely moved around the screen. In another embodiment, a user can remove one or more tools from the toolkit. In this embodiment, the tools that are eligible for removal are called "extractable" tools. In one embodiment, when an extractable tool is removed from the toolkit, the disclosed system displays the extracted tool with a changed size and/or layout. In a further embodiment, an extractable tool that has been extracted from the toolkit becomes a larger gadget or unabridged tool, detached from the toolkit. Such gadgets can be freely moved around the screen in the same manner as a toolkit. In one embodiment, when a tool is taken out of its toolkit, the disclosed system displays a placeholder (e.g., in the form of an outline of the removed tool) inside the kit until the tool is placed back into the kit.

In one embodiment, while it is inside the toolkit, a tool is displayed in compact form and usually provides some basic functionality such as by providing accessed to a set of most used functions. In this embodiment, when a tool is taken out of the kit, the disclosed system provides the user with a richer or more robust interface including one or more extended user controls.

In various embodiments, one or more tools are designed as non-extractable. In these embodiments, the non-extractable tools include a plurality of features readily available in a compact form, so there is no need to take them out of the toolkit order to use them. In these embodiments, other tools may not provide any functionality when they sit inside a toolkit. Such tools can only be used when they have been extracted. By their function, they resemble an ordinary button. Upon a mouse click, such tools turn into gadgets (unabridged tools), as has been described above. Finally, in various embodiments, some tools that are non-extractable in their initial state can turn into extractable tools under certain conditions. In these embodiments, converting non-extractable tools to extractable tools can be achieved by providing an input to select a tool button or switch, or similar user actions, which changes the operational mode of the tool. In these embodiments, such tools are called "conditionally" extractable tools.

In various embodiments, each extractable tool, which can also operate in a compact form, includes a special "handle", "jack" or "grip" design element of the graphical user interface. In one such embodiment, each "handle," "jack," or "grip" element looks the same for each of the tools. In these embodiments, the disclosed system is configured to display this element over or beside the tool when the user provides inputs to position the mouse cursor over that tool. Further, in these embodiments, clicking over the handle extracts the tool from the toolkit and activates it as has been described above.

In one embodiment, only one tool from the same toolkit can be used at a time. This means that activation of another tool, such as by providing an input to take the tool out of the toolkit, causes automatic replacement of the currently activated tool to be put back in its toolkit. This arrangement advantageously prevents unwanted clutter and makes working with tools more simple and clear.

The disclosed computerized map system in various embodiments offers a series of tools used to interact with the map in various ways depending on the particular tool features. As a result, it should be appreciated that displaying these various tools all over the map at the same time has the potential to confuse users with too much information, and also reduces the visible map area by covering it with clutter. As a result, one embodiment of the disclosed computerized map includes a drawer control, which a user can open and place the tools that he or she doesn't currently need.

Figure 2:
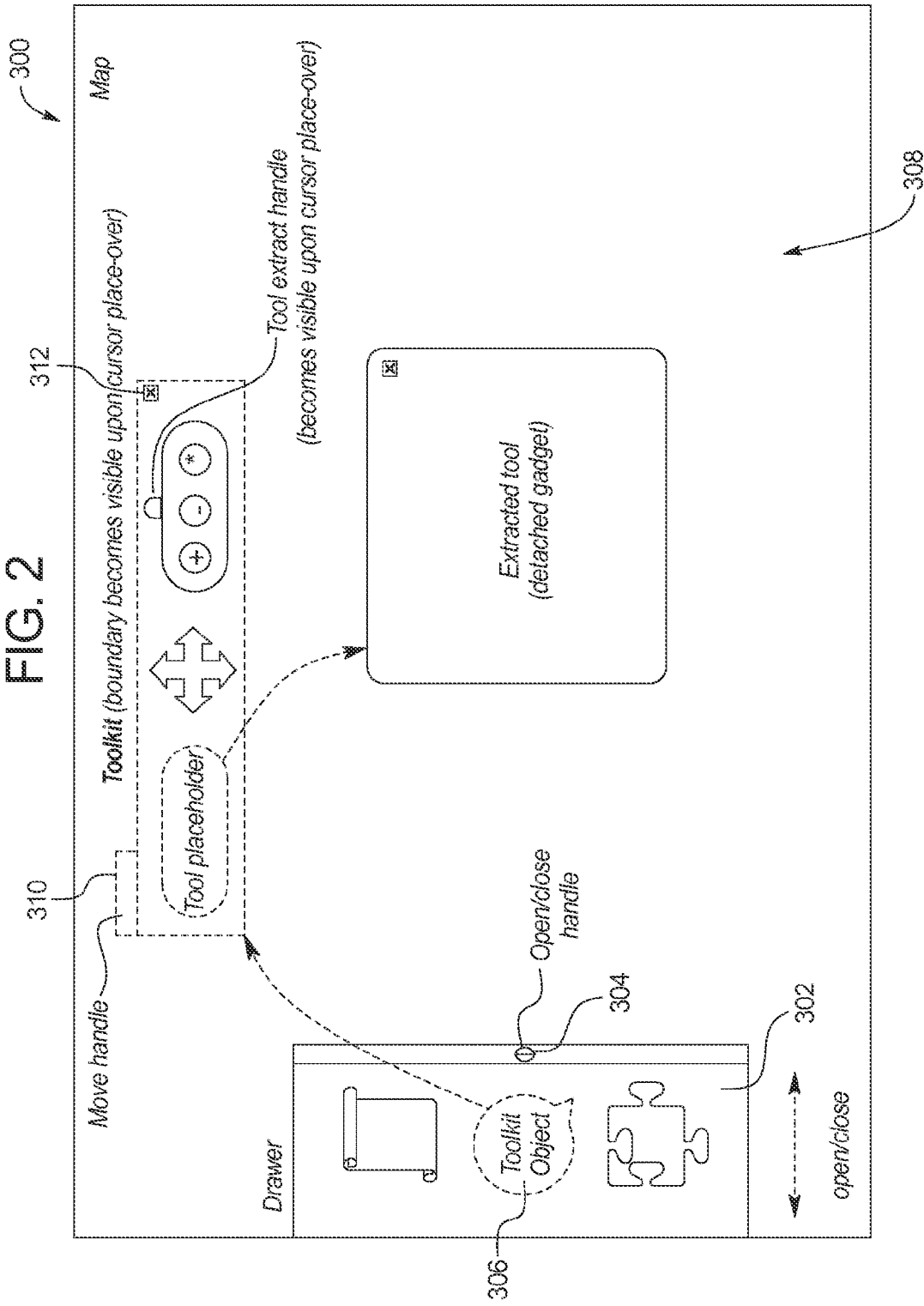
FIG. 2 is a schematic illustration of one embodiment of the interface disclosed herein, including a plurality of tools and the drawer.
Figure 3:
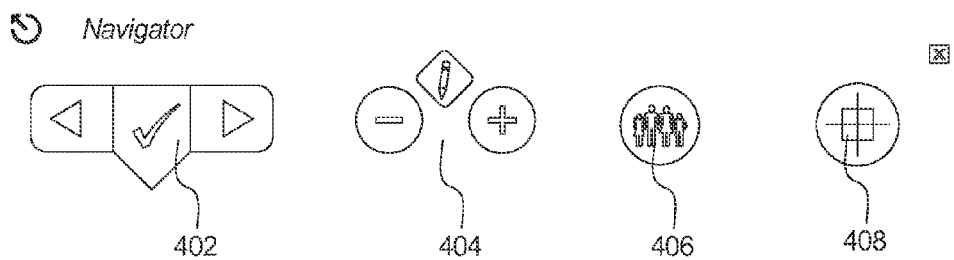
FIG. 3 is a schematic representation of one embodiment of the map navigation tool described herein.

FIG. 2 is a schematic illustration 300 of one embodiment of the interface disclosed herein, including a plurality of tools, toolkits, and the drawer. FIG. 3 is exemplary, and does not limit the disclosure to any specific locations, shapes or layout of interface elements.

At a first point in time, the drawer 302 is illustrated as closed. At the subsequent point in time illustrated in FIG. 2, the drawer 302 is displayed as having been opened by pulling it to the right. Drawer 302 includes handle 304 that a user can pull to open by providing an appropriate set of inputs to the disclosed computer system. In one embodiment, the user can provide inputs to open and close the drawer 302 to acquire or replace a toolkit.

In one embodiment, the drawer is closed automatically whenever the user starts to use a map tool and/or interact with the map. In various embodiments, the location and appearance of the drawer on the screen are prominently displayed so users can clearly see and intuitively understand the drawer's 302 purpose and function.

When a toolkit is placed into the drawer, as is illustrated by toolkit 306 in FIG. 2, it takes a minimized form by being displayed in a relatively small, but still visually recognizable Toolkit Object. In one embodiment, each toolkit has a designated compartment inside the drawer so the user can visually find it at the same location each time the drawer is opened. Toolkit compartments may be labeled, since having a toolkit represented just by physical artifact may not be enough for the user to understand the designation of the toolkit.

In one embodiment, providing inputs to the computerized system to remove a toolkit from the drawer 302 and/or replace it in the drawer 302 provides an effect of physical action of moving a toolkit to/from its original location. This can be achieved by displaying items according to the process described below.

In one embodiment, when a user places the mouse cursor over a Toolkit Object, such as object 306, inside the drawer 302, the object size, position and/or color changes slightly to indicate that the toolkit is ready to be taken out of the drawer. In a further embodiment, when a user provides an input to click on the object, the disclosed computerized system displays the object as being attached to the cursor, while the cursor itself becomes invisible. In other words, in this embodiment, the selected object acts as the mouse cursor after it has been selected by the user. At this point, the user can move the selected toolkit object anywhere within the user interface of the map area 308 and place the object by clicking again when the desired location is reached.

In various embodiments, as soon as the picked Toolkit Object is displayed outside the drawer 302, the disclosed system displays it as an expanded or unabridged toolkit. This change in display occurs in one embodiment when the user clicks at some point on the map area 308, at which moment the toolkit is displayed as being detached from the cursor and placed in the map area 308 in expanded or unabridged form.

In one embodiment, when the toolkit is placed in the map area 308 and outside the drawer, the system displays the default cursor at a location corresponding to a toolkit move handle 310 for the placed toolkit 306. In this embodiment, the disclosed system enables the user to click the tool kit move handle 310 to move the toolkit around the map or to place it back into the drawer in the same manner described above. In the event a user wishes to place the toolkit back in the drawer, the system displays the toolkit object 306 in its unexpanded or abridged form when the moved toolkit crosses the drawer 302 boundary. Clicking within the drawer 302 places the toolkit object 306 back into the drawer 302 and detaches it from mouse cursor.

In one embodiment, the move handle 310 is positioned at the top-left corner of an expanded or unabridged toolkit, and has a width equal to the width of toolkit object 306. In this embodiment, the disclosed system can be implemented in a tablet environment, where the system ensures that the toolkit object and the toolkit itself will always appear under the user's finger after crossing the drawer boundary.

In one embodiment, the disclosed system displays a close button 312 in association with a toolkit. In this embodiment, the disclosed system provides the user with the ability to quickly replace a toolkit back into the drawer 302 by clicking on the close button 312.

In one embodiment, each time a toolkit is placed over or moved around the map area 308, its on-screen position is saved by the disclosed system. In this embodiment, if a user closes the toolkit or moves it back to the drawer, he/she can take it out later and automatically place it at the last saved position instead of manually moving the toolkit around the map area. In this embodiment, replacing the toolkit in the last displayed area is achieved by double-clicking over a toolkit object inside the drawer. Following this double-click, the disclosed system displays the expanded toolkit in its last location in the map area 308. In the event the toolkit has been taken out of the drawer 302 for the first time by a double-click (or is taken out for the first time during a session of use of the system), the disclosed system displays the toolkit in a predefined default location. Runtime calculation of a toolkit's coordinates may be required to ensure that toolkits don't overlap and the placed toolkit is visible inside the map area.

As will be discussed in more detail below, toolkits may include one or more extractable tools. In one embodiment, if a toolkit is placed into the drawer while it has one of its extractable tools activated, the disclosed system automatically pulls the activated extractable tool back into the toolkit prior to closing the toolkit.

In one embodiment, all tools can be stored inside the drawer. However, in a further embodiment, not all available tools are initially displayed as being within the drawer. In this embodiment, when a user first enters the site, certain (most commonly used) tools are automatically taken out of the drawer and placed over the map at their default (predefined) locations. Then, the system enables users to move tools around the screen (including into the drawer) as desired.

In various embodiments, the system disclosed herein provides at least two different types of persistence related to the state of tools. In an embodiment, a first type of persistence manifests itself during one user session. In particular, in this embodiment, tools retain their screen coordinates during successive extract/hide actions. In a further embodiment, extractable tools retain their screen coordinates during successive tool extract/place actions. Finally, in this embodiment, if a tool has an internal state (which comprises the states of switches or buttons, values of text fields, etc.), that state may fully or partially (depending on the tool operational logic) persist across successive tool extract/hide actions.

In an embodiment, a second type of persistence manifests itself across user sessions, as opposed to during a single session. This second type of persistence in this embodiment is identical to the first type of "within the session" persistence outlined above, with the exception that it applies across sessions. In one embodiment, the second type of persistence includes the additional rule that tools should retain their open/close state across user/application sessions. In this embodiment, the next time a user enters the site or runs a mobile application, he or she will see the map interface in exactly the same state as the previous access to the system.

In an embodiment where users have the option to register prior to using the disclosed system, but does not, the second type of across-session persistence is supported only under certain conditions. For example, the above persistence conditions work only if an unregistered user accesses the disclosed system a second time using the same next time a user enters the site uses the same computer and the same web browser, and provided that cookies are enabled for the browser's previous session and have not been deleted or expired.

In an embodiment where a user has the option to register or log in prior to accessing the disclosed system, and does register or log in, the disclosed system can implement the "across sessions" persistence described above since the data to implement the persistence can be stored in association with the logged-in user, regardless of a specific computer and/or web browser they use. In this embodiment, all persistent data related to tools should be securely downloaded from the web site server and applied accordingly upon the user login.

In one embodiment, the initial state of the application disclosed herein is defined by initial states of all tools and the drawer. More specifically, in this embodiment, the state of the drawer at any point in time is defined by its current content, that is, specific tools, which currently sit in the drawer. In addition, the initial state tracked by the disclosed system is defined by the predefined set of tools that will be displayed in the drawer upon first application start up. In one embodiment, the more commonly-used tools are taken out of the drawer and made available to a user. As a result of the default inclusion of common tools in the drawer, a first time user will be able to see the drawer in action and become aware of its existence. In particular, when the application starts with clean map, the system displays the drawer as automatically opening and further moves certain commonly-used tools out of and moved to their default locations on the map screen. In one embodiment, the disclosed system defines the initial states of specific tools by a set of predefined values stored in the disclosed system. In an embodiment, these predetermined or initial values can be updated depending upon a user's interaction with the system, and are some of the persistent properties described above. As an example, a particular tool may have a persistent property called "XY" that indicates the coordinates of the tool on the screen. In this embodiment, the persistent property has a default value that is used the first time the tool is taken out of the drawer. In this embodiment, as the user moves the tool around the screen, the coordinates stored as the "XY" value are updated to match the position on the screen, such that in a subsequent session, the tool is displayed in a new default position when it is taken out of the drawer.

In one embodiment, the disclosed system relies on "within the session" persistence and also the rule that tools should retain their open/close state across user/application sessions. In this embodiment, this kind of persistence is supported by the Organizer Tool, which allows saving current map view and tools configuration under named records within user profile. Saved records can be further restored in subsequent user sessions. In an embodiment, for unregistered (anonymous) users the "across sessions" persistence may be supported only under certain conditions. For example, the above stipulations may work only if next time, when a user enters the site, he/she uses the same computer and the same web browser, provided that site cookies for that particular browser are allowed and have not been deleted by the user or expired. For registered users the "across sessions" persistence should always work once they log into their personal account regardless of specific computer and/or web browser they use.

In one embodiment, the initial state of the application is defined, at least in part, by initial states of all tools and the drawer. More specifically, in this embodiment, the state of the drawer at any point in time is defined by its current content including the specific tools that currently sit in the drawer. Similarly, the initial state of the drawer is defined by the predefined set of tools that the system takes out of the drawer and makes available to the user by default (e.g., the most commonly used tools). In this embodiment, the rest of the tools remain in the drawer upon first application start up. Therefore, since the set of commonly used tools is not empty, the first time user will be able to see the drawer in action and become aware of its existence. In particular, when the application starts with clean map, the drawer automatically opens and the predefined tools are taken out of and moved to their default locations. Presumably, the set of most commonly used tools includes the Navigator and Explorer, which allow user to get around the map and conduct searches as described elsewhere herein.

As has been described above, the disclosed system generally enables a user to place tools at arbitrary positions over the map window. Nevertheless, in certain cases tools can be automatically placed at standard positions located along the border of the map window. Specifically, in one embodiment, a tool is placed at one of a plurality of standard positions when a user (1) takes the tool out of the drawer using the "double-click" method, provided that the application either does not have information about previously saved tool position, or the tool can not be placed at saved position, because it is already occupied by some other tool (that is, the tool center point appears to be inside the bounding rectangle of another tool); or when the user (2) Invokes the "Align Tools" function in the tool drawer. The function affects positions of all tools currently placed over the map and is used to quickly align tools along the map window border.

In an embodiment, standard or default tool positions are computed at run time based on the current map window dimensions and tool size (diameter). Tool size, in turn, depends on computer display horizontal resolution (provided that the display has landscape orientation, that is, horizontal resolution represents the bigger side of the display).

In an embodiment, Tools are arranged inside the map window according to the following schema:
 (1) along the left window side from top to bottom;
 (2) along the right window side from top to bottom;
 (3) along the bottom window side from left to right; and
 (4) along the top window side from left to right.

Figure 29:
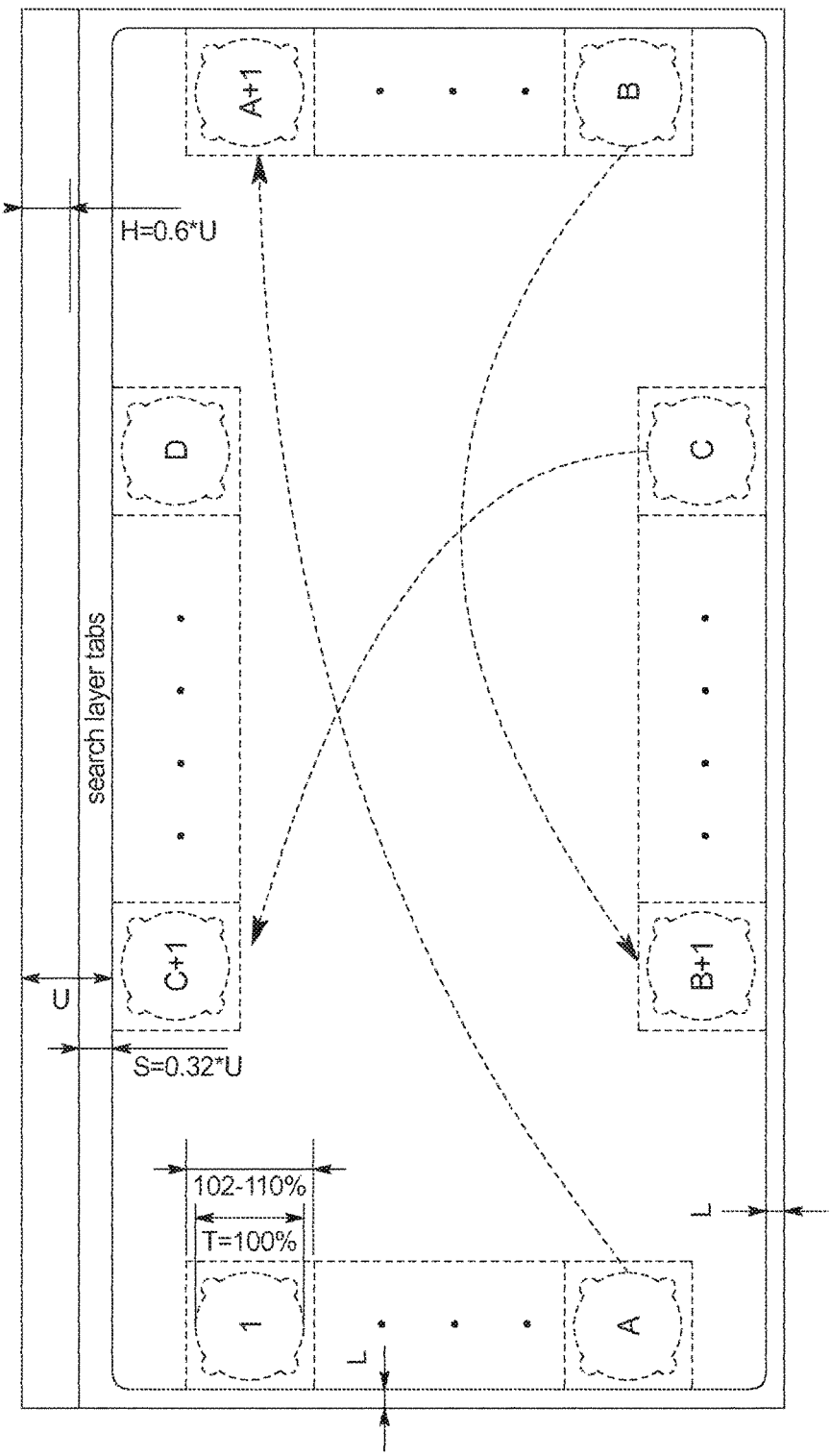
FIG. 29 is a schematic illustration of tool position schemas according to the disclosed system.

FIG. 29 illustrates the above-described schema graphically. In the embodiment illustrated in FIG. 29, the set of standard tool positions consists of four sections, which are populated in the order shown. In this embodiment, all sections are centered relative to corresponding window boundary. For browser-based implementations of the disclosed system, the number of tools in the vertical (left and right) sections may vary from 2 to 5 depending on display horizontal resolution, aspect ratio and current size of browser window. Similarly, horizontal (bottom and top) sections may contain 2 or more tools. For tablet-tailored full screen implementations of the disclosed system, the number of tools in vertical sections can equal to 2 or 3 depending on resolution and aspect ratio, while the number of tools in horizontal sections is greater or equal then 2.

In the illustrated embodiment, the distance between tools in each section is preferably maintained within the range of 2-10% of tool size. Consequently, the minimal size of a tool "cell" is equal to 102% of the tool diameter. For the browser-based embodiment, the minimal non-scrollable browser window may house up to 8 tools and its inner dimensions may be equal to:

$$(4*1.02*T+2*L) \times (2*1.02*T+U+L) \text{ where:}$$

T—tool diameter;
U—inner map frame upper indent;
L—inner map frame lower and lateral indents;

In the embodiment of FIG. 29, dimensions of the following GUI areas are also illustrated:

H—header area height=0.6*U (contains the Drawer, site logo, map title and some other UI elements);
S—search layer tab height=0.32*U; (see the Explorer Tool specification for details about layer tabs)

The sizes of all interface elements depend on horizontal display resolution. They can be determined by the zoom factor Z of the unified scale of display resolutions, which is also used by the Navigator Tool for computing of the mapping of perceived altitude above the ground onto city map imagery of various resolutions.

As mentioned elsewhere herein, the disclosed system also includes algorithms for automatically computing tool coordinates inside the inner map window. The X×Y dimensions of the inner map window in these embodiments can be computed as follows:

$$(X'-2*L) \times (Y'-U-L)$$

where X' and Y' are the inner dimensions of the browser document (for browser-based version), or screen dimensions (for tablet version), and U and L parameters are inner map frame upper indent and inner map frame lower and lateral indents, as described above. It should be appreciated that in one embodiment, the dimensions of the browser document can be bigger, then the inner dimensions of the browser window, since document dimensions can not be smaller than $(4.08*T+2*L) \times (2.04*T+U+L)$. In this embodiment, browser scrollbars should be automatically enabled.

In various embodiments, the disclosed system positions all tools inside the inner map window and does not enable the tools to cross these boundaries. In this embodiment, each time a tool is placed or moved inside the inner map window, the application should make record of the following parameters, which will be used during subsequent automatic tool placements to compute tool window coordinates:

(1) An index/code of the inner map window corner, closest to the tool center point (that is, top-left, top-right, bottom-left or bottom-right); and (2) Relative distances Rx and Ry from the inner map window horizontal and vertical sides, which form the nearest window corner, to the edge of the tool; Distance values are computed relative to corresponding window dimensions, and therefore, are always less then 0.5.

In one embodiment, using saved Rx and Ry values and window corner index, the application can effectively compute tool window coordinates Dx and Dy for arbitrary inner map window with X×Y dimensions. In this embodiment, the disclosed computation schema insures that the tool will not cross map window boundaries regardless of map window dimensions.

It has been found that automatic computation of tool window coordinates may be required in the following cases:

1. Tools repositioning after browser window resize: Performed according to the algorithm outlined above.

2. Tool placement via "mouse double-click method": If the application does not have information about previous (saved earlier) tool position, or the tool can not be placed at saved position because it is already occupied by some other tool, the tool is placed in the first standard cell that happens to be empty during cell traversal in the order discussed above. The cell is considered empty if none of the tools has its center point inside the cell bounding rectangle. Otherwise, tool coordinates inside the map window are computed according to the algorithm outlined above.

3. Tools repositioning via "Align Tools" function: The algorithm computes all distances between tool and cell center points, selects the minimal distance, places the tool in a corresponding cell, and removes the tool and the cell from their corresponding lists. The algorithm is repeated after each placement until the list of tools becomes empty.

It should be appreciated that the last two algorithms described above rely on the fact that total number of tools is not greater then the number of cells, thus enabling the disclosed system to effectively guarantee successful placement.

In various embodiments, all tools that have been taken out of the drawer and placed over the map have identical size (e.g., diameter). In one such embodiment, original tool diameter equals approximately 10% the width of the computer screen and is generally sufficient for comfort work. Nevertheless, people with disabilities, who may have difficulties working with a tool, can increase the size of a tool via the "Expand/Restore" toggle located at the top-left edge of the tool in various embodiments. In one such embodiment, after the user selects the "Expand/Restore" toggle, the tool size increases by a certain predefined ratio (preferably by 20-40%) and the toggle icon changes from "Expand" to "Restore." In this embodiment, all other tools currently placed over the map become smaller by the same ratio and go into disabled (grayed out) state upon the user selecting the "Expand" toggle. In one embodiment, the disclosed system changes the center point of the expanded tool to ensure that the tool stays within the map window and is fully visible.

In this expanded mode, in which a tool has been expanded as described, the system enables the user to continue working with the current tool or to switch to another (currently disabled) tool by clicking over it. If the user clicks a disabled tool in the expanded mode, the clicked tool becomes enabled and becomes bigger, while the original current tool gets disabled and shrinks in size. In one embodiment, to restore normal mode of operation, where all tools are enabled and have identical size, a user can push the "Expand/Restore" toggle of current tool. Similarly, normal mode of operation is automatically restored in one embodiment if a user chooses to close expanded tool (place it back to the drawer) or use the "Align Tools" function.

Tools—Alternative Embodiment

In an alternative or further embodiment to that described above, the disclosed system provides a plurality of virtual tools, in which each virtual tool enables a user to complete a specific task or group of similar tasks. In this embodiment, each tool features a relatively small set of control and informational elements, such as buttons, switches, sliders or handles, LED indicators and panels, meters and scales, and the like. In this embodiment, the interactive elements enable a user to activate certain tool-specific functions and obtain various helpful information about the tool.

In an embodiment, virtual tools are designed as relatively small gadgets having a circular or a rounded-square shape. In a further embodiment, one or more of the plurality of tools have identical vertical and horizontal dimensions. In this embodiment, the tools are sized and shaped to enable the user to provide inputs to position place at least four tools in a row along a vertical edge of a map browser window, displayed on a computer screen in maximized state, or, for tablet devices, along the smaller side of the tablet screen, regardless of pixel resolution of the display device. In one embodiment, physical dimensions (both horizontal and vertical) of a virtual tool displayed on a PC or tablet screen are required to be larger than approximately 1 inch. This constraint advantageously enables a user to easy interact with the tool using a mouse, stylus or a finger.

In a preferred embodiment, tools are sized in such a way that the user can place from 3 to 5 tools in a row along the vertical edge of a web browser window, displayed in maximized state. In another embodiment, in which the disclosed system is displayed on a tablet computer, tools are sized such that from 2 to 3 tools can be positioned along the smaller side of the tablet screen, regardless of pixel resolution of a PC or tablet display being used.

In one embodiment each of a plurality of virtual tools includes two geometric parts—a frame and an inner area. In one embodiment, the frame of each tool has an identical design for all tools, and the inner area for each tool contains tool-specific user interface elements, described above. In one embodiment, the frame serves two purposes. First, in this embodiment, the frame displayed for tools of the disclosed system contains one or more user controls to enable the user to interact with and customize the tool. For example, the disclosed system may display user controls that provide one or more of the following functions:

Close button—used to place the tool into the drawer;

Expand/Restore toggle—enables the user to increase the size of the tool in order to make it easier to work with for people with disabilities. In one embodiment, a second push of this toggle restores the original tool size;

Help button—used to open an interactive tool usage demonstration window; this window features a video presentation of how to use the tool and its text version for those users who prefer reading;

Settings button—used to open tool settings window; some tools may have settings related to it operation mode, which can be adjusted by a user according to his/her preferences;

Move button—used to move the tool around the screen; once this button is clicked, the tool is attached to mouse cursor and can be moved without holding mouse button; the second click releases the tool at desired position; alternatively, this button can be used to drag the tool around the screen by pushing and holding mouse button and moving the mouse.

In various embodiments, one or more of the above-described buttons are optional.

In an embodiment, the disclosed system also enables the user to move the tool (including whatever buttons or toggles are included within the tool) around the screen by selecting and dragging the frame and moving a cursor. In one embodiment, when mouse cursor is placed over the frame or the "Move" button, it changes its shape to indicate that user can move the tool using either of these interface elements.

FIG. 18 is a schematic illustration of a general tool design 1800 according to one embodiment of the disclosed system. In this embodiment, button 1802 is a close button, button 1804 is a help button, button 1806 is a settings button, and button 1808 is a move button, and provide the functions described above when a user clicks any of the buttons. It should be appreciated that the schematic illustration of FIG. 18 is provided as an example only. In various embodiments, tool and frame shapes, as well as look and arrangement of control elements may differ in actual graphical design. Furthermore, some tools may have additional tool-specific controls located over the frame, as is necessitated by the design of the tool and as is described in more detail herein.

In various embodiments, one or more tool functions upon their activation cause the disclosed system to take some immediate action, such as by causing the system to update the current map view or other perceivable result. In these embodiments, other tool functions require the user to further interact with the system before the altering the map view. For example, this additional interaction could include requiring the user to provide text input or to select an item from a list. In one embodiment, the disclosed system relies advantageously on dialog boxes that are mechanically attached or snapped to the tool itself. In this embodiment, the virtual tool can be analogized to a Swiss army knife, in which built in panels slide, fold, or tilt into and out of the tool. In an embodiment, the panels are initially hidden inside the tool, but may be automatically extended in a mechanical manner upon activation of certain tool functions (such as pressing tool buttons) in order to solicit further user input or provide additional features.

In one particular embodiment, the position of the additional window depends on the position of the tool on the screen. As an example, as illustrated in FIG. 19, if a tool 1900 is positioned in an upper left portion of the screen, as illustrated by line 1902, the disclosed system displays any needed window 1904 in the lower-right portion of the tool, thus avoiding the need to display the window as extending beyond the boundary of the screen 1902.

In various embodiments, depending on a tool location on the screen, the disclosed system enables the additional window to be positioned at any one of eight positions around the tool (four corner positions and four positions along the tool vertical and horizontal edges). In various embodiments, the use of only four corner positions may be sufficient to avoid panel extension beyond application window boundaries for all possible tool locations inside the window. Therefore, it may be preferable to simplify the implementation by using corner panel positioning.

Referring still to FIG. 19, in one embodiment the disclosed system enables the pop-up window panel 1904 to be extended when necessary to display additional information. In this embodiment, selecting button 1906 causes the system to display panel 1904 as a larger panel, containing additional information, as needed.

In various embodiments, the disclosed system also enables a user to hide any additional panel when the user is done consuming the information contained therein. In one such embodiment, each panel can be folded or put away via "Close" button displayed on the panel. In the illustrated embodiment, "Close" button 1908 is displayed as an "X" shaped button in the upper-right corner of the panel 1904. In another embodiment, the tool button 1906 associated with the panel 1904 can be used to cause the panel to be closed, such that a single button both opens and closes the panel. In another embodiment, the disclosed system also enables the panel to be closed by the user selecting a tool button associated with a different panel. In this embodiment, opening a different panel causes the previously-open panel to be closed.

Referring now to FIG. 20, a schematic diagram of an alternative embodiment of the above-described drawer is provided. FIG. 20 illustrates a portion of a window 2000 in which an Explorer tool 2002 has been removed from the drawer 2004. In the illustrated embodiment, additional tools called Navigator, Planner, Communicator, and Organizer are illustrated in drawer 2004.

In the illustrated embodiment, the drawer is located along one of the edges of the map window and can be either closed or opened. In this embodiment, in the closed state, the drawer occupies minimal space on a computer screen and looks like a relatively small control panel, displaying only the following three buttons:

Open/Close Drawer handle 2006—used to open and close the drawer;

Show/Hide Tools button 2008—allows user quickly clear the map surface from all tools currently placed over the map (pushed position) and restore previously hidden tools on the screen (pulled position). It should be appreciated that in one embodiment, the show/hide action doesn't place tools into or out of the drawer, but rather provides a method to temporarily turn tool visibility settings on or off. In this embodiment, when a user pushes this button, all tools quickly fade out from the map surface and fade back in upon subsequent push. If the user opens the drawer after the tools have been hidden, the disclosed system in one embodiment causes all previously hidden tools to be restored on the screen and the button is automatically switched back to pulled position and set to disabled state. In one embodiment, this button stays disabled until the user closes the drawer. In one embodiment, if a user opens the drawer after tools have been hidden, the system causes all previously hidden tools to be restored on the screen (the button is automatically switched back to pulled position) and the button set to disabled state. The button stays disabled until the user closes the tool compartment.

Align Tools button 2010—moves all tools currently placed over the map to their default (predefined) positions on the screen. In one embodiment, the align tools button arranges all the tools currently placed over the map to positions along the border of the map window. An exemplary tool arrangement schema is described in more detail below.

It should be appreciated that the drawer 2004 of FIG. 20 is illustrated in its open state—however, the three buttons described above are visible in either the open state or the closed state.

In one embodiment, the disclosed system enables a user to open and close the drawer 2004 by clicking over the Open/Close handle 2006. Furthermore, in one embodiment, the disclosed system automatically closes the drawer 2004 when the user starts to use tools or otherwise interact with the map.

In the embodiment illustrated in FIG. 20, each tool has its own designated compartment within the drawer so a user could visually find it at the same location each time the drawer is opened. In this embodiment, when the disclosed system is displaying the tools inside the drawer, it displays them as relatively small, but still visually recognizable tool icons, which can be fitted into the drawer compartments. In the illustrated embodiment, each tool compartment is labeled with corresponding tool name and has small "Help" button located next to it, such as help button 2012, which the user can select to cause the system to provide general information about tool purpose and usage.

In an embodiment, when a user places the mouse cursor over a tool icon inside the drawer, the icon is highlighted to indicate that the tool is ready to be taken out of the drawer. Further, in this embodiment, a short description of the selected tool is displayed in an information bar located underneath the tool compartments. In this embodiment, to take the tool out of the drawer, the user simply drags the desired tool to a desired location on the screen with the mouse, stylus or a finger. Alternatively, a user can pick a tool by clicking over its tool icon, which will cause the icon to slightly raise and hover over the drawer. Thereafter, the icon becomes attached to the mouse cursor, while the cursor itself becomes invisible (that is, picked tool from now on acts as a cursor). In one embodiment, a crossed-arrows or similar overlay icon is displayed in the top-left corner of the tool to indicate that the user's inputs will cause the tool to move around the screen. In this embodiment, after the tool has been selected, the disclosed system enables the user to provide inputs to move the tool to a desired location and place on the screen by clicking mouse button again, which causes the tool to be detached from the cursor and the default cursor becomes visible again.

In one embodiment, the icon of the tool being extracted immediately turns into unabridged tool object as soon as it appears entirely outside the drawer.

In an alternative embodiment, the disclosed system enables the user to quickly remove a tool from the drawer by double-clicking over the icon of the tool in the drawer. In this embodiment, upon detecting that a user has double-clicked, the disclosed system displays the tool in a default (predefined) or previously used position in the map window. For example, in one embodiment, each time the user takes the tool out of the drawer or moves it around the screen, the disclosed system displays the tool in an onscreen position within the map window that had been previously saved by the application. In this embodiment, if the user closes the tool or puts it back to the drawer, he/she can quickly take it out later and place at the last saved position by double-clicking over the tool icon. If the user takes the tool out of the drawer for the first time during application session, the disclosed system in one embodiment is configured to place the tool on the screen at predefined default position, associated with the tool. In one embodiment, the initial position of a tool is computed at run-time based on current map window dimensions and positions of other tools, which have been already taken out of the drawer. This tool placement algorithm is related to the "Align Tools" function and is described in further detail elsewhere herein.

In one embodiment, the disclosed system enables the user to place a tool back in the drawer by moving it via use of the tool "Move" button or the tool frame, as discussed above. In this embodiment, if a user provides inputs to drag the tool into the drawer, the disclosed system displays the moved tool as an icon upon the tool crossing the drawer boundary. In another embodiment, the disclosed system enables the user to remove the tool from the map by clicking the tool "Close" button. In still another embodiment, the disclosed system enables the user to return the tool to the tool drawer by double-clicking over the empty compartment associated with the tool inside the drawer, such as empty compartment 2014 in FIG. 20.

In various embodiments, the tools provided by the disclosed system can be described as having two aspects: (1) the way the tools are mechanically designed and how the user interacts with them and (2) the way that functions are organized into tools.

With regard to the former, the tools disclosed herein in certain embodiments are displayed as are small rounded gadgets that look like physical objects, can be moved around, can be placed into a so-called drawer, can be extendable or expandable so as to provide additional functionality, and/or provide interactive help functions to enable the user to obtain help in using the tools.

In addition, in various embodiments, the disclosed system advantageously presents a plurality of functions organized within the various tools described below. In this embodiment, the disclosed drawer may be thought of as menu tools, with each tool providing a user with access to a plurality of functions.

In one embodiment, the tools of the disclosed system provide a user with access to a map marking schema including a plurality of map markers. In this embodiment, as will be described in more detail below, the system provides a plurality of map markers, displayed as signposts, billboards, storefronts, and/or pinned location icons. In one embodiment, the disclosed system further provides users with numerous ways to interact with the markers, such as by (1) using specific marker animation methods to indicate current and compared locations, (2) selectively displaying markers of current or non-current layers, (3) displaying markers for visited locations, (4) selectively displaying markers corresponding to fuzzy search results (e.g., by displaying markers for best choice/preferred/all other elements), (5) indicating locations that satisfied search criteria but have been discarded from the search either due to fuzzy logic or user choice, and (6) displaying entrance and/or exit tags to indicate building and/or map element entrances and exits.

In one embodiment, the disclosed system also advantageously implements a plurality of marker grouping techniques, in conjunction with a so-called magnifier tool, to enable a user to work with group markers. In one embodiment, the disclosed system enables a user to compare locations with one another, which in turn encourages exploration of a map rather than simply viewing of an already-known destination. Finally, in one embodiment, the disclosed system provides advanced searching techniques by combining category-based and keyword-based searches into one integral mechanism. In this embodiment, by providing a user with the ability to specify what categories of information he or she would like to see search results for, the disclosed system enables and encourages the user to perform searches in layers, and to add or remove layers as the user explores an area of the map. An exemplary algorithm for converting keyword-based search criteria into category-based search results is described in more detail below.

The following paragraphs describe a set of exemplary tools available in one embodiment of the disclosed computerized map system. It should be appreciated that the disclosed tools are exemplary in nature, and could be expanded as appropriate to provide additional map-related functionality (in a map system environment) or other functionality (in a non-map system environment). In general, each tool comprises features related by their generic function. In one embodiment, the following tools can be used to provide map-related functionality as might be needed by users of the computerized map system disclosed herein: Map Navigation Tool (Navigator); Map "Find It" Tool (Explorer); Trip Planning Tool (Planner); User Communication Tool (Communicator); Personal Maps Organizing Tool (Organizer); News & Information Tool (Informer/News Stand). Some of these toolkits are described in further detail below.

Map Navigation Tool (Navigator)

In one embodiment, the navigator tool enables a user to move around or navigate the maps displayable by the disclosed computerized map system in various ways. It should be appreciated that some of the relatively simple navigation tasks that a user may wish to perform (e.g., panning and zooming in/out) are typically implemented via direct interaction with the map, for example, via clicking a left or right mouse button over the map and dragging the mouse in an appropriate direction.

In various embodiments, the tools included in the navigator toolkit disclosed herein provide advanced navigation options including forward/back/bookmark tools, zoom level control tools, city/neighborhood mode tools, and address/place locating tools. In various embodiments, the tools are displayed using appropriate icons, such as the icons displayed in FIG. 3. FIG. 3 is a schematic representation of one embodiment of the map navigation tool set described herein. In FIG. 3, the toolset includes a forward/back/bookmark tool 402, zoom level control tool 404, city/neighborhood mode tool 406, and address/place locating tools 408.

In one embodiment, the navigator tool enables the user to move back and forth along user navigation path. In this embodiment, the user navigation path is formed automatically by recording each change of map position and/or zoom level. This feature enables the user to quickly move the map to one of its previous views, as well as move forward to more recent views.

In one embodiment, the navigator tools enable the user to bookmark a current map view and quickly jump to bookmarked map views. In this embodiment, a current map position within a map window can be saved to the list of user map bookmarks. Bookmarked map views in one embodiment are outlined on the map via labeled (named by user) dashed-line rectangles or via other suitable annotations to the map. A desired map view can be chosen by the user, either from the list of bookmarked views or directly from the map, by clicking over the outline label.

With regard to the embodiment of forward/back/bookmark tool 402 illustrated in FIG. 3 that tool enables a user to move back and forth along the navigation path. In this embodiment, the user navigation path is defined based on locations or markers visited in the current session only and should be limited to a reasonable number of entries (preferably between 50 and 100). In this embodiment, each entry within the user navigation path contains a map position and zoom level, city/neighborhood mode settings, and a "show Bookmarks" button state.

In one embodiment, a user can define his or her own destinations (map bookmarks) on the map by outlining and adding the current visible map area to the map bookmarks list. Added destinations are named by the user at his or her discretion. To facilitate navigation, map bookmarks are further used to quickly jump to a desired destination instead of manually searching for it on the map, via panning and/or zooming in or out. In this mode any user destination can be set as current. Setting a destination as current allows the user to restrict search and display of business locations to selected destination, which is discussed in more details in the Explorer Tool specification. Similarly, setting a destination as current defines a map context for other tools, which is also discussed in corresponding sections below.

In its initial sate, the illustrated embodiment of the forward/back/bookmark tool 402 includes three controls: "Back" and "Forward" push-buttons and a "Show Bookmarks" 2-positional switch (initially displayed in pulled, as opposed to pushed, state). In this embodiment, the tool is non-extractable and is intended for use inside the toolkit.

Figure 4:
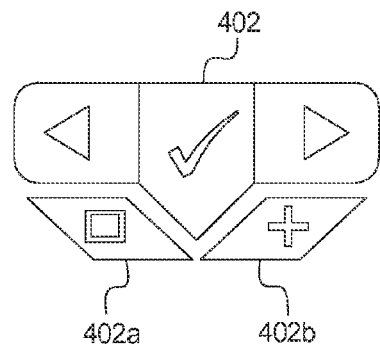
FIG. 4 shows a forward/back/bookmark control illustrated in FIG. 3 after additional Zoom Control and Create Bookmark controls have been added.

In the embodiment of FIG. 3, if the user selects the Show Bookmarks button, the disclosed system is configured to display a plurality of bookmarks (destination boundaries) on the map and to reveals two more tool controls. The version of the control 402 illustrated in FIG. 4 shows the control 402 after the additional tool controls "Zoom Control" 402a and "Create Bookmark" 402b have been added.

In one embodiment, pushing the "Create Bookmark" button 402b causes the display of a dialog box, which enables a user to enter the name of a new map bookmark. After such name is entered, the disclosed system stores an association of the current visible map area with that name, such that the user can subsequently return to that area. In one embodiment, pushing the "Zoom to All" button 402a causes the disclosed system to refocus the map so that all previously saved bookmarks are simultaneously visible inside the map window at the highest possible map zoom level. This enables the user to easily select from among any saved bookmarks on the map and quickly jump to a desired destination.

In an embodiment, the disclosed system displays bookmarked destination boundaries as dashed lines along with destination labels corresponding to the bookmark names. In this embodiment, the destination names are placed over or near a neighborhood. In this embodiment, the disclosed system is configured to calculate label screen coordinates and font size dynamically at run-time depending on zoom level and position of the current visible map area.

In one embodiment, destination labels are active map objects. In this embodiment, whenever a user places the mouse cursor over the label, the disclosed system is configured to highlight the corresponding destination and the label on the map. Likewise, in this embodiment, clicking the label zooms the map to a selected destination.

In one embodiment, when a bookmark label is highlighted, a bookmark pull-down menu button in the form of a downward-facing caret is displayed next to the label. The system in this embodiment enables the user to select the bookmark pull-down menu button, which causes the system to open a menu including the following user action menu items:
Zoom to bookmark
Delete bookmark (opens deletion confirmation dialog box)
Rename bookmark (opens bookmark rename dialog box)

In one embodiment the navigator tool enables a user to zoom to specific zoom level by selecting a desired zoom level from a zoom scale or by drawing a target rectangle directly over the map.

In one embodiment, any user destination can be set as current. Setting a destination as current allows the user to restrict search and display of business locations to selected destination. Similarly, setting a current destination defines a map context for other tools, as discussed elsewhere herein.

Figure 31:
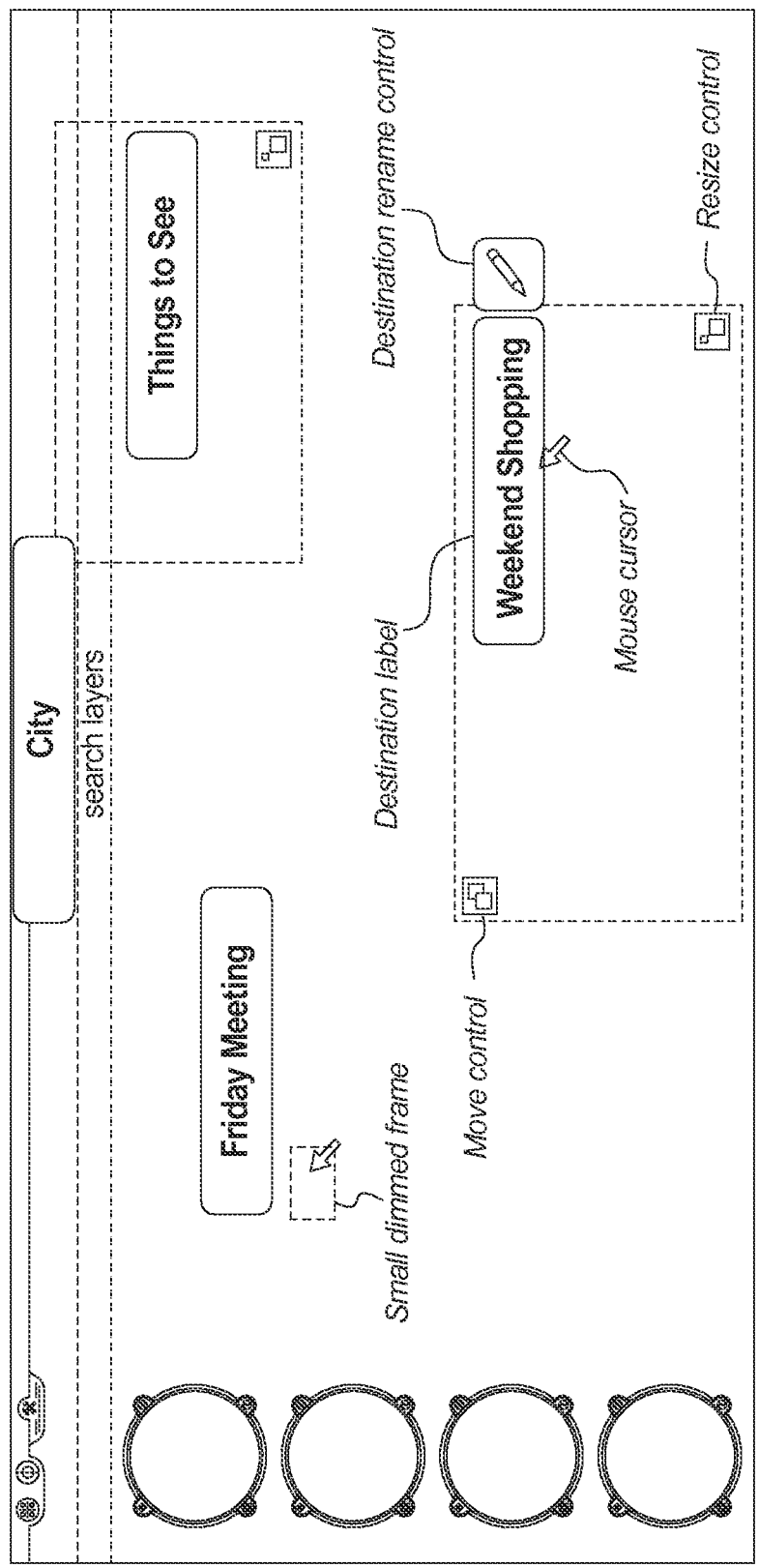
FIG. 31 is a schematic illustration of a map displayed by an embodiment of the disclosed system when that system is in a "User Destinations" mode.

FIG. 31 illustrates a schematic representation of a map displayed in one embodiment of the disclosed "User Destinations" mode. In this embodiment, when a user switches over to the "User Destinations" mode, the current destination initially is undefined and a map title box (located over the map window) displays the name of a city. After a current destination has been selected, the map is automatically positioned over destination area, its name is displayed in the map title box, all other destinations are removed from the map, and the surrounding area is dimmed as if it has been covered by a piece of darkened glass. In addition, if a current destination has been selected, the map title box in this embodiment displays two buttons, which allow user to:
zoom to selected area (that is, position the map over current destination); and/or
clear the selection (undim surrounding area, reset map title box to display the city name and display all other destinations on the map).

It should be appreciated that in one embodiment, since only one kind of map area can be set as current at a time (that is, either neighborhood or user destination), selecting a user destination as current will automatically cancel the current neighborhood selection and vice versa. In various embodiments, however, the system does not prohibit displaying both neighborhood and user destination boundaries on the map simultaneously.

In one embodiment, bookmarked destinations are indicated on the map via dashed outlines (frames) and accompanying destination labels. Destination labels are active map objects, which are used to select and zoom to current destination and/or edit destination name. They are usually located at the top right corner of the destination frame. Nevertheless, label screen coordinates, dimensions and font size are calculated dynamically at run-time depending on the map zoom level and the destination frame position within the map window to make sure destination names are readable and do not overlap. Different label sizes may be used at different viewing altitudes in order to improve map readability.

In an embodiment, when a user places the mouse cursor over a destination label, the label and corresponding destination frame is highlighted. In this embodiment, clicking over the label causes the corresponding destination to be selected as the current destination. In addition, in various embodiments, the user can edit the name displayed in the destination label by clicking over the destination name edit control (i.e., button), which automatically slides from beneath the right side of the label when user places mouse cursor over it.

In various embodiments, besides the label discussed above each destination frame also houses two "click and drag" controls, including:
move control (at the top left corner; allows to move the frame around the map) and
resize control (at the bottom right corner; allows to change frame size).

It should be appreciated that destination frames created at low viewing altitudes may become very small (practically invisible) at high altitudes. To overcome this issue, in one embodiment the disclosed system limits the size of a frame to a certain minimal value. Furthermore, at high altitudes a frame may shrink to a relatively small size when it becomes impossible to fit the label and/or move/resize controls into it. In this case the area inside the frame is dimmed while its label and move/resize controls are removed. In one embodiment, when the frame is in a dimmed state user can not move or resize it. Nevertheless, in this embodiment, the user can still display destination label by placing mouse cursor over dimmed frame.

Referring again to FIG. 3, in one embodiment the disclosed system is configured to provide a zoom level control tool 404 to enable a user to zoom in and out of the viewed map. In this embodiment, the disclosed system enables the user to provide inputs to the zoom level control tool 404 to increase/decrease the current map zoom level, to select a desired zoom level in a pop-up zoom scale bar, and/or to outline the target zoom area on the map.

Figure 5:
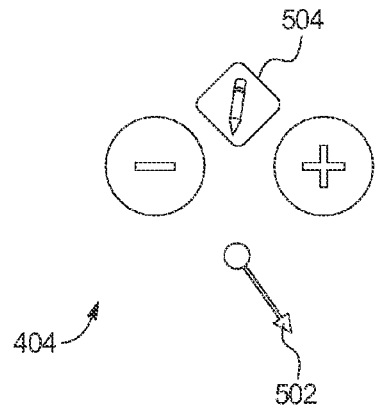
FIG. 5 is a schematic representation of the zoom level control tool of FIG. 3 after that tool has been expanded to include a zoom scale indicator.

In one embodiment, when the user places his or her cursor over the zoom level control tool 404 as illustrated in FIG. 3, the version of that tool as illustrated in FIG. 5 is displayed. Specifically, when the user hovers over the tool, a zoom scale indicator 502 is displayed under the tool. In this embodiment, the zoom scale indicator 502 is displayed as a dial with an arrow similar to a speedometer of a car, and the user can select the desired amount of zoom by moving the arrow in the indicator. Also in this embodiment, by clicking on the plus and minus areas of the zoom level control tool 404, the user can cause the disclosed system to increase and decrease the zoom level of the map incrementally. In this embodiment, the zoom scale indicator 502 is appropriately adjusted to reflect the amount of zoom presently being applied.

Still referring to FIG. 5, the disclosed system enables the user to select the outline zoom area button 504 to turn on an alternative zoom method. Upon selecting this button 504, the disclosed system displays the mouse cursor in a different shape, such as a cross, to indicate the zoom tool activation. In this embodiment, when the cursor is in the different shape, the disclosed system enables the user to draw a target zoom-in rectangle by clicking and dragging on a mouse. In this embodiment, the disclosed system resizes the window displayed to the user to reflect the zoom area indicated by the dragging using the outline zoom area button.

In one embodiment, the navigator tools enable the user to cause the disclosed system to show/hide neighborhoods on the map, choose a current neighborhood, and/or quickly position the map over the current neighborhood. In this embodiment, neighborhood boundaries are displayed over the map and there is always one neighborhood set as the current neighborhood. Further, in this embodiment, all neighborhoods, except for current, are grayed out or are otherwise indicated not to be the current neighborhood, and may be labeled by their names, which are placed over or in close proximity to the neighborhood area. In an embodiment, the name of the current neighborhood is used as the map title, which is displayed over the map at the top of the map window. Users of the disclosed system can switch between neighborhoods by selecting a neighborhood from the neighborhood list or the map itself by clicking over neighborhood labels for non-current neighborhoods.

In one embodiment, the neighborhood related functionality can be accessed by selecting the city/neighborhood mode tool 406 as illustrated in FIG. 3. In various embodiments, the city/neighborhood mode tool 406 enables the user to switch between City and Neighborhood map modes. In one embodiment, in city mode, neighborhood boundaries are not shown on the map. In this embodiment, in neighborhood mode, the disclosed system displays the map as including neighborhood boundaries. Further, in this embodiment, the system displays the map as having one current neighborhood, while other neighborhoods are "grayed" or otherwise de-emphasized on the map to indicate that they are not "current." The user can switch between neighborhoods via use of the neighborhood list, or by selecting neighborhoods on the map itself by clicking on the displayed neighborhood.

Figure 6:
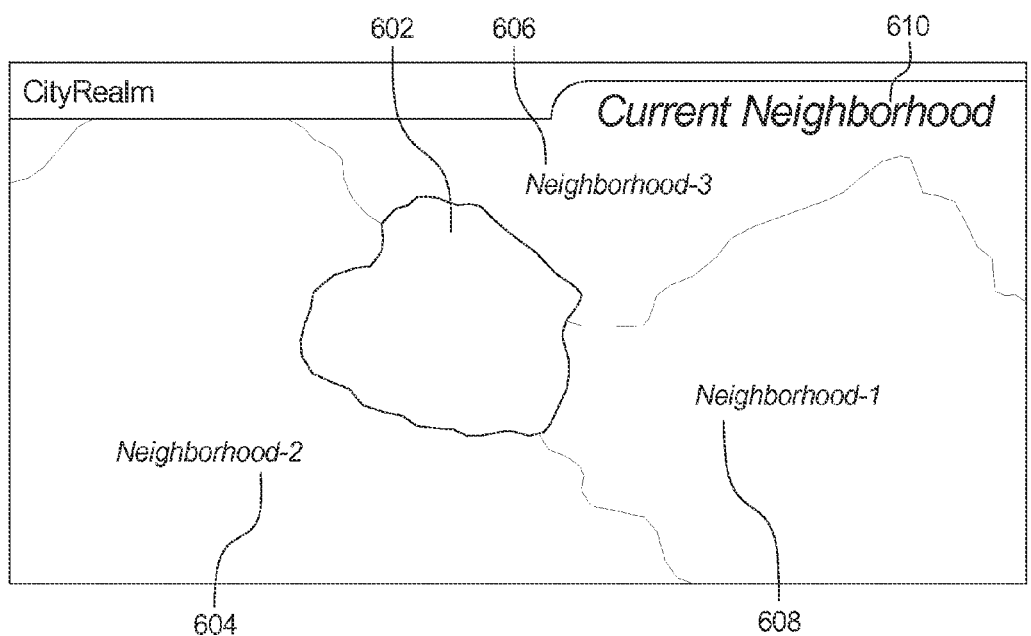
FIG. 6 is a schematic representation of a neighborhood view of a map as provided by the disclosed system.

When the disclosed system is displaying a map in City Mode, the city/neighborhood mode tool 406 is displayed in one embodiment as a single button (a two-position switch) in the pulled state, as illustrated in FIG. 3. In this mode, pressing the button switches the map to the Neighborhood Mode, where the neighborhood boundaries and neighborhood labels (names) are displayed over the city map. An example of this neighborhood view is illustrated in FIG. 6. All neighborhoods, except the current one, are grayed, i.e. they look darker on the map, as if they are covered by a piece of darken glass, enabling the user to still see the underlying map through it. The name of current neighborhood (map title) is displayed at the top of the map window in area 610 illustrated in FIG. 6.

In one embodiment, when a user switches to neighborhood mode, the disclosed system automatically determines the current neighborhood by computing the geographical location corresponding to the central pixel of the map window and determining which neighborhood that point is located in. If the determined location happens to be outside of all neighborhoods (for example, in a lake), then the disclosed system is configured to select the nearest neighborhood to the point, such as by determining distances between the location and the neighborhood central points (calculated as average of neighborhood boundary vertices or using another appropriate method).

In the embodiment of FIG. 6, neighborhood labels are displayed over or near each neighborhood area except the current neighborhood 602. Thus, in FIG. 6, neighborhood labels are displayed within neighborhoods 604, 606, and 608, which are all non-current neighborhoods. In one embodiment, neighborhood labels are active map objects. When a user places the mouse cursor over a neighborhood label in this embodiment, the disclosed system highlights or animates the label along with corresponding neighborhood boundaries. In this embodiment, clicking a neighborhood label switches the current neighborhood on the map and updates the map title 610.

Figure 7:
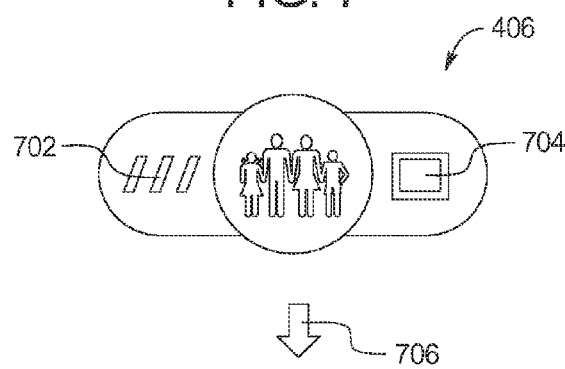
FIG. 7 is a schematic representation of the city/neighborhood mode button of FIG. 3 after being pressed to reveal a show city areas control and a zoom to neighborhood control.

In one embodiment, illustrated in FIG. 7, pressing the city/neighborhood mode button 406 reveals two additional tool controls: a show city areas control 702 and a zoom to neighborhood control 704. In this embodiment, the tool is also displayed as being extractable, as indicated by the tool extraction handle 706 displayed under the tool 406. In one embodiment, the tool extraction handle 706 is displayed when the user places the mouse cursor over the tool 406.

Referring still to FIG. 7, the zoom to neighborhood button 704 is used to cause the disclosed system to position the visible map over the current neighborhood. When the current neighborhood is fully visible and occupies maximum space inside the map window, the disclosed system in one embodiment disables this button 704. Once a user moves away from the default neighborhood view, the button 704 becomes enabled.

In the embodiment of FIG. 7, the show city areas button 702 is a two positional switch. When it is depressed, all neighborhoods, except the current one, are shaded using color associated with a specific city area (such as City Center, Near North side, and the like). Thus, the show city areas button 702 enables a user to view a map with neighborhoods shaded in different colors, to easily distinguish between the various neighborhoods on the map.

Figure 8:
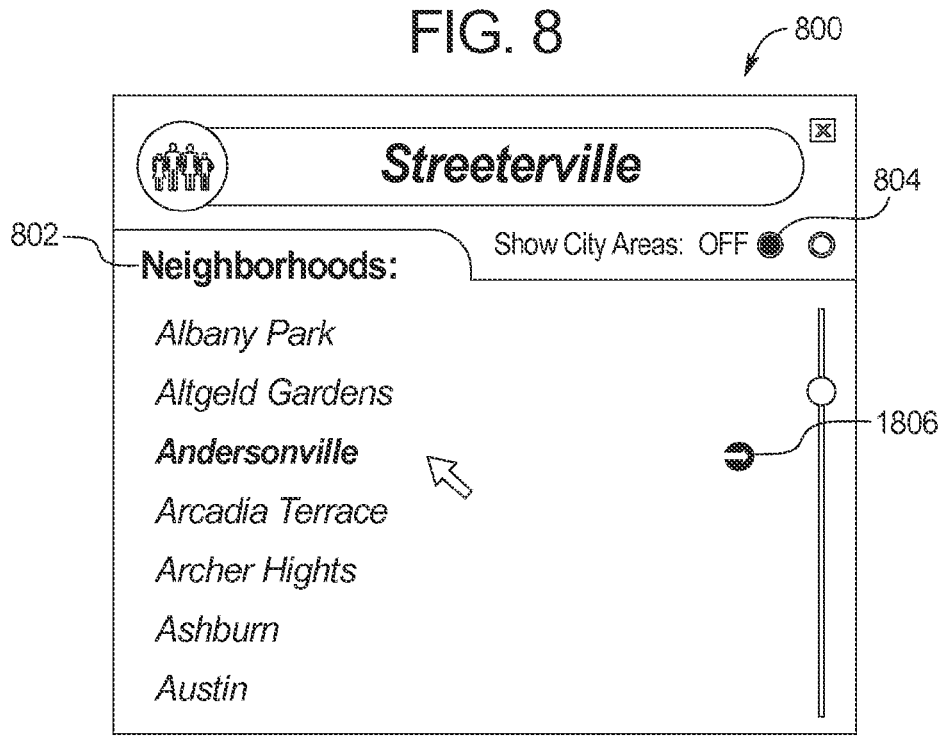
FIG. 8 is a schematic representation of the neighborhood mode button of FIG. 3 after a user has clicked on a tool extraction handle to display the tool in extracted form.

In one embodiment, when a user places the mouse cursor over the tool and clicks the tool extraction handle 706, the disclosed system displays the tool in extracted or extended form as illustrated in FIG. 8. In the embodiment illustrated in FIG. 8, the tool 800 features two different user interface elements—a neighborhood list element 802, which is scrollable and alphabetically ordered, and a show city areas switch 804, which is turned off by default.

In one embodiment, if a user clicks a neighborhood name in the list, a go to button 806 is displayed at the right side of the name. Clicking the go to button 806 causes the disclosed system to switch the current neighborhood on the map to the selected neighborhood in the control 800, and causes the system to position the visible map over the current neighborhood and update the map title to reflect the new current neighborhood. In one embodiment, clicking a neighborhood name in the list of neighborhoods 802 causes the selected neighborhood boundaries and label to be highlighted or animated on the map. In a further embodiment, double-clicking over a neighborhood name in the list of neighborhoods 802 is equivalent to a single click with the subsequent click of the go to button 806, and thus causes the map to set the double-clicked neighborhood as the current neighborhood.

Figure 9:
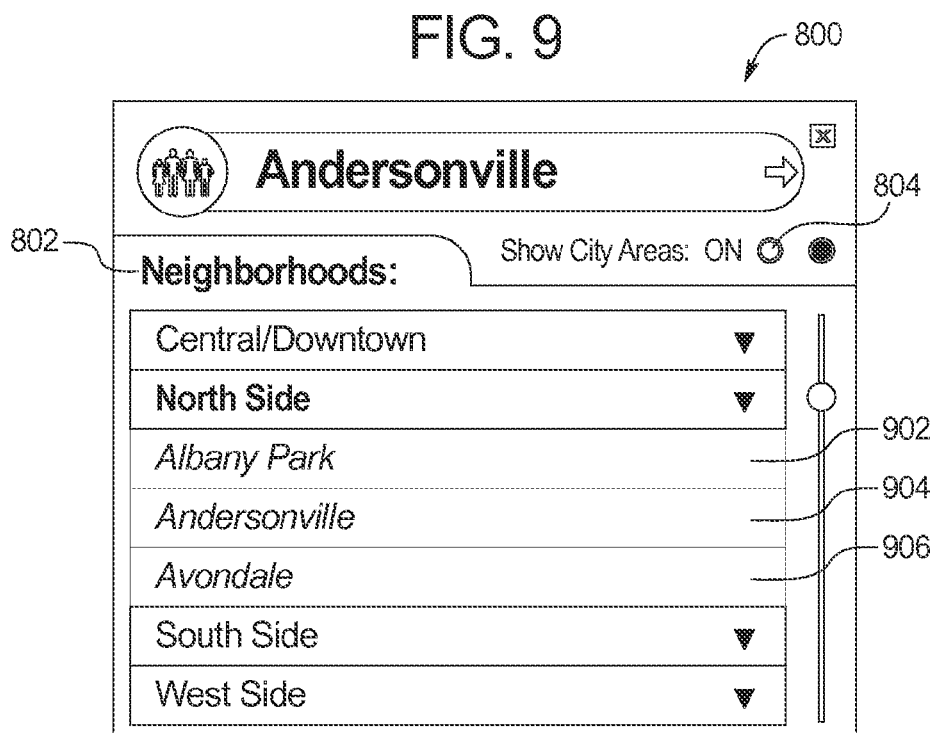

The show city areas control 804 enables a user to group neighborhoods in the list of neighborhoods 802 by city areas (such as by sides of the city) in the list and identify the areas on the map by color shades. In one embodiment, when the show city areas control 804 is turned on, the tool 800 is displayed as illustrated in FIG. 9. In this embodiment, neighborhoods such as neighborhoods 1202, 1204, and 1206 are grouped by city area, such as "North Side," and ordered alphabetically within each group. In the illustrated embodiment, city areas are represented as a set of stacked sections. Each area has its designated color, which is used to highlight an area label and neighborhood names within corresponding section of the list. In an embodiment, clicking over an area label (section header) within the list opens up the section revealing all neighborhoods that fall within the area defined by the label. In one embodiment, only one city area section is kept open at a time, such that the opening of a closed section automatically closes the currently opened section.

In an alternative embodiment, the disclosed system displays the name of current neighborhood a title box (located over the map) instead of the city name, which is used as the map title in the "City" mode. In this embodiment, the names of all other neighborhoods are displayed directly over the map.

In one embodiment, when a user places a mouse cursor over a neighborhood label, the disclosed system highlights the label and/or is animated along with the neighborhood boundary. In addition, in one embodiment, the disclosed system displays a "Zoom to . . . " button next to the label.

In one embodiment, if the user clicks over a neighborhood label, the disclosed system toggles the current neighborhood displayed to the user and also updates the map title box to reflect the selected neighborhood. In this embodiment, however, the system does not alter the position or altitude of the map—in other words, the map stays still. In one embodiment, if the user selects the "Zoom to . . . " button, the disclosed system sets the chosen neighborhood as the current neighborhood, and the position and altitude of the map are altered to focus on the neighborhood—in other words, the system displays the neighborhood as fully visible at largest possible size inside the map window.

FIG. 24 is a schematic representation of an alternative embodiment of a City/Neighborhood mode control block. In this embodiment, selecting the "City/Neighborhood" button 2400 enables a user to toggle between "City" and "Neighborhood" modes. In the illustrated embodiment, if the user switches the system to be operating in neighborhood mode, the system displays the additional panel 2402 containing "Select" and "Zoom to . . . " buttons. In various embodiments, this panel 2402 is not visible in the "City" mode.

In the illustrated embodiment, if the user selects the "Zoom to . . . " button on panel 2402, the disclosed system quickly positions the map with the appropriate altitude over current neighborhood. In this embodiment, when the current neighborhood is fully visible and occupies maximum space inside the map window, the disclosed system disables the "Zoom to . . . " button. Once a user moves away from this optimal neighborhood view, the button is automatically re-enabled.

In the illustrated embodiment, if the user selects the "Select" button of the panel 2402, the disclosed system displays a dialog box such as box 2404, which enables the user to select a neighborhood from the list and zoom to selected neighborhood via pressing the "Zoom to . . . " button. In this embodiment, to select a neighborhood the user can scroll the list and click over the neighborhood name. In an embodiment, the selected neighborhood name is displayed in a text box located above the list. Alternatively, the disclosed system enables the user to enter at least a part of a neighborhood name in the text box or edit its content using "Backspace" and "Esc" keyboard control keys (the "Esc" key clears the text box). In one embodiment, the list is automatically populated and scrolled as the user types and the first matching neighborhood name is highlighted. In this embodiment, at the same time the reminder of matched neighborhood name, which has not been entered yet, is automatically displayed after last entered character and highlighted using different font color and/or style. In this embodiment, if the next typed character makes already entered part of the word or phrase unmatchable with any neighborhood name, the character is ignored and not displayed in the text box.

In an embodiment, after a neighborhood has been selected using either of described methods, the user can press the "Zoom to . . . " button or press "Enter" keyboard key to update the map view. In this embodiment, the disclosed system closes the dialog box 2404 and updates the map view accordingly. In an embodiment, if no neighborhood has been selected using dialog 2404, the disclosed system displays the "Zoom to . . . " button as disabled and any "Enter" key presses by the user are ignored.

The discussion above described one embodiment of a bookmarking feature enabled by the disclosed system. An alternative embodiment of a bookmarking feature is described below.

In various embodiments, the disclosed system enables the user to define his or her own desired destinations (i.e., map bookmarks) on the map by adding a currently-visible map area to the map bookmarks list. In one embodiment, the disclosed system enables the user to provide a description or name for an added bookmarked destination. The disclosed system utilizes the defined bookmarks to facilitate navigation, and/or to enable the user to quickly jump to desired destinations instead of needing to repeatedly manually search for destinations by panning and/or zooming the map.

In one embodiment, when in City view, the disclosed system displays bookmarked destinations as dashed outlines and destination labels on the map. An example of this display, in which three bookmarks are displayed on a single map, can be seen in FIG. 25.

Figure 25:
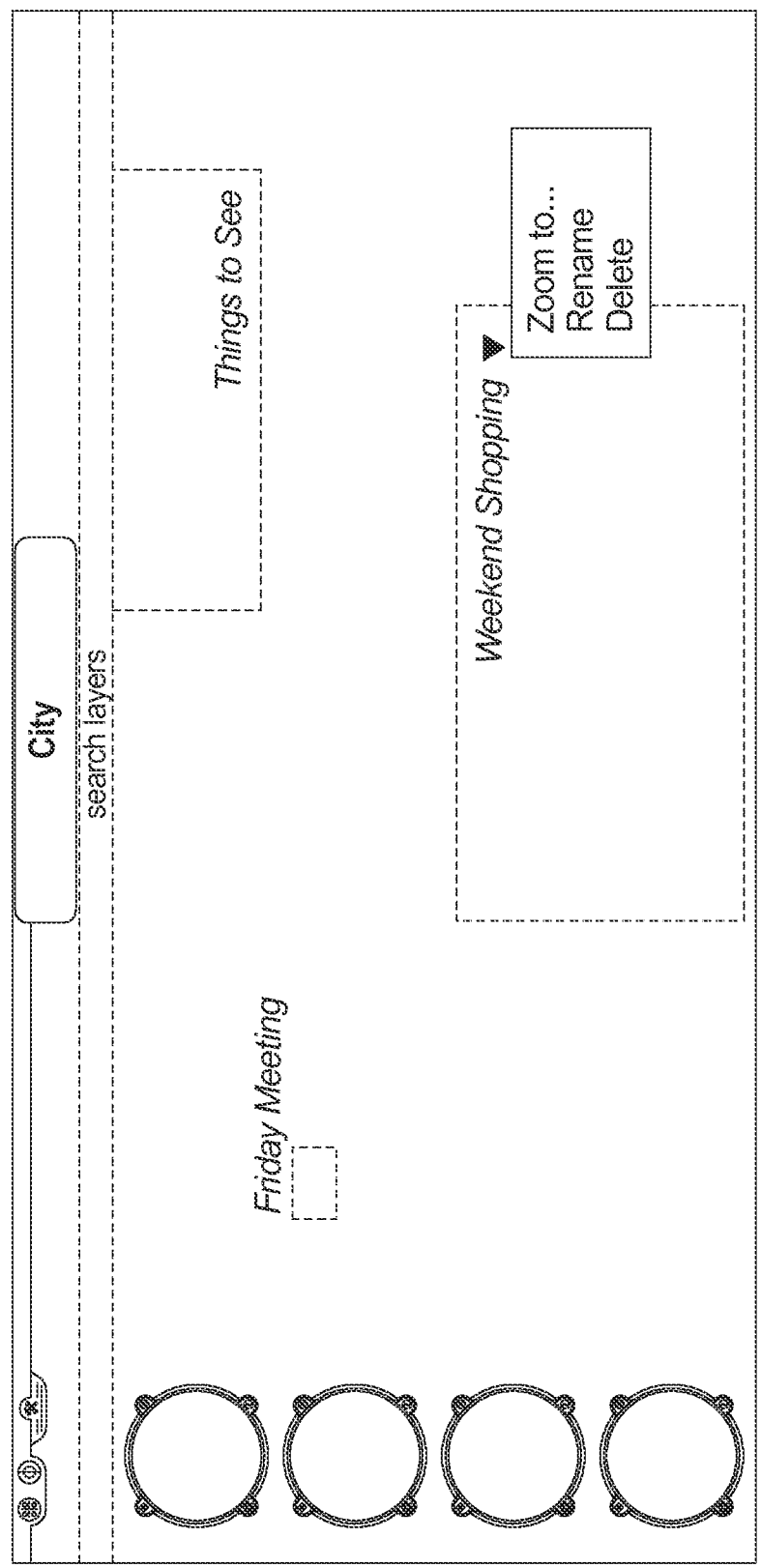
FIG. 25 is an example of a city view display of the map disclosed herein including three bookmarks displayed on the single map.

In various embodiments, the disclosed system calculates label screen coordinates and font size dynamically at run-time depending on map zoom level and position of current visible map area to make sure they are readable and don't overlap with each other. It should be appreciated that in one embodiment, such as the embodiment illustrated in FIG. 25, the outline rectangles of the bookmarked locations created at low viewing altitudes may become very small (that is, almost invisible) at high altitude. For example, the "Friday Meeting" bookmark on FIG. 25 is displayed as a relatively small rectangle. In one embodiment, the disclosed system overcomes this potential problem by setting a minimum size for outline rectangles of bookmarked locations. In an alternative embodiment, the disclosed system overcomes this potential problem by designating a particular icon to indicate that a bookmarked location is too small to indicate with a standard outline rectangle.

In various embodiments, the disclosed system handles destination labels as active map objects. In these embodiments, when a user places a mouse cursor over such a destination label, the disclosed system highlights the corresponding destination boundary and the label. In one such embodiment, clicking the label causes the disclosed system to zoom the map to the selected destination. Additionally, in one embodiment, when a label is highlighted, the disclosed system displays a pull-down menu button next to the label. An example of this pull-down menu button can be seen with regard to the Weekend Shopping label displayed in FIG. 25. In this embodiment, clicking the pull-down button opens the menu, which in one embodiment includes the following items:

Zoom to bookmark
Rename bookmark (opens bookmark rename dialog box)
Delete bookmark (opens deletion confirmation dialog box)

Figure 26:
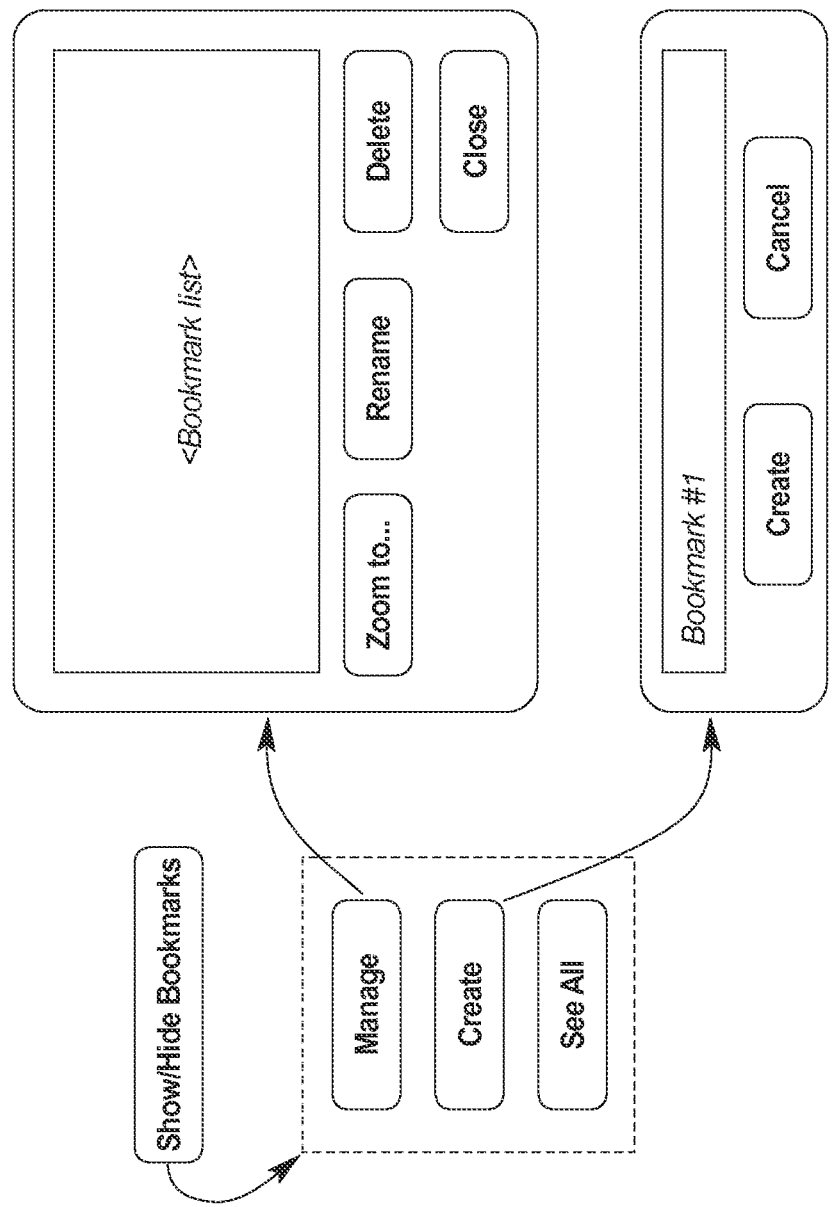
FIG. 26 is a schematic illustration of a map bookmarks control block according to one embodiment of the disclosed system.

FIG. 26 is a schematic illustration of a map bookmarks control block according to one embodiment of the disclosed system. In the embodiment of FIG. 26, Turning the bookmarks on by selecting the Show/Hide Bookmarks button causes the disclosed system to reveal a panel containing "Manage", "Create" and "See All" buttons. In this embodiment, if the system determines that the user has pressed the "See All" (or "Zoom to All") button, the disclosed system causes the map to be moved in such a way that all previously saved bookmarks are simultaneously visible inside the map window at the lowest possible altitude. It should be appreciated that this feature enables the user to choose one of saved bookmarks directly on the map by clicking over its label, and thus enables the user to quickly jump to a desired destination.

In the embodiment of FIG. 26, if the system determines that the user has selected the "Create" button, the disclosed system causes the display of a dialog box that enables the user to enter the name of a new map bookmark to be associated with current visible map area. The system enables the user to change default bookmark names for newly-created bookmarks. An example dialog for performing these changes is illustrated in the lower-right corner of FIG. 26.

In the illustrated embodiment, if the user selects the "Manage" button, the disclosed system causes the display of a dialog box to enable the user to zoom to, rename, or delete a bookmark by selecting it from a list and pressing appropriate action button. An example dialog for performing these functions is illustrated in the upper-right corner of FIG. 26.

In one embodiment, the disclosed system provides a user with access to an object locating feature (known as the Locator) that enables the user to find buildings or other physical objects (such as streets, intersections, squares, parks, etc.) on the base map by address or name and to position the map to display the object in full at the lowest possible altitude, centered inside the map window. In addition, in various embodiments, when the user is accessing the disclosed system on a GPS-enabled device, such as a smart phone, the disclosed system enables the user to determine and track his or her physical location on the city map.

In one embodiment, the disclosed system treats each located object as pinned to the map. In other words, in this embodiment, the disclosed system indicates each located object on the map until the user manually removes it by clicking over the object and toggling the "Pin" button, located inside its associated informational pop-up window.

In various embodiments, the specific way in which the disclosed system indicates a located object depends on the object's type. For example, in one embodiment the disclosed system indicates a building or site by outlining its footprint or boundaries. In one embodiment, the disclosed system indicates a street on a map by displaying a semitransparent strip, drawn along its center line. In one embodiment, the disclosed system displays an intersection and user current location by using a special sign or icon.

In one embodiment, the Locator tool enables a user to quickly position the map to display all previously located (pinned) objects. Generally, this relates not only to place and user objects discussed herein, but also to business locations that have been pinned to the map as discussed elsewhere herein.

In one embodiment, if the user provides an input to select a "Locate" button, the disclosed system displays a selection panel containing "Place", "User" and "All Pinned" buttons. These buttons in one embodiment enable a user to select the subject of the search.

In one embodiment, if the user presses the "Place" button, the disclosed system displays a dialog box with a text box control to enable the user to enter the name or address of desired place and locate it on the map via pressing the "Locate" button. In a further embodiment, when the user types a name or an address in the text box, the disclosed system generates and displays a pull-down list with the "auto-complete" suggestions if there exists one or more matching addresses or names, which allows the user to quickly select suggested option from the list without typing. In one embodiment, if the user pressed the "Locate" button but had entered an invalid (i.e., not found) name or address, the disclosed system is configured to display an error message. For example, one of the following error messages may be displayed:

1) Unknown name: "Entered Location Name not found. Please verify the spelling"
2) Unknown street: "Entered Street not found. Please verify the spelling"
3) Invalid address: "Entered address is invalid or outside the city boundaries. Please verify street number and/or direction prefix"
4) Non-existing address: "Entered address does not correspond to any known building or site. Zooming to approximate address location . . . "

In the 1st, 2nd and 3rd cases above, the disclosed system does not reposition the map, and simply displays an error message. In the $4^{th}$ case above, the disclosed system is configured to move the display of the map to an approximate address location and the location is marked on the map via special push-pin marker on the appropriate side of the street in the approximate address location. In various embodiments, the disclosed system removes the error/warning messages from display if the user re-enters a correct (i.e., found) location and again presses the "Locate" button.

In one embodiment, if the system detects that the user has pressed a "User" button, the disclosed system causes the map to be moved in such a way that user current location within the city becomes visible and is indicated on the map via special icon. In one embodiment, this feature is only available when the device knows the user's position, such as on GPS-enabled mobile devices.

In one embodiment, if the disclosed system detects that the user has pressed an "All Pinned" button, the disclosed system causes the map to be moved in such a way that all pinned locations, including buildings, streets, business markers and user current location are simultaneously visible inside the map window at the lowest possible altitude. In various embodiments, the button is disabled if there are no currently pinned locations.

As will be appreciated, streets are typically extended objects that may pass through large portions of a city. Therefore, in various embodiments, the disclosed system first uses only "point objects" currently pinned to the map, such as buildings, intersections, business markers, or user location to define initial the visible portion of the map (map viewport) and then computes final map viewport by proportionally extending the initial viewport in appropriate directions to include at least a portion of each pinned street when the user selects the "All Pinned" button. This enables the user to visually estimate the distance from each pinned street to any of pinned "point object".

One possible algorithm to compute the particulars of a map window view is outlined by the following steps:

1. Compute a minimal bounding rectangle for all point- and polygon-type objects (that is, location markers and building footprint outlines, respectively);
2. For each street object, determine the nearest to the bounding rectangle point of the street and expand the minimal bounding rectangle to include that point;
3. Compute a map view by expanding final minimal bounding rectangle obtained at previous steps relative to its center to make it proportional to current map window size and correspond to one of map zoom levels; and
4. Make sure that there are no points inside current map view located too close to its boundaries (for example, closer then 5% of the view large dimension); if at least one such point has been detected, decrease map zoom level computed at previous step and re-compute the view-port accordingly.

In various embodiments, in addition to the mechanisms for navigating the map disclosed elsewhere herein, the disclosed system also enables the user to move around the map by clicking the left mouse button and dragging, or by using the keyboard arrow keys. In one embodiment, the system enables the user to zoom in and out using either the mouse wheel or the keyboard + and −keys. In one embodiment, the disclosed system enables the user to dive in to the map (i.e., to zoom in by three scale marks) by double-clicking the left mouse button.

Figure 27A:
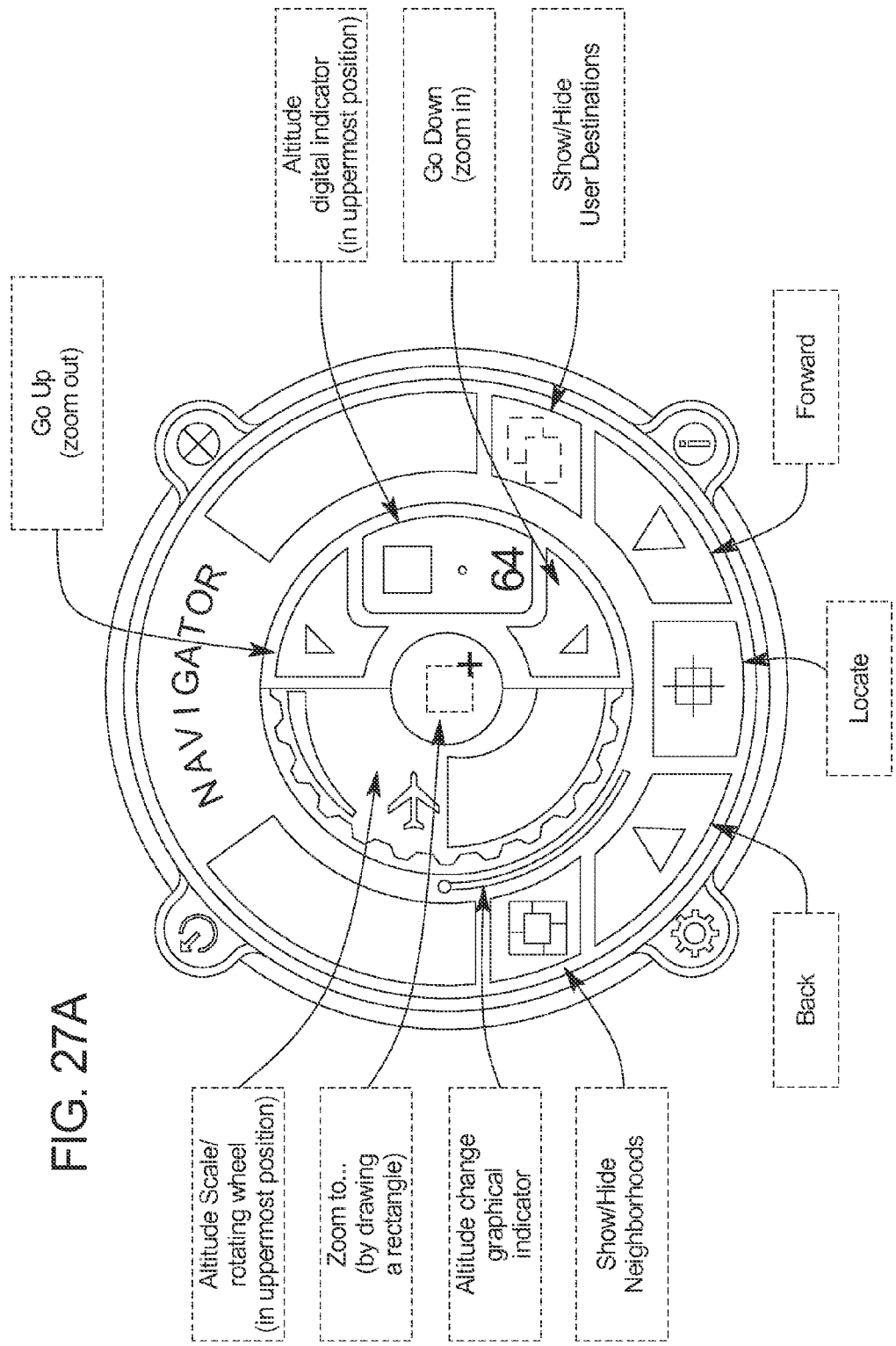
FIGS. 27a, 27b, 27c, and 27d are each schematic illustrations of various embodiments and representations of the navigator tool disclosed herein.

One embodiment of a navigator tool layout, including brief summaries of the various buttons and controls of the tool, is illustrated in detail in FIG. 27a. It should be appreciated that the embodiment of FIG. 27a is only one embodiment of the way that the various controls and functionalities described above can be implemented in a single, easy-to-use tool.

Figure 27B:
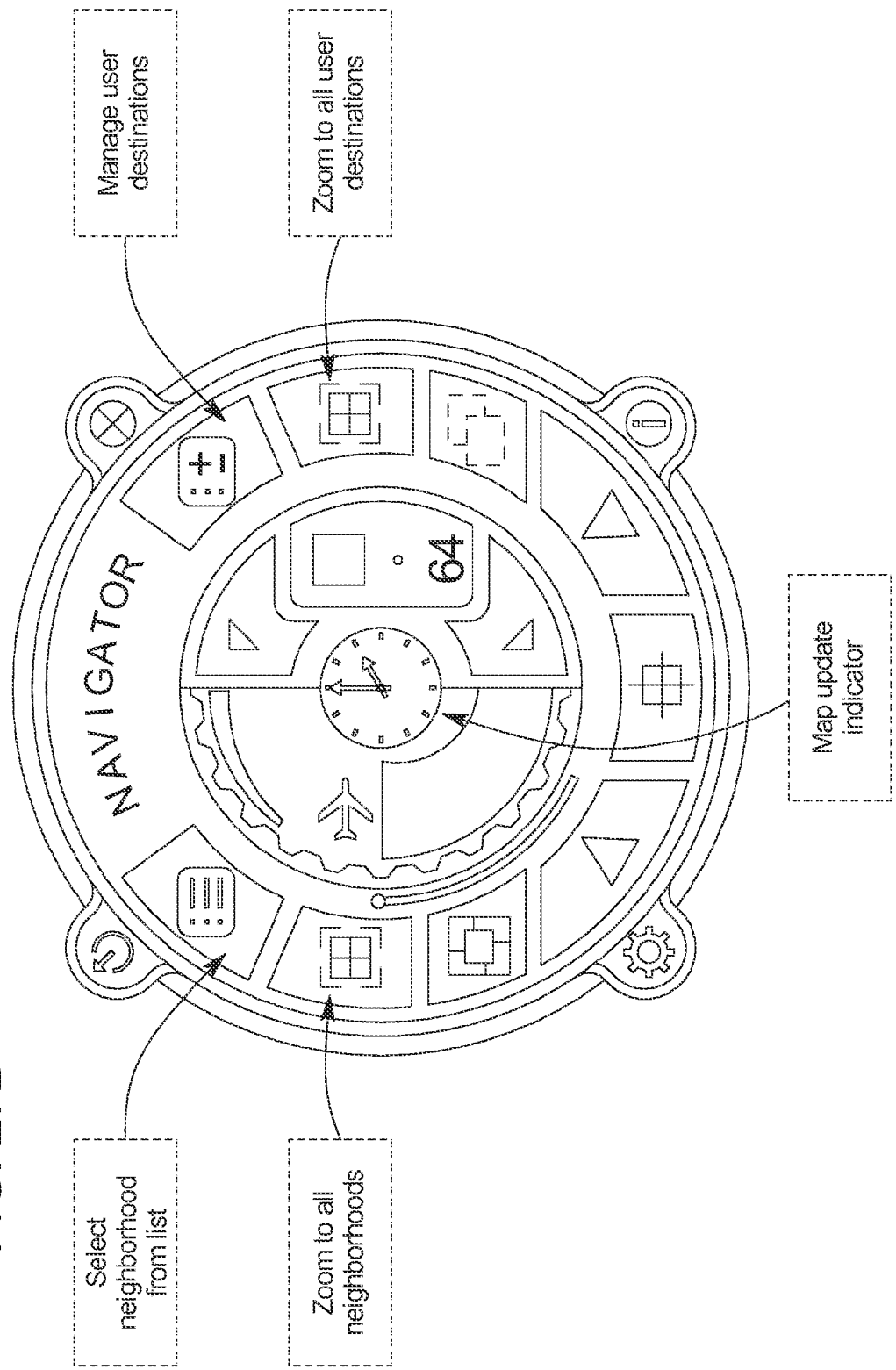

It should be appreciated that in FIG. 27a, the Navigator tool is illustrated as operating in City mode. FIG. 27b shows an example embodiment of the Navigator tool described herein in which the user has selected the "City/Neighborhood" mode button to toggle to Neighborhood mode. In this embodiment, additional functions specifically usable in Neighborhood mode are illustrated.

Figure 27C:
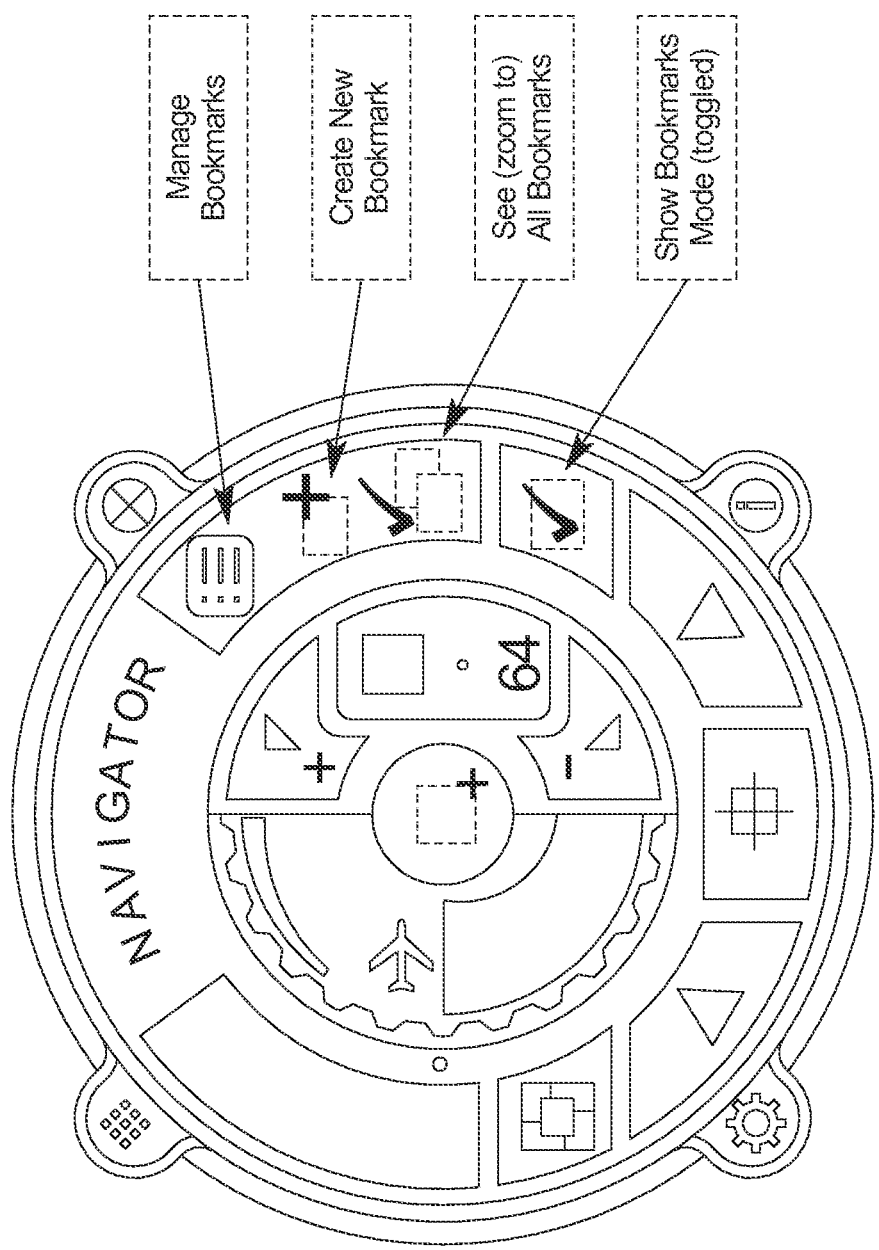
Figure 27D:
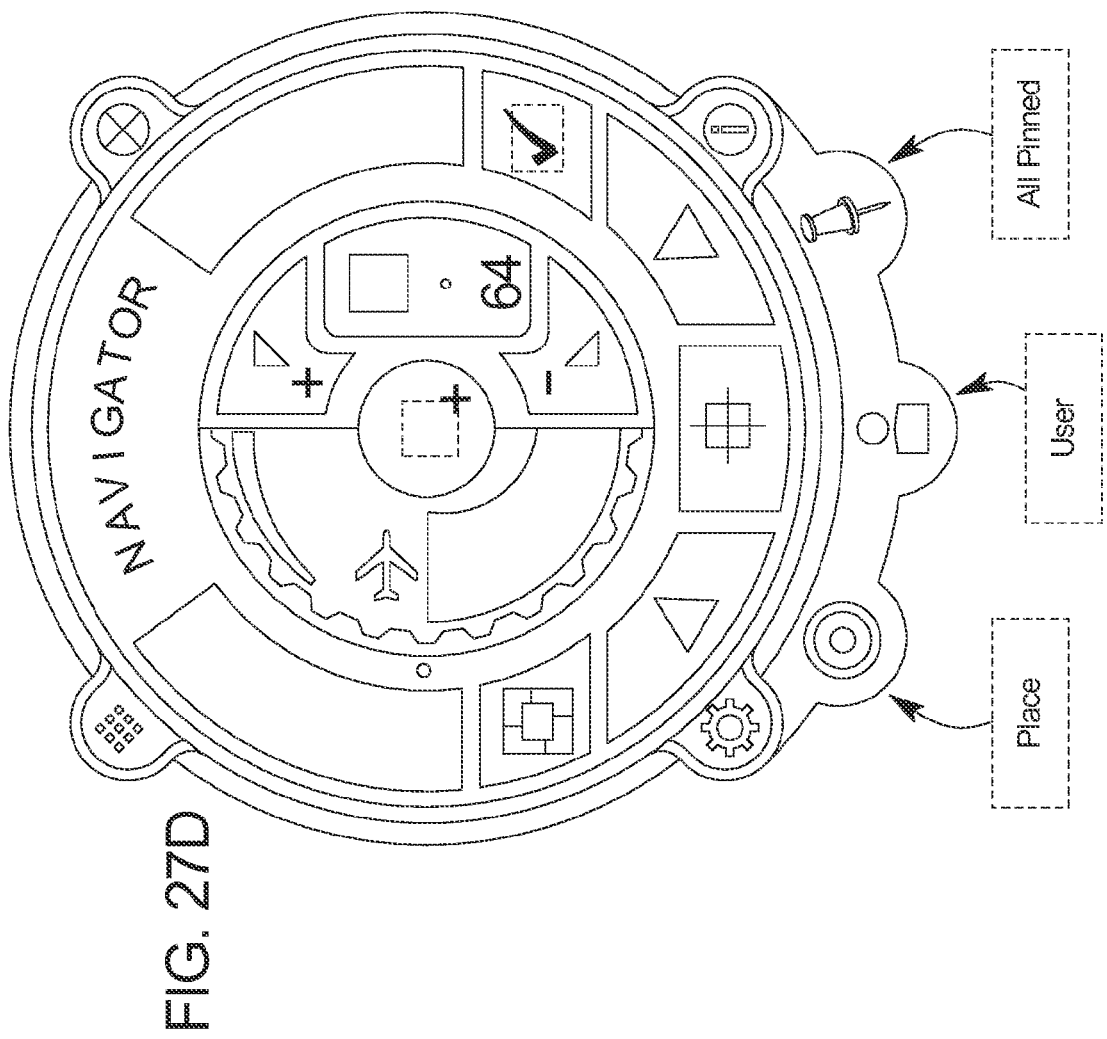

FIG. 27c illustrates one embodiment of the Navigator tool disclosed herein with the Bookmarks functions turned on. The annotations to FIG. 27c illustrate the various additional Bookmark functions that can be added to the tool when Bookmark mode is turned on. FIG. 27d illustrates one embodiment of the Navigator tool disclosed herein with a Locator extendable panel section, enabling the user to focus the map on a place, user, or all pinned locations, as described above. In various embodiments, the Locator extendable panel can be rotated about the tool itself, depending upon where on the screen the disclosed system is displaying the tool.

Referring again to FIG. 3, the last tool illustrated is the address/place locating tool 408. In this embodiment, the purpose of the address/place locating tool (referred to at various places herein as the "locator") is to find buildings or other physical objects (such as streets, squares, parks) on the map by address or name and to position the map according to the found objects. In one embodiment, this tool is not intended for searching business locations.

In the illustrated embodiment, the locator tool does not provide any functionality when it sits inside the toolbox, as illustrated in FIG. 3. It is an object with a button-like behavior, which upon a mouse click, is extracted from the toolbox and turns into a conventional search window with a text entry area and a submit or locate icon. An example of this search window is illustrated in FIG. 10.

Figure 10:
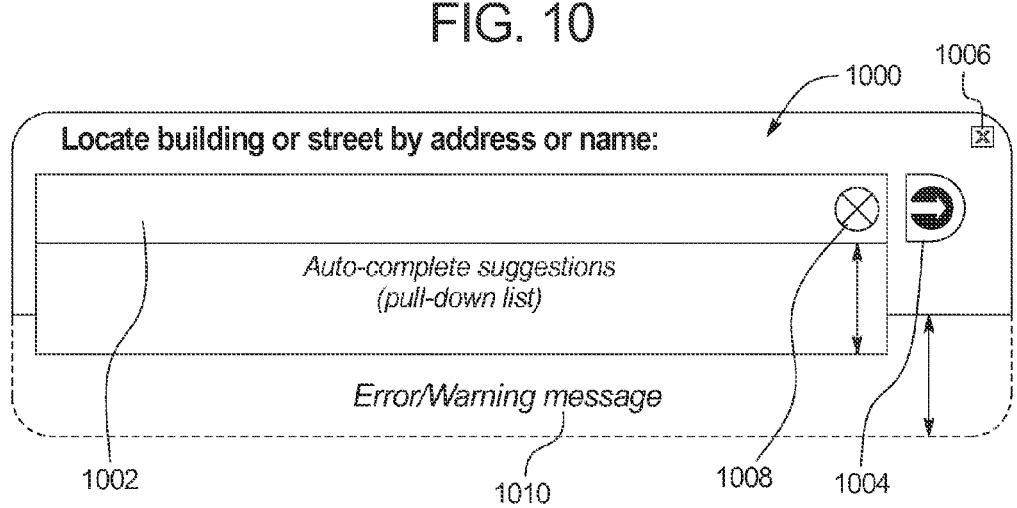
FIG. 10 is a schematic representation of example of this search window for performing location or address searches.

In the embodiment illustrated in FIG. 10, the window 1000 includes a text field 1002 for entering a place address or name and a locate button 1004 next to the text field 1002. In one embodiment, when the user starts to enter the name or address into the text field 1002, the disclosed system is configured to display a pull-down list with one or more auto-complete suggestions based on the text entered so far.

After enabling the user to enter location name/address and to press the locate button 1004, the disclosed system is configured to position the map to display the place being located. In one embodiment, the disclosed system is further configured to highlight the located object on the map. This highlighting could vary depending on the type of object being highlighted. For example, if a user is searching for a building, the disclosed system may be configured to highlight that building by animating the outline of the footprint of the building. In an embodiment, if a user has searched for a street, the disclosed system could be configured to highlight the street with a semitransparent animated stripe drawn along the center line of the searched street. In one embodiment, the disclosed system is configured to apply a similar highlight method when searching by address/place as is applied when a user clicks over an object name or address on the base map to display its informational pop-up window.

In one embodiment, the system is configured to continue highlighting a searched-for map object until the user closes the locator window using close control 1006, clicks a clear button 1008 to clear entered name or address inside the text field, enters new name/address inside the text field 1002 and clicks the locate button 1004 again. It should be noted that in one embodiment, the disclosed system is configured, if during entering off a new name/address the user presses an escape key or other key on a keyboard, to display the old name/address in the text field 1002.

In an embodiment, if the disclosed system determines that the entered name or address is invalid or does not correspond to any known building, the disclosed system is configured to expand the window downward to display an error/warning message underneath the text field in error/warning message area 1010. The disclosed system in one embodiment is configured to display the following error messages as appropriate:

Error 1. unknown name: "Entered Location Name not found. Please verify the spelling."

Error 2. unknown street: "Entered Street not found. Please verify the spelling."

Error 3. invalid address: "Entered address is invalid. Please verify street number and/or direction prefix."

Error 4. non-existing address: "Entered address does not correspond to any known building or site. Zooming to approximate address location . . . "

In this embodiment, in cases 1 through 3, the disclosed system is not configured to reposition the map. However, in this embodiment, if the fourth error above is displayed, the system is configured to focus the map at an approximate address location and to mark or indicate the focused-on location on the map with an animated marker, which may look like a push-pin, placed along the appropriate side of the street at the approximate location. In an embodiment, the disclosed system removes the area 1010 from display, and restores the size of the tool window 1000 to default when the user either enters the correct name/address and selects the locate button 1004 or selects the clear button 1008.

In various embodiments, the disclosed system is configured to provide other options by which a user can navigate a map. For example, in various embodiments the disclosed system is configured to enable a user to navigate the map using mouse buttons as movements in one or more of the following ways:

Left mouse button click & drag—pan the map

Right mouse button click & drag up or down—zoom in or out

Mouse wheel—zoom in or out

Left mouse button double click—zoom in relative to clicked map location

Right mouse button double click—zoom out relative to clicked map location

In one embodiment, the navigator tools include a zoom to location tool, in which the zoom location is specified by address or name. In this embodiment, when a location is selected, the disclosed system quickly zooms in, with the selected location being the center of the zoom target. Further, in this embodiment, the found and zoomed-to location, such as building footprint, street or place of business, is highlighted or otherwise indicated to the user on the map, and can be further pinned to the map to stay always visible.

The following description relates to an alternative embodiment of the Navigator tool. It should be appreciated that features of the embodiments described above and the following embodiments can be combined as appropriate depending upon the features and map interface desired to be presented to users of the system disclosed herein.

In various alternative embodiments, the Navigator tool disclosed herein includes five groups of map navigation functions, which are used for:

1) Controlling map zoom level,
2) Traveling along user navigation path,
3) Displaying and navigating between city neighborhoods,
4) Managing and navigating between user-defined map bookmarks, and
5) Finding places, buildings, streets, and intersections on the map and tracking mobile user current location.

In these embodiments, the zoom control functions referenced above enable a user to change current map zoom level either by using designated controls, or by outlining a desired view area, such as by drawing a target map rectangle with a pointer, cursor, or finger. In one embodiment, the disclosed system is configured to display zoom scale graduation marks to indicate perceived altitude above the ground, thus indicating the zoom level of a particular view. In one embodiment, this feature provides the user with a more realistic user experience.

In various embodiments, the disclosed system displays a zoom scale to provide a graphical indication of zoom levels used for local advertisement. In one such embodiment, the disclosed system is configured to display local ads only at certain altitudes, that is, when current map zoom level is within the local advertisement zoom range. This feature is discussed in more detail with regard to the Explorer tool.

In one embodiment, the disclosed Navigator tool provides for navigation path functions including undo/redo actions with regard to map panning and zooming, thereby enabling a user to travel back and forth along his navigation path.

In one embodiment, the disclosed Navigator tool provides for neighborhood functions that enable a user to display city neighborhood boundaries on the map, as well as quickly locate and zoom to a neighborhood on the map.

In one embodiment, the disclosed Navigator tool provides for map bookmarking functions to enable a user to define his or her own named destinations on the map by adding currently visible area to user bookmark list. In a further embodiment, map bookmarks are further used to quickly zoom to a desired destination instead of manually searching for it on the map, via panning and/or zooming.

Finally, in one embodiment, the disclosed system provides for map locating function to find buildings or other physical objects, such as streets, squares, parks, or locations of specific businesses and institutions on the base map by their addresses or names. Additionally, via use of this function mobile PC users can spot their current location on the map and optionally track it in real time as they walk or drive around the city. Found locations are highlighted or otherwise indicated on the map via special markers, and can be further pinned to the map for subsequent use.

The following discussion provides more detailed description of various aspects of the Navigator tool discussed briefly above.

In one embodiment, the Navigator tool provided by the disclosed system includes a zoom level or altitude control with the following interface elements:

1) altitude scale, equipped with zoom level slider and zoom range indication;
2) up/down buttons;
3) current altitude digital indicator;
4) altitude change graphical indicator (displayed only during zoom level changes);
5) "zoom to"-mode activation button; and/or
6) map update progress indicator (displayed only during map updates).

It should be appreciated that in various embodiments herein, references to "zoom level" may also be understood to be referring to the altitude above a map.

In a presently preferred embodiment of the zoom control of the disclosed Navigator tool, the disclosed system scales the altitude (or zoom level) on an exponential scale with $\sqrt{2}$ used as a zoom step amount. In this embodiment, the disclosed system uses a minimal altitude value of $(\sqrt{2})^{-5}$, which in a specific embodiment corresponds to approximately 0.177 miles above the ground. In various embodiments, the actual value of perceived altitude depends on several factors, such as:

map imagery spatial resolution (measured in pixels/distance unit)
display resolution in pixels
display physical dimensions
distance from the display to user eyes In various embodiments, the actual value of perceived altitude can be calculated using the following general formula:

$$\langle\text{perceived-altitude}\rangle = \frac{\langle\text{display-resolution}\rangle}{\langle\text{imagery-resolution}\rangle} * \frac{\langle\text{user-to-display-distance}\rangle}{\langle\text{display-size}\rangle}$$

In the formula above, the <display-resolution> and <display-size> variables are set to values measured based on either the vertical or horizontal side of the display. Put another way, the disclosed system in one embodiment computes the altitude by using a full-screen projection of a real-world object onto a computer display surface, as it would be viewed by a user when the object is located far behind the plane of the display surface.

In one embodiment, to compute perceived altitude, the disclosed system relies on a formula using a projection of an imaginary real-world object onto a computer display surface, as it is seeing by a user, wherein the object is located far behind the screen. It should be appreciated that actual altitude may vary from case to case, while at the same time, certain parameters plugged into the formula (such as, for example, <user-to-display-distance>) simply cannot be obtained automatically to compute the altitude dynamically at run-time. Therefore, to make things easier, in one embodiment the Navigator Tool uses typical average value of perceived altitude at map highest zoom level, rounded to the value of the nearest integer power of √2, while all other altitudes are computed using a proportion. In one embodiment, the disclosed system uses imagery of approximately 3 pixels/foot resolution at highest zoom level. For a desktop PC setup typical <display-resolution> value is equal to 96 dpi (or 1152 pixels/foot), which corresponds to a 23" display at 1920×1080 pixel resolution, and <user-to-display distance> is about 2½ feet. Under above considerations the <perceived-altitude> value at highest zoom level according to the formula is equal to 960 feet 0.18 ml, or (√2)-5 after rounding to a nearest power of 12. The rounding condition makes the scale easy to read, since in this case half of scale graduation marks correspond to simple fractions and integer values. As a result, the altitude scale can be graphically represented by the following sequence of mileage marks:
•¼•½•1•2•4•8•16•32•64•

In the scale represented above, the "dots" correspond to irrational altitude values, such as (√2)$^{-5}$, (√2)$^{-3}$, (√2)$^{-1}$, (√2)$^3$. It should be appreciated that the dots are used instead of the irrational altitude values because the numbers are not as aesthetically pleasing as simple integers.

In an embodiment relying on the scale reproduced above, the disclosed system uses 19 gradation marks, which have been found to be sufficient to display the map of a large city at a necessary low zoom level. Nevertheless, the number of gradation marks may vary depending on a city size and/or a desired range of lowest to highest zoom levels, as is appropriate for a particular implementation.

Since the scale uses intermediary "dot"-like graduation marks, in various embodiments it may be necessary to display at least 3 consecutive graduation marks at a time in current altitude digital indicator so a user could always see the "context" of current altitude when it happens to be set to one of intermediate values.

In one specific embodiment, the altitude scale is graphically divided into the following ranges:

[¼/√2:8*√2] mi: Interactive ad display mode. In this mode business ads are displayed on the map as interactive markers; a user can explore associated ads by clicking over markers. In this embodiment, the above-noted range is further subdivided into two sub-ranges:

[¼/√2:√2] mi: Local ad display sub-mode. At these altitudes both city- and local-scope ads are displayed as interactive markers;

[2:8*√2] mi: City-scope ad display sub-mode. At these altitudes only city-scope ads are displayed as interactive markers, while local-scope ads are displayed as non-interactive dots;

[16:64*√2] mi: Survey ad display mode. At these altitudes, all ads (both local- and city-scope) are displayed on the map as tiny non-interactive dots; Survey mode allows a user to visually estimate spatial distribution of large number of businesses of specific type across the city without "over cluttering" the map image with larger size map markers.

Figure 30:
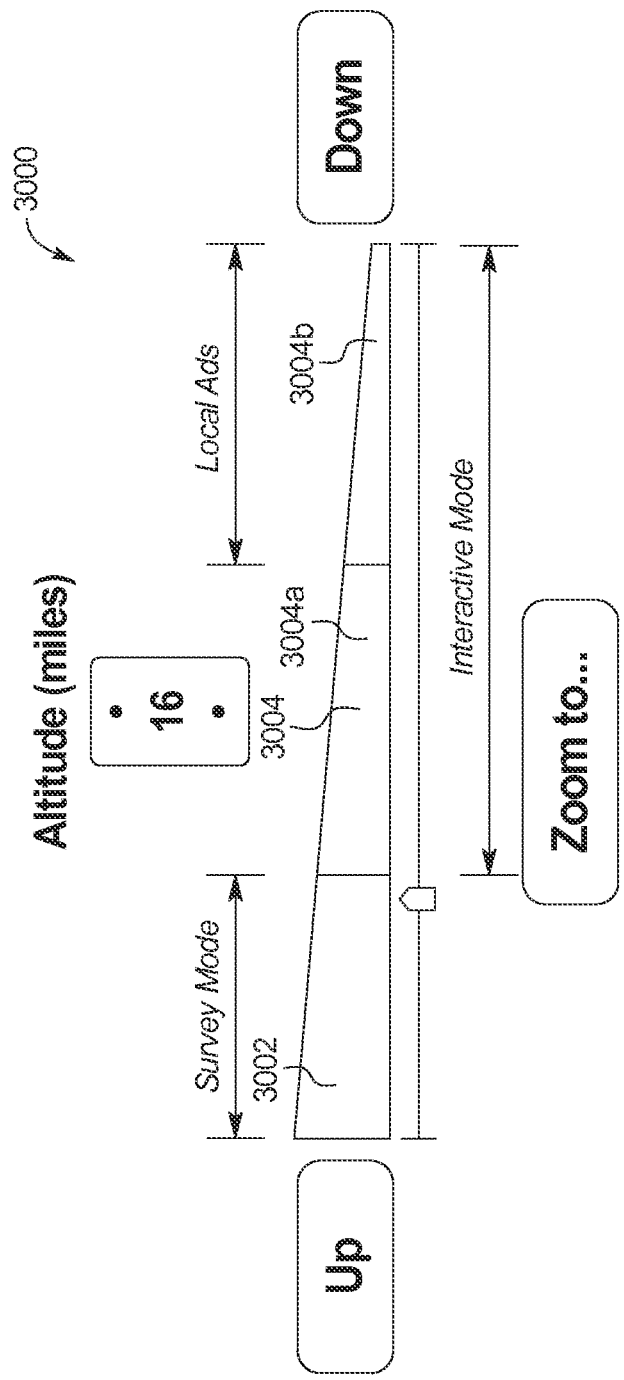
FIG. 30 is an illustration of an example altitude or scaling control that can be displayed by certain embodiments of the system disclosed herein.

In various embodiments, altitude ranges can be expressed on a scale via color changes, font differences, or other suitable mechanisms. FIG. 30 illustrates one exemplary scale 3000 usable to illustrate altitude ranges. In this figure, scale portion 3002 refers to an altitude range in which the map is being operated in survey, or read-only, mode. Portion 3004 refers to an altitude range, spanning two colored regions 3004a and 3004b, in which the map is in so-called interactive mode. Finally, portion 3004b refers to an altitude range in which local ads, as described elsewhere herein, are visible to the user. In the illustrated embodiment, portions 3002, 3004a, and 3004b are displayed in different colors, such that a user can easily determine the height of the view of the map. In various embodiments, described altitude ranges are indicated on the scale via color, font or other suitable methods.

For notebook and tablet PCs <display-resolution> and <user-to-display distance> values may differ. Nevertheless, considering that users generally keep their device displays at such eye distance, that the angle of display view remains substantially constant, the altitude scale shown above remains applicable for these devices as well. This follows from the fact, that the formula used earlier to calculate <perceived-altitude> can be rewritten as follows:

$$\langle\text{perceived-altitude}\rangle = \frac{\langle\text{display-pixels-count}\rangle}{\langle\text{imagery-resolution}\rangle * 2 * \tan\left(\frac{\langle\text{display-view-angle}\rangle}{2}\right)}$$

where <display-pixels-count> and <display-view-angle> can be measured either along horizontal or vertical side of device display. In either case, provided that <display-view-angle> remains constant, it follows, that <perceived-altitude> value depends only on <display-pixels-count> along selected side of the display and resolution of used map imagery (<imagery-resolution>). Hence, the altitude scale presented above can be used without modifications at any display device having 1920×1080 or close to it pixel resolutions regardless of its physical dimensions.

Use of displays with other pixel resolutions may be compensated by use of map imagery of appropriate resolution in order to achieve the same perceived altitude on different display devices. Therefore, in order to minimize the number of map imagery sets required to display the city map at different altitudes on various display devices, all devices are organized into groups by to their horizontal pixel resolution.

In one particular embodiment of the disclosed system, the Navigator tool enables users to select from zoom levels that correspond to a maximum altitude of four miles. It has been found that the four mile altitude enables an "average size" neighborhood to be displayed in full scale inside a map window of an average display device with standard display resolution. In this embodiment, the disclosed system indicates the various zoom levels enabled by using a color-coded scale, changing fonts, or other suitable mechanisms for indicating a continuum or scale.

In one embodiment, the disclosed system displays a slider to indicate the current scale, as well as the top and bottom scales possible with the particular map being viewed. In other words, in this embodiment, the slider provides a visual representation of the distance between current and previous positions of the altitude scale slider.

In one embodiment, the altitude change displayed to the user changes as the user drags or alters the slider. In another embodiment, the disclosed system only displays the change in altitude after the user releases the slider, such as by releasing a mouse button or picking up his or her finger or stylus. If this single-change methodology is implemented by the disclosed system, the altitude change graphical indicator can be especially helpful, since it allows the user to estimate the extent of altitude change before releasing the slider. In one embodiment, the choice of whether to continually change the altitude or to change it only once can be determined, based in part, on the speed of a user's internet connection or computer processor speed and capability.

In various embodiments, the disclosed system provides both a slider and a pair of "up" and "down" buttons to enable the user to alter the altitude at which the map is viewed. In these embodiments, while the slider can be used for coarse altitude control, the "up" and "down" buttons are more suitable for fine altitude adjustments. In a further embodiment, the disclosed system provides a "zoom to" button." When the user selects this button, the disclosed system in one embodiment enables the user to indicate an area of the map to which to zoom. In an example embodiment, the system provides the user with a rectangle control that the user can use to draw a box around an area of interest on the map. In this embodiment, upon detecting that the user has drawn the box, the disclosed system zooms to the appropriate altitude to display the area of the map indicated by the user.

In one embodiment, the disclosed system provides a pair of buttons, such as "Back" and "Forward" buttons, to implement a so-called navigation path function. In one such embodiment, the disclosed system defines a navigation path for a particular user session, and constitutes a sequence of map viewing positions. For example, in one embodiment the disclosed system tracks the last 50 map positions, such as movements of the center of the map or altitude changes that a user has accessed. In this embodiment, each position is stored as an altitude and a map position. When the system determines that the user has selected either the "Back" or "Forward" button, it changes the altitude and map position to match the appropriate stored point on the navigation path. In this embodiment, the disclosed system advantageously enables a user to re-trace his or her experience with the map, to return to previously-visited views.

Map "Find it" Tool (Explorer)

In various embodiments, the map "find it" tool, also known as the explorer tool, enables a user to discover or find various objects of his/her interest on the disclosed computerized map display system according to a given search criteria. This tool in various embodiments also enables the user to survey information about each found object in a pop-up ad, associated with the map marker for a found object.

In one embodiment, the explorer tool provides a plurality of functions tailored to exploring different kinds of objects, such as business and public locations, featured deals and special offers (bound to their associated locations), and social and business events and activities (bound to their venues).

The features enabled by various embodiments of the "find it" or explorer tool are described in more detail below.

In one embodiment, the disclosed system provides a tool that enables a user to search by category. In this embodiment, all objects that can be displayed on the computerized map disclosed herein are divided into generic categories, each of which includes more specific sub-categories. In one embodiment, each category has a designated color. Objects of one category are displayed on the map via markers of the same color, regardless of their sub-category. In one embodiment, there are only a handful of top-level categories, so the colors for the top-level categories are distinguishable on the map and can be easily kept in mind by the user navigating the map. In a simple case, the user can search for specific kinds of objects by selecting a sub-category of a certain category. Therefore, in an embodiment, a basic search-by-category tool can be used to display objects within a single category or a single sub-category within a single category.

In one embodiment, the explorer tool of the disclosed system enables the simultaneous display of multiple different advertisements to enable comparison of the elements of the map to which the advertisements pertain. In one embodiment, the disclosed system uses several map markers of simple geometric shapes, which are easy to see and well distinguishable from one another. In this embodiment, the map marker shape indicates the type of commercial or advertisement associated with the marker. Further, the type of ad reflects its "value", which is correlated with ad content (from simple tag-line to full-featured multimedia showcase), ad display size (from tiny "placards" to large "storefronts"), and/or map marker visibility scope (from local/neighborhood to city-wide ads). In one embodiment, therefore, the shape of the map marker, coupled with its color, indicates the type and category of an associated ad.

The explorer tool in one embodiment enables searches to be layered on top of one another on a single map to provide a more robust search experience. In this embodiment, the disclosed system enables a user to perform several basic searches for a single map, and displays the results of the several searches as layered over one another. Specifically, based on the searches, the disclosed system is configured to display several sets of map markers, each set of which contains objects of one subcategory. Among these marker sets one of the sets is designated as a current search set. The user can add or remove marker sets to/from the map, as well as set any marker set as current, to further expand or refine the universe of search results. In one embodiment, object markers that belong to the current marker set are displayed as opaque, while all other (secondary) markers not part of the current set are displayed as semi-transparent. This advantageously improves the overall map readability, focusing the user on the current subcategory, while at the same time enabling the user to see locations of objects from other subcategories relative to the current one. The display of secondary marker sets is an optional feature, and is not present in all embodiments of the disclosed system. If this feature is disabled, only the current set of markers is displayed over the map, while all other markers remain hidden until the user makes them active.

In various embodiments, the disclosed system also enables standard searches to be altered to further enhance a user's control over a set of search results. In one embodiment, a basic search, which normally displays on the map all objects of a specific subcategory, can be further refined by setting constraints on one or more object property values. Specifically, in this embodiment, each sub-category has its own set of object properties, specific to that sub-category. Object properties typically take one of the following forms:

Binary "true"/"false" ("yes"/"no") values—enables setting "has . . . /is . . . " or "has no . . . /is not . . . " kinds of constraints;

Numeric values—enables to set "less/more then . . . ", "is equal to . . . " or "within a range of . . . " kinds of constraints;

A small set of predefined values—enables to set "one of . . . " or "some of . . . " kinds of constraints; and A text string—enables setting "matches/contains keyword . . . " kinds of constraints.

It should be appreciated that search filters advantageously significantly narrow the search results returned to the user due to discarding all objects that don't match specified search criteria.

Various embodiments of the disclosed system also provide for so-called fuzzy search constraints. In one embodiment, with fuzzy search options set over property constraints, search results can be visually arranged on the map by their relevance. Unlike regular constraints, which have to be matched during search, fuzzy constraints may not be exactly matched. Instead, a fuzzy search option, set over a specific property, changes a search from imposing "must have" or "must not have" constraints to imposing "prefer" and "avoid" constraints. Consequently, in one embodiment, the explorer tool enables a user to generate search results that include objects of one sub-category that match all regular constraints, and zero or more fuzzy constraints.

In various embodiments, the disclosed system displays search results by their relevancy by using map markers of different sizes. In one such embodiment, objects that match more fuzzy constraints then others are indicated on the map with relatively larger sized markers.

Visual arrangement of search results by their relevancy is accomplished by tweaking the appearance of location markers. The disclosed system is capable of implementing two different approaches to display the results of a fuzzy search. In the first approach, objects that match fuzzy search constraints are indicated by size, wherein the closer the search result is to the actual search parameters, the larger the object marker. This approach advantageously enables the indication of a "level of closeness" by the marker size, and does not require the use of additional markers. In another approach, the disclosed system attaches an additional tag to a location marker to indicate particularly close fuzzy search results. For example, if a map object matches all fuzzy search criteria, an additional icon, such as a star icon, can be displayed in the upper right corner of a map marker to indicate that the result is particularly likely to be relevant. This approach has the advantage that the objects that are particularly relevant are quickly recognizable at a glance, the approach works well with all kinds of markers (including icons), and the meaning is very easy to understand.

In one embodiment, the disclosed system displays search results by their relevancy by using four- and eight-point star tags. In such embodiment, objects that match all fuzzy constraints are tagged on the map with eight-point stars, while objects that match at least one fuzzy constraint are tagged with four-point stars. This approach advantageously enables the indication of a "level of closeness" by tag shape.

The following is an example of the usage of fuzzy searching in one embodiment of the system disclosed herein. In this example, the user wants to search for Chinese restaurants, which preferably offer special deals, but still may consider other restaurants that don't currently offer any deals. To perform this kind of search the user selects the "Cuisine" and "Special Deals" properties of the "Restaurants" subcategory, and specifies that the user is willing to apply the fuzzy search option to the "Special Deals' property. In a more formal statement of the search, the following description may apply: (REQUIRE Cuisine='Chinese') AND (PREFER Special_Deals =='yes'). In one embodiment, upon receiving this request, the disclosed system is configured to cause the display of map markers for all Chinese restaurants in a given area. Further, in this embodiment, using the "variable marker size" method of displaying fuzzy search results, those restaurants that offer special deals will be indicated using larger markers. If the "marker tagging" method is used, the restaurants that offer special deals, will be tagged with the special fuzzy searching marker.

In another embodiment, the disclosed system enables a user to provide the following, pseudo-formal language search:

```
SEARCH FOR Restaurants:
(REQUIRE Cuisine IN ['Chinese','Korean']) AND
(PREFER Pricing <= '$20') AND (PREFER Special_Deals=='yes')
```

In this embodiment, if the user asks the system disclosed herein to perform the search described above, the disclosed system will display map markers of all Chinese and Korean restaurants in the visible portion of the map. In this embodiment, the disclosed system tags restaurants that are both inexpensive and offer special deals with 8-pointed star markers. Further, in this embodiment, the disclosed system tags restaurants that are either inexpensive or offer special deals with 4-pointed star markers. Finally, in this embodiment, the disclosed system does not tag restaurants that are neither inexpensive nor offer any special deals.

It should be appreciated that though use of fuzzy search options broadens search results, it helps to avoid "missed targets." Specifically, since search constraints (e.g., user preferences), as a rule, are contradictory, it may be hard for a user to decide beforehand which of them (if any) are more important than others. In fact, if a final decision depends on actual search results, it is usually made in a relatively subjective manner after all found objects have been explored and compared. Thus, fuzzy search options provide significant advantages over searches in which binary yes or no decisions are made regarding whether a match occurs.

In various embodiments, the disclosed system also enables a user to perform a keyword search using the explorer tool. In an embodiment, keyword searches provide an alternative way to find objects of one sub-category by looking for matches between the objects and one or more user-specified keywords. In contrast to search by category, which begins with the selection of a specific sub-category, and is followed by setting constraints on the sub-category object property values, keyword search accomplishes the same task in reverse order.

In one embodiment, the keyword search algorithm comprises the following three basic steps:

First, in this embodiment, entered keywords are matched against all category titles and property names and values stored in a database associated with the map, in order to determine the implied target sub-category and form its accompanying search criteria (property value constraints). To ensure good quality of recognition, word matching typically involves the use of word forms, synonyms and antonyms of entered keywords. This usually results with more than one sub-category that can be potentially treated as a search target. Moreover, sometimes search criteria for a sub-category may not be uniquely determined. This happens when some keyword can be interpreted as a value of more than one property, that is, these properties have identical or intersecting domains. In this case, the sub-category may have several alternative search criteria attached to it.

Second, in the above-described embodiment, all found sub-categories are tested against each of their accompanying search criteria. If a search test renders an empty result, a corresponding search criterion is detached from a sub-category and discarded. By the end of search tests, those sub-categories that have no attached search criteria are discarded from the list of potential targets.

Third, in the above-described embodiment, the list of remaining sub-categories is given to the user for interactive selection of the sub-category of the user's choosing. After a target sub-category has been chosen, if there is more than one search criteria attached to it, the user will be asked to choose the correct one. In one such embodiment, this choosing step is implemented as an interactive step-by-step questionnaire, wherein a list of alternative interpretations will be offered for each keyword in question. After that corresponding set of property value constraints is applied to the subcategory, matching objects are displayed on the map. In the same manner, the user can select several target subcategories, in which case each subcategory will be displayed as a separate search layer.

In various embodiments, as discussed elsewhere herein, multiple objects can be grouped together according to the disclosed system to avoid clutter and simplify a user interpreting search results. In one such embodiment, to avoid marker cluttering at low map zoom levels, several overlapping markers are grouped into one single marker and displayed as that single marker. In various embodiments, the shape of a group marker is inherited from the shape of the most "significant" advertisement in the group of markers that comprise the group marker. Likewise, in one embodiment of the tool including a fuzzy search function, the size of a group marker is determined based on the size of the most relevant group member, while its shape is set to the shape of the most "significant" advertisement among the advertisements having the highest relevancy.

In one embodiment, group marker appearance is inherited from child markers as according to a predetermined set of inheritance rules. Specifically, in this embodiment, a group marker always has the same color as group members, since it groups only markers belonging to the same subcategory (and thus necessarily the same category). In this embodiment, the shape of a group marker is determined by the shape the most "significant" ad within the group. In a specific embodiment for the four types of advertisements discussed herein, the order of significance is defined as diamond, bubble, target, and doughnut (in this order). In this embodiment, if the visibility of unmatched locations option is set to "On", group marker is displayed as hollow when all markers within the group are hollow (i.e. all of them designate unmatched locations). Hollow markers can have either circle or rectangular shape, which is determined by the shape of the most "significant" ad within the group. In one embodiment, the size of a group marker is set to the size of the most relevant group member (i.e., the size of the biggest marker within the group). In addition, in one embodiment, the group marker is treated as tagged or pinned if at least one group member is tagged or pinned. In an embodiment for fuzzy search mode, a group marker inherits the shape of the category of the markers that appear most often in the group. In an embodiment, the outline of a group marker is displayed, and the marker indicated as "visited," only if all group members are outlined (i.e., have been already visited).

In some embodiments, group marker appearance is inherited as follows:

(1) Tag (fuzzy search "best choice" and "preferred" locations): group marker is tagged if at least one group member is tagged. The type of tag (8- or 4-pointed star) is determined by the type of most relevant group member: 8-pointed star or 4-pointed star (in specified order).

(2) Static Outline (visited location): group marker has static outline (marked as "visited"), if all group members have static outline (have been already visited and are not currently being compared via the Ad Browser).

(3) Body animation (current location indicator): group marker body is animated (sparkle/glow effect) if one of its group members is current (that is, it has open Ad Browser window of current search layer associated with the marker).

(4) Animated outline (compared location): group marker outline is animated (pulsation effect) if at least one group member outline is animated (that is, the child marker is associated with one of the compared locations of current search layer). In addition, if a group marker contains two or more compared markers, the total number of such markers within the group is indicated at the bottom-right corner of the group marker. In an embodiment, group marker numbering ensures that the user will quickly identify all compared locations on the map instead of trying to find missing markers, if the number of visible markers doesn't match with expected number.

Figure 11:
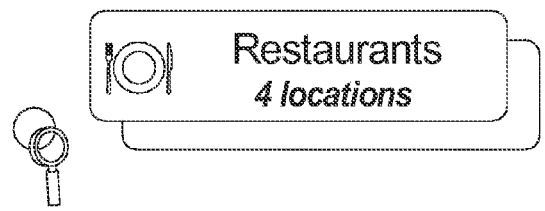
FIG. 11 is a schematic representation of a group marker representing four restaurant locations displayed with the appropriate magnifier icon.

In various embodiments, users can identify group markers on the map by the shape of mouse cursor placed over it. Unlike regular (non-group) markers, which cause the mouse cursor to change its shape to "hand", group markers in one embodiment cause the cursor take a "magnifier" shape. The Location Sign pop-up box, displayed on mouse-over contains the name/icon of the relevant subcategory and the number of locations grouped under the marker (pin function is not relevant for group markers). An example of this configuration is displayed in FIG. 11, in which a group marker representing four restaurant locations is displayed with the appropriate magnifier icon.

In one embodiment, if a user clicks on a group marker, the disclosed system is configured to cause the display of the Magnifier pop-up tool in place of the ad browser tool, which is opened in case of click over regular map marker. The magnifier tool, when opened, provides a local view of the zoomed map underneath its magnifier area so that the user can see the locations, hidden under a group marker, as standalone regular markers.

In one embodiment, the disclosed system does not enable pinned location markers to be members of any marker group. In this embodiment, if the user pins a location within a group that has been accessed via the magnifier tool, the system is configured to exclude that pinned location from the group and instead to display that pinned location as a standalone subcategory icon near the group marker as soon as user closes the magnifier. Spatial location of the group marker on the map may slightly change to avoid intersection with extracted pinned location icon.

In one embodiment, at least one function in the explorer tool enables so-called object pinning. In this embodiment, objects of a user's interest can be pinned to the map. In this embodiment, the disclosed computerized map system always displays the pinned items, even after the user has determined to clear the search results or has changed the search criteria. In one embodiment, when an object is pinned to the map, its marker is replaced with a corresponding sub-category icon to enable easy identification of the object. In various embodiments, each subcategory of the disclosed computerized map has its own unique icon, with a prevailing color that matches the color of a parent category. In these embodiments, the unique icon and/or prevailing color are used to display the pinned object, according to the kind of object that is pinned. In special cases, such as cases in which a company has paid an additional fee, a pinned object may also be marked via the logo of associated company, place or event, etc. It should be appreciated that the object pinning feature enables a user to create custom maps, which contain specific objects that are important to the user with respect to his goals.

Figure 28:
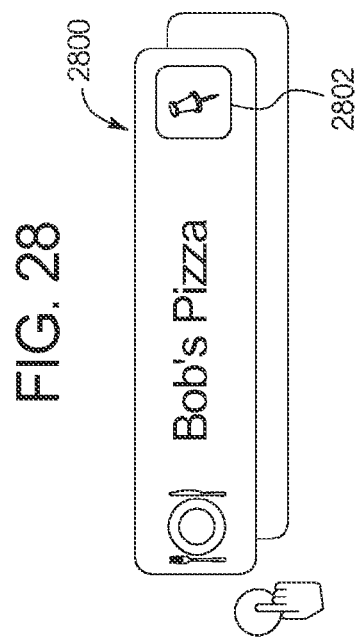
FIG. 28 is a schematic illustration of a control to enable pinning without opening an ad browser tool window.

In various embodiments, the pinning feature enables a user to create custom maps, which contain specific pinned locations that are important to the user. In one embodiment, pinned locations always stay visible on the map, even after clearing search results or changing search criteria. In various embodiments, after a location has been pinned to the map, its marker is replaced with corresponding subcategory icon. In one such embodiment, each subcategory of each category provided by the disclosed system is associated with its own unique icon, with a prevailing color that matches the color of a parent category. In certain embodiments, the disclosed system enables a pinned location to be marked with the logo of associated company, place, event, or other appropriate logo. In one embodiment, the disclosed system enables a user to pin or unpin a location either using special button of the ad browser tool, as discussed elsewhere herein or using a pinning shortcut button which is displayed inside the location sign pop-up box. An example of this is illustrated at FIG. 28, in which the location sign pop-up box 2800 for "Bob's Pizza" is shown with a pin shortcut button 2802. In this embodiment, selecting the pin shortcut button 2802 causes the map element for Bob's Pizza to be pinned, without the need to open the ad browser tool.

In one embodiment, so-called location signs are small informational pop-up boxes that the system automatically displays when the user places a mouse cursor over a location marker. In this embodiment, a location sign displays a location name, a subcategory icon, and may also include one to three lines of additional information, placed underneath the name, such as working hours, slogan or catch-line, short promotional message, etc.

In various embodiments, location signs for primary markers, that is, the markers that belong to current search layer feature the "Pin" button, which enables a user to quickly pin a location to the map. On the contrary, location signs for secondary markers, that is, the markers, that don't belong to current search layer, feature the "Show Ad" button. In one embodiment, this difference is due to the way the disclosed map system manages the display of ads associated with different search layers. In particular, though a user may have separate Ad Browser windows opened for each search layer, only the window associated with current search layer is actually displayed over the map, while all other windows are hidden (minimized). In this embodiment, to display the ad window associated with a foreign marker (that is, the marker of non-current search layer), the user first has to set the layer for the foreign marker as current by clicking over the layer tab. In this embodiment, the provision of a "Show Ad" button of the Location Sign provides a convenient shortcut to make the layer of that particular ad the current layer. In an embodiment, this can also be accomplished by double-clicking over a foreign marker. In one embodiment, opening ad windows associated with foreign markers, via a single click is intentionally disabled in order to prevent sudden layer toggling, caused by accidental clicks over foreign markers.

In various embodiments, Pinpoint ads, unlike other types of ads discussed herein, do not have associated pop-up windows or any other specific information to display to a user. Therefore, in certain embodiments, location signs for pinpoint ads include only the name of associated subcategory and the word "Unlisted" used in place of a business name.

In one embodiment, location signs associated with group markers include the name and icon of the associated subcategory, the number of locations within a group, and a "Magnify" button, used to activate the Magnifier Tool. In this embodiment, the Magnifier is a floating gadget that the system enables the user to move and position over any portion of a displayed map. In this embodiment, the Magnifier tool provides a zoomed view of the map underneath the tool, enabling the user to see individual locations represented by a group marker.

In various embodiments, one of the benefits of the disclosed system is to enable a user to perform so-called search-based navigation of a map. In one embodiment, searches performed using the Explorer tool as disclosed herein do not cause the system to reposition the map based on results. In this embodiment, this is true even when all location markers that satisfy the search criteria appear outside of the visible area of the map. In this embodiment, the disclosed system has been designed not to reposition the map because automatic navigation in this fashion can be confusing to the user—in this embodiment, the disclosed system implements the principle that the position of the map is only updated when the user has indicated a desire and a specific update to perform.

In one embodiment, the disclosed system nonetheless assists the user in viewing location markers that satisfy a search but that fall outside the visible area of the map by providing two different mechanisms to enable quick repositioning of the map to make at least some of the search results visible.

In this embodiment, the first mechanism is referred to as "zoom to nearest location." When the user elects to "zoom to nearest location," the disclosed system repositions the map to reveal at least one location marker of current search layer that is nearest to the currently-viewable map area. In a further embodiment, if a fuzzy search has been performed to result in search results, the "zoom to nearest location" mechanism positions the map to reveal the nearest best possible choice, as opposed to simply the nearest location that satisfies the fuzzy search. In one embodiment, depending on the specific search performed, the nearest best search result may have to be a "preferred" result, if no "best choices" have been found, or a regular location, if neither a "best choice", nor a "preferred" location" has been discovered in the search.

In one embodiment, the zoom to nearest location mechanism causes the disclosed system to display the nearest location at a highest possible zoom level that enables the map to display both (a) the old viewable area rectangle and (b) the new location marker or markers. In a further embodiment, the disclosed system causes the old viewable rectangle to be indicated on the map via dashed outline, which slowly fades away after map repositioning is complete. At the same time, revealed location markers flash several times to attract user attention. In this embodiment, the display sequence described enables the user to re-orient himself or herself to the newly positioned map over the course of a few seconds, rather than experience the jarring effect of simply moving the map to a wholly new area. This sequence also enables the user to visually estimate how near the previously viewed area is to revealed location markers.

In one embodiment, the disclosed system enables the user to invoke the zoom to nearest location functionality using a designated button of the Explorer tool. In this embodiment, the zoom to nearest location includes a light indicator that the system displays as periodically flashing to attract user attention when the button is enabled (that is, when there no relevant markers of current search layer currently visible inside the map window). In this embodiment, after the map has been repositioned using this method, the button is automatically disabled and the light indicator is turned off.

In one embodiment, a second mechanism to enable the user to reposition the map based on search results is referred to as "zoom to pinned layer locations." In this embodiment, the zoom to pinned layer locations mechanism is available only when the current search layer has at least one pinned location. When invoked, this mechanism positions the map so that all pinned locations of the current search layer are visible inside the map window at highest possible zoom level. In a further embodiment, if the current layer includes an open Ad Browser window associated with one or more locations on that layer, the disclosed system takes these locations into account when repositioning the map, treating them as if they were pinned. As a result, after the map has been repositioned using this method, all pinned locations of the current search layer along with all locations currently viewed/compared in the Ad Browser window become simultaneously visible inside the map window.

The zoom to pinned layer locations mechanism advantageously enables a user to quickly find previously pinned locations for further reviewing their associated ads in the Ad Browser, or to append pinned ads to the Ad Browser compare deck.

In one embodiment, the disclosed system enables the user to invoke the zoom to pinned locations functionality by pressing a designated button on the Explorer Tool. In one embodiment, the disclosed system displays the button as having a light indicator that is turned on when the button is enabled (that is, when there is at least one pinned location of current search layer that is not currently visible inside the map window). After the map has been repositioned using the zoom to pinned layer locations functionality, the disclosed system in one embodiment turns off the indicator.

In one embodiment, the disclosed system provides the user with two primary modes of operation with regard to Explorer Tool: so-called "Search & Edit" Mode and so-called "Clean Up & Review" mode. The modes of operation in this embodiment are discussed in more detail below.

Search & Edit Mode

In this mode user can create search layers to discover locations of various categories on the map according to user-provided search criteria. This mode also enables the user to "juggle" search results on the map using different mapping modes. In addition, during (or as a result of) a search a user can pin and unpin certain locations to/from the map that the user believes to be pertinent to the search and/or exploration of the map. In this way, the system enables the user to create a custom user map. Thus, in the "Search & Edit" mode the disclosed system typically displays several search layer tabs, opened by the user and located at the top side of the map window and, also, displays a variety of location markers of different shapes, sizes and colors, scattered around the map, some of which have been pinned to the map.

Clean Up & Review Mode

In the event that the user's interactions with the map (searching, pinning, etc.) causes the map to appear somewhat "busy," the disclosed system enables the user to move all irrelevant and unnecessary information out of view and have just what is needed on a clean and clear user custom map. In an embodiment of the Clean Up & Review Mode, the disclosed system removes all search layer tabs and location markers except pinned location markers from the map. In addition, in an embodiment, all search-related Explorer Tool features are disabled (hidden), with the exception of the "Zoom to Nearest Location" function discussed earlier.

In one embodiment of the "Clean Up & Review" mode the Zoom to Nearest Location function is used to find the nearest pinned location of specific category. If no location markers of that category are currently visible inside the map window. In one embodiment, in "Clean Up & Review" mode, the user can not modify the map by unpinning locations that have been pinned to the map in "Search & Edit" mode.

The Explorer Tool in this mode serves as a map legend, which allows user to look up category name, corresponding to specific icon type. The legend contains names and icons of only those categories that are actually used on the map.

It should be appreciated that the disclosed system enables a user to switch between the "Search & Edit" and "Clean Up & Review" map modes at any time and without any information loss. For example, after user has switched to "Clean Up & Review" mode, and then returned back to "Search & Edit" mode, all search layer tabs and unpinned location markers will be restored. All Explorer tool settings, such as search filters and search results mapping modes, are also preserved and reactivated again after user switches back from "Clean Up & Review" to "Search & Edit" mode.

The following section describes, in more detail, a specific embodiment of the map explorer tool provided by the system disclosed herein. The specific embodiment described below enables a user of the disclosed system to find various map objects according to the user's preferences, and display them on the map via markers of various shapes and colors. In this embodiment, by further clicking over map markers the user can cause the disclosed system to display various information, such as advertising information, in pop-up windows as described elsewhere herein. As described elsewhere herein, this capability advantageously enables the user to survey information about each found object, as well as to quickly compare selected objects and pin them to the map.

In one embodiment, the map explorer tool enables users to easily find different kinds of objects, such as business and public locations, featured deals and special offers (bound to their associated locations), or social and business events and activities (bound to their venues). In one embodiment, the map explorer tool initially resides inside a tool drawer, such as the tool drawer described above. To make use of the tool, the disclosed system enables the user to provide inputs to remove the tool from the drawer and place it somewhere in the map view window.

In various embodiments, the map explorer provides a number of different features, some of which are described in detail below.

In one embodiment, the map explorer tool provides a search by category feature, which enables a user to view map objects in a certain category. As discussed elsewhere herein, in one embodiment all objects that can be displayed on the map disclosed herein are divided into generic categories, each of which includes one or more subcategories. In this embodiment, each category is associated with a designated color, and objects of that category are displayed on the map in the category associated with that category. In an embodiment, this color of display is the same across all subcategories of a category. In one embodiment, the disclosed system enables a user to specify a particular subcategory of a desired category, and the system returns all map objects of that subcategory.

In various embodiments, the disclosed computerized map system uses a plurality of easily recognizable shapes to display markers (either within or across categories) to indicate the type of advertisement associated with that object. In various embodiments, the marker shape and/or size indicates the type of associated commercial ad, and is correlated with advertisement content (from simple tag-line to full-featured multimedia showcase), advertisement display size (from tiny "placards" to large "storefronts"), and map marker visibility scope (from local/neighborhood to city-wide ads). In one embodiment, the size of a marker indicates object visibility scope. In this embodiment bigger size markers are visible at all map zoom levels, while smaller size markers are only within at certain range of map zoom levels. In one embodiment, the zoom scale control of the navigator tool, which is described elsewhere herein, is visually divided into two parts, representing a global zoom level range and a local zoom level range, by a Local Zoom Level Indicator.

In one embodiment, the disclosed computerized map system uses a plurality of standard marker shapes and sizes to identify the advertisement types described elsewhere herein as follows:

Rectangle-shaped or diamond-shaped marker—indicates that an object has an advanced "Storefront" ad type, as described elsewhere herein. In one embodiment global storefront-type advertising markers have bigger size and are visible at all map zoom levels. In this embodiment, local storefront-type advertising markers have smaller size and are visible on the map only at local zoom levels.

Circle-shaped marker—indicates that an object has a "Billboard" ad type, as described elsewhere herein. In one embodiment, these markers are visible on the map in a global (city) or local (neighborhood) view. In one embodiment global billboard-type advertising markers have bigger size and are visible at all map zoom levels. In this embodiment, local billboard-type advertising markers have smaller size and are visible on the map only at local zoom levels. In one embodiment, local advertising markers are visible on the map only at neighborhood zoom levels. In one embodiment, the zoom scale control of the navigator tool, which is described elsewhere herein, is visually divided into two parts, representing a city zoom level and a neighborhood zoom level, by a Neighborhood Zoom Level Indicator.

Target-shaped marker—indicates that an object has a "Signpost" ad type, which is used to show generic objects, such as bus-stops, drop-off mail boxes, ATM terminals, etc. In one embodiment, generic object markers are usually visible at all map zoom levels, but there may be some exceptions for certain categories of objects.

Ring-shaped or doughnut-shaped marker—indicates that an object has a "Pinpoint" ad type, which are non-commercial advertisements provided to entities associated with all objects as described elsewhere herein. In one embodiment, pinpoint-type advertising markers have one size and are only visible on the map at local zoom levels. As described elsewhere herein, unlike other ads, pinpoint ads do not provide a user with an opportunity to click the marker, and no informational pop-up windows are associated. In addition, in this embodiment, there are no location signs (small pop-up boxes displayed on mouse-over) associated with the pinpoint ads as indicated by the ring-shaped markers of this embodiment. In an embodiment, when a user hovers over the marker, a location sign is displayed, but includes only a category name and the word "Unlisted" in place of a business name.

In various embodiments, the disclosed system is configured to display markers in different sizes depending on characteristics of the advertisement. For example, in one embodiment the size of a marker displayed by the disclosed system indicates ad visibility scope. In an embodiment, the disclosed system is configured to display markers at two different sizes:

(1) standard/normal size (indicates global/city-wide ads, visible at all map zoom levels); and (2) small size (indicates local/neighborhood ads, visible only at certain map zoom levels).

In general, in the embodiment in which two sizes of ads are enabled, the disclosed system requires the user to zoom in past a designated altitude to see local (or smaller) ad markers. In one embodiment, storefront ads, illustrated as rectangles or diamonds in the discussion above, are always visible regardless of the zoom level of the map, to reflect a higher price paid for the storefront ad by an advertiser on the disclosed system. Thus, in one embodiment, only a single size (i.e., standard or normal size) of diamond-shaped marker is displayable by the disclosed system.

In one embodiment, the disclosed system provides search results in a layered fashion, so that results of several basic searches can be layered over the map. In this case, the map will display several sets of map markers, each of which contains objects of one subcategory, corresponding to individual searches performed by a user. It should be appreciated that this layered search result display mechanism enables a user to create a complex map including locations arrived at through repeated and specific searching.

In one embodiment, each layer of search results constitutes a marker set since the markers in the search layer are all in the same category. In this embodiment, the system tracks one current layer or current category. In this embodiment, the user can add or remove marker sets to or from the map, as well as set any marker set as current. In an embodiment, object markers in the current set of markers are displayed as opaque, while the other object markers (i.e., those markers for sets other than the current set) are displayed as semi-transparent to indicate they are not part of the current set. In an embodiment, this advantageously improves the overall map readability, focusing the user on the current subcategory, while at the same time enabling the user to see locations of objects from different categories relative to each other. In one embodiment, the disclosed system does not display secondary marker sets at all, such as because the user has indicated he or she does not wish to see the semi-transparent markers in the secondary sets. In this embodiment, if the secondary marker sets are not displayed (either by default or because the user has selected an appropriate option), only the current set of markers are displayed over the map, while all other markers remain hidden.

In an embodiment, search layers can be thought of as sheets of clear plastic, laid over the map. In this embodiment, each sheet can be thought of as having one or more location markers drawn on it, a tab at the top, which contains subcategory icon, name, and a close button. Tabs are used to switch between layers by clicking on the tabs.

Figure 12:
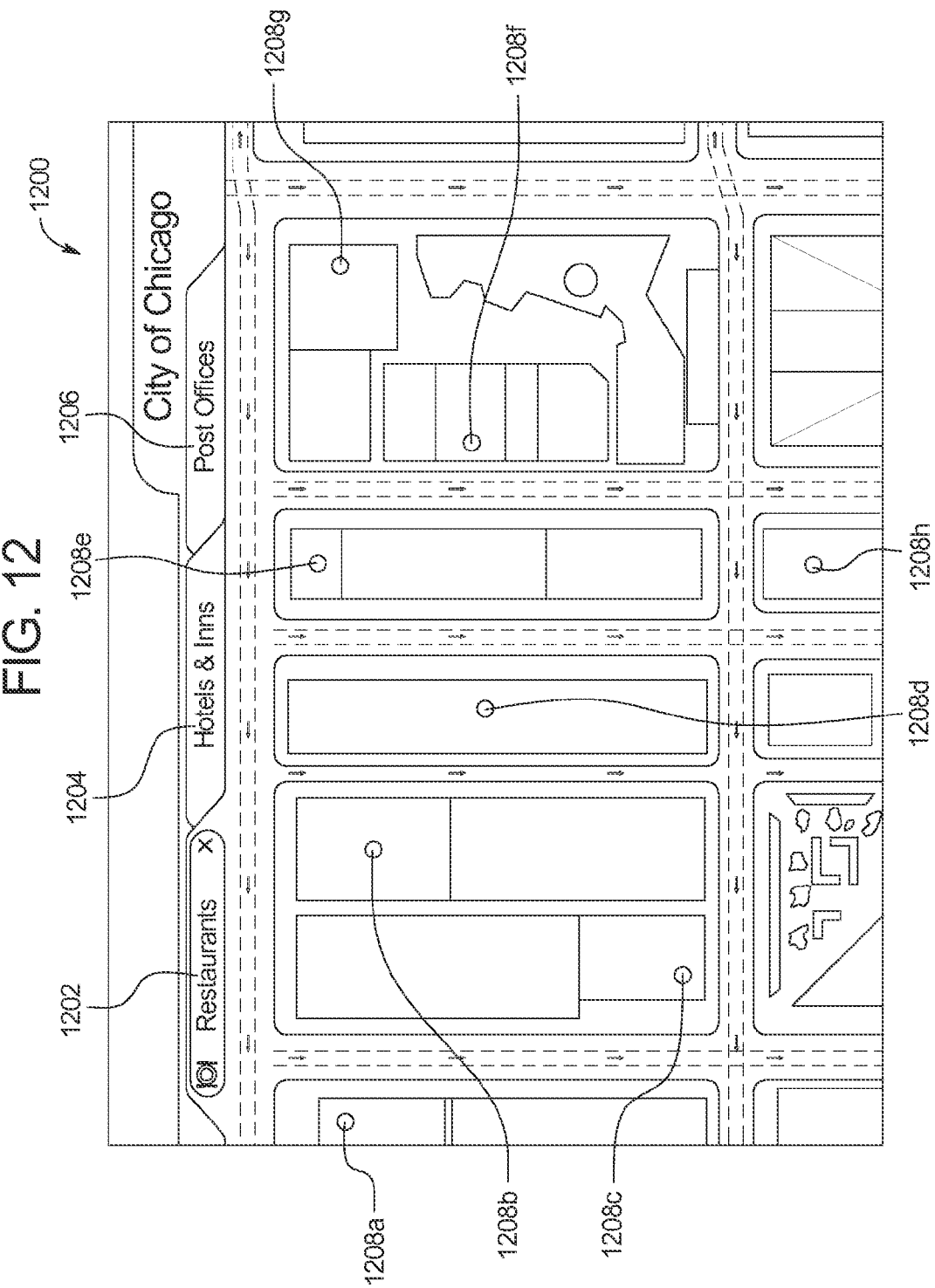
FIG. 12 is a schematic representation of a layered map view, in which a map display includes three layers of search results corresponding to objects in three different categories.

FIG. 12 illustrates one implementation of this layered embodiment, in which a map display 1200 includes three layers of search results 1202, 1204, and 1206 corresponding to objects in the "Restaurants" category, the "Hotels & Inns" category, and the "Post Office" category, respectively. In the illustrated embodiment, a plurality of map objects 1208*a* through 1208*h* are illustrated as being from different categories. In this embodiment, the color of the tab indicates the color of the category, and the color of the markers 1208 correspond to that color. For example, the tab portion of the Restaurants search result layer 1202 is colored red, and the markers 1208*a*, 1208*b*, and 1208*f* are correspondingly colored in red on the map. In addition, in the embodiment of FIG. 12, the red restaurant markers 1208*a*, 1208*b*, and 1208*f* are displayed as opaque, indicating that they are part of the current restaurant sheet 1202. On the other hand, the markers 1208*d*, 1208*g*, and 1208*h*, which are illustrated in blue to correspond to the blue words "Hotels & Inns," are displayed as semi-transparent because they are part of a non-current layer. Similarly, markers 1208*c* and 1208*e*, which are illustrated in yellow to correspond to the yellow words "Post Offices," are also displayed as semi-transparent because they are also part of a non-current layer.

In the embodiment of FIG. 12, clicking on the tab portion of the sheet 1204 will cause the system to display the blue markers 1208*d*, 1208*g*, and 1208*h* as opaque, and will cause the red markers 1208*a*, 1208*b*, and 1208*f* to be displayed as semi-transparent, indicating that the sheet 1204 has become the current layer. The same is true if the layer 1206 is made the current layer by clicking on the tab portion of that sheet.

In one embodiment, the system disclosed herein enables a user to make a marker a current marker. In this embodiment, when the user clicks on any location marker, the disclosed system displays an ad browser tool, which displays information about clicked location. Also upon clicking the marker, the location corresponding to the marker is made current. Since the disclosed system enables the user to arbitrarily move the ad browser tool around the screen, as well as to change current viewable map area by panning and/or zooming the map in or out, it is anticipated that the user may potentially lose track of the position of the current marker on the map. To alleviate this problem, one embodiment of the disclosed system is configured to display the current marker on the map by using a thin dashed outline around the marker, similar to the outline used to indicate "visited" locations as described in more detail below. In a further embodiment, the outline is displayed with a "pulse" effect by a periodic change of its size. In one embodiment, the marker body is also highlighted by using an animated flash or glow effect. It should be appreciated that animation in this way attracts attention and helps user to quickly find current location marker on the map.

In an alternative embodiment, location markers belonging to the current search layer, known as primary markers, are displayed as opaque, while all other markers, known as secondary markers, displayed as are semi-transparent. In this embodiment, the described scheme improves overall map readability, focusing the user on the current subcategory, while at the same time enabling the user to see locations from other, non-current categories or subcategories. In one embodiment, the display of secondary location markers is an optional feature. In this embodiment, if the display of secondary markers is disabled, only markers of current search layer are displayed on the map, while all other markers are hidden.

In one embodiment, when a user compares several location ads using the Ad Browser in "Compare" mode (as described elsewhere herein) the user may need to track the markers for the various locations being compared. Thus, in one embodiment, the disclosed system is configured to highlight compared location markers on the map as follows:

(1) Map markers associated with compared locations are indicated on the map via animated (pulsating) dashed outline, drawn around the marker.

(2) The body of a current map marker is animated using some combination of a "glow" and a "sparkle" animation effect. In this embodiment, a current compared map marker is animated using both animated methods described herein.

Further information about indication/animation of current marker and how it is correlated with the indication of locations, selected by user for comparison can be found elsewhere herein, such as in the discussion relating to the ad browser tool and the various controls provided by that tool.

In one embodiment, the disclosed system provides a more robust experience to users, and value to clients, by providing so-called entry/exit markers. In one embodiment, these markers are provided without charge, and constitute arrow-shaped markers displayed on a map near the current location marker at relatively high zoom levels. In this embodiment, the entry/exit markers show the user of the map entrances and exits for certain types of locations, as appropriate depending on the location. Depending on location, the arrows may thus designate either drive or walk in/out points. Also, depending on the business needs, the disclosed system displays location markers with specific types of entry/exit points attached to it, such as drive, walk, handicap access, evacuation, private, etc.

The disclosed system is configured to display search results in a number of different display modes, which are described in more detail below.

In various embodiments, the disclosed system is configured to display results of a search using various levels of visibility of non-current search layers. For example, in one embodiment all non-current layer markers are displayed as semi-transparent. In this embodiment, this setting advantageously helps user to see where found objects of different subcategories are located relative to each other. In one embodiment, the non-current layer markers are not displayed (except pinned locations). In this embodiment, this setting advantageously enables the user to concentrate just on current search layer. It can be useful if map gets too crowded with markers from other layers. In a further embodiment, the system enables to select either the "on" state or the "off" state to turn on or off non-current layer markers as desired.

In one embodiment, the visibility of unmatched locations can be varied. The setting is relevant when user applies search constraints over a subcategory of objects, displayed at current search layer. In this embodiment, when the visibility of unmatched locations is set to "off," locations that do not match user search criteria are not displayed on the map. In this embodiment, when the visibility of unmatched locations is set to "on," locations that do not match user search criteria are displayed in at least some format on the map. For example, such unmatched locations may be displayed as airy or hollow markers, in which simply an outline or a highly transparent version of the marker is displayed as opposed to a solid, opaque marker. In one embodiment, the ability to turn on this feature helps user to visually estimate the impact of his/her search constraints, since the user can see what locations were actually discarded from search results due to applied search criteria. In one embodiment, to avoid map cluttering, unmatched locations are displayed only for current search layer. In various embodiments, the display of non-current layers is not affected by the setting. In various embodiments, pinned locations are never displayed as "unmatched", even if they don't satisfy user search criteria. In other words, in these embodiments, pinned objects are always displayed in fully opaque view and are always easily visible, even if they do not match the user's search criteria.

While pining locations to the map enables distinguishing locations that are interesting to a user from all others, this functionality in one embodiment does not track locations that the user reviewed, but was not interested in. Thus, in one embodiment, the disclosed system provides the option to enable or disable displays of visited locations. As discussed herein, clicking a location marker opens the ad browser tool, which displays information about the clicked location. Locations that have been clicked at least once are considered visited, even if the user has decided not to pin those locations. In one embodiment, when the option to turn on visual indications of visited locations, the disclosed system is configured to display visited locations on the map, such as by displaying a thin outline around location marker. In this embodiment, pinned locations, that don't belong to current search layer, are not displayed as outlined to keep the map clean (less cluttered), even though those locations have been visited at least when the user pinned the location from within the ad browser tool.

Map Marker Groups

In one embodiment, the disclosed system advantageously provides for a plurality of improved map marker groups that enable easier and more intuitive interaction with a computer-displayed map. In this embodiment, the improved map marker groups remedy many of the problems described above with regard to known map marker groups.

The system disclosed herein provides improvements to known map marker groups. In one embodiment, the disclosed system provides such improvement by displaying a cursor as a "magnifier" when the user provides the appropriate inputs to position the cursor over a group marker. In this embodiment, the use of a "magnifier" shape for the cursor as opposed to a "hand" shape enables the user to click the marker to zoom in on the area around the marker, as described below.

Figure 13:
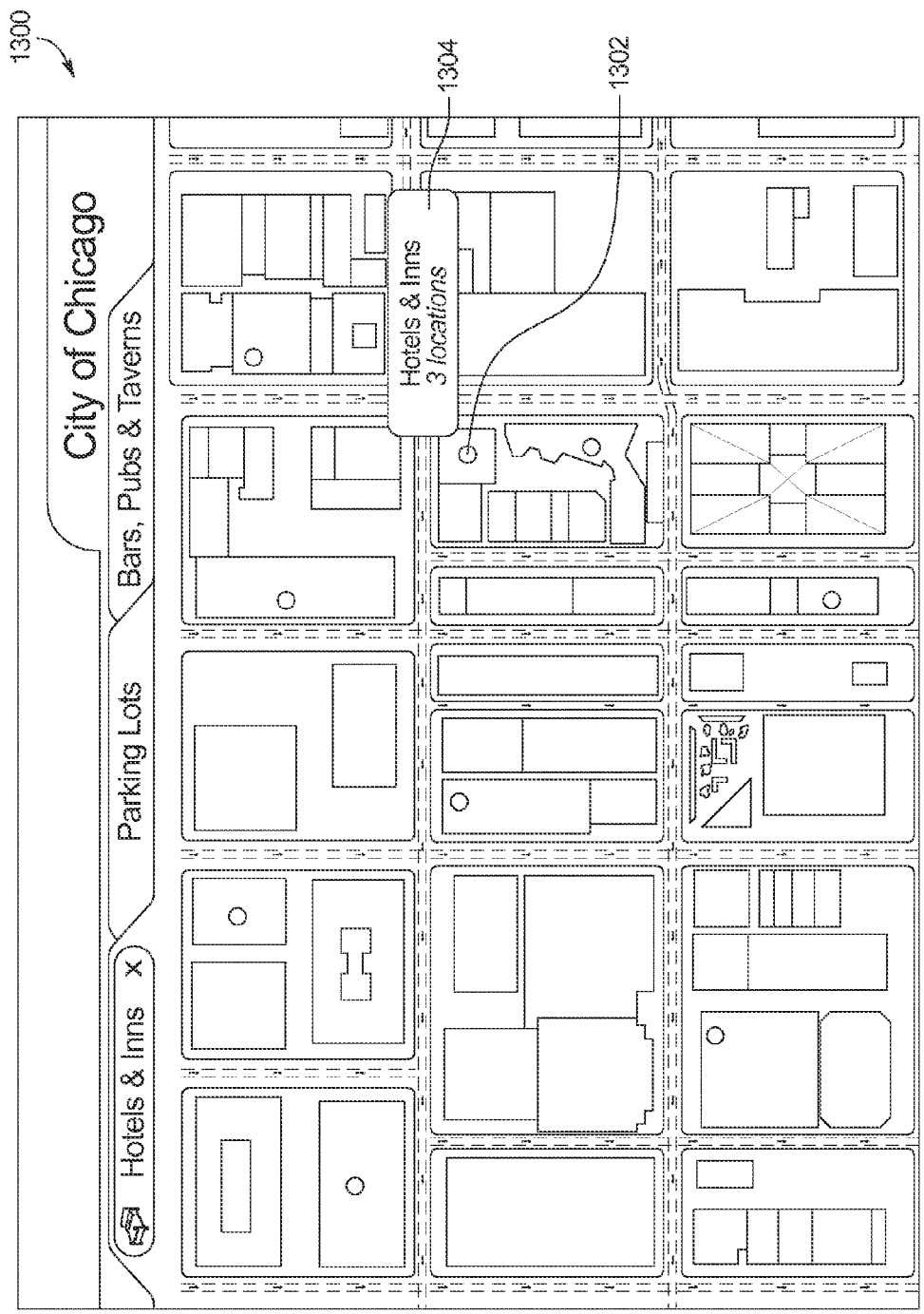
FIG. 13 is a schematic representation of a screenshot of the disclosed map system illustrating a plurality of markers, at least one of which is a group marker.

The disclosed system also improves on known map marker groups by, in one embodiment, displaying a pop-up box displaying a category name (and/or category icon) and the number of locations within a group, as is illustrated in FIG. 13. Specifically, FIG. 13 illustrates that when the user has positioned the cursor over the group marker 1302 in the window 1300, a pop-up box 1304 titled "Hotels & Inns" is displayed, and includes an indication of the number of locations of "Hotels & Inns" displayed in the window 1300.

Figure 14:
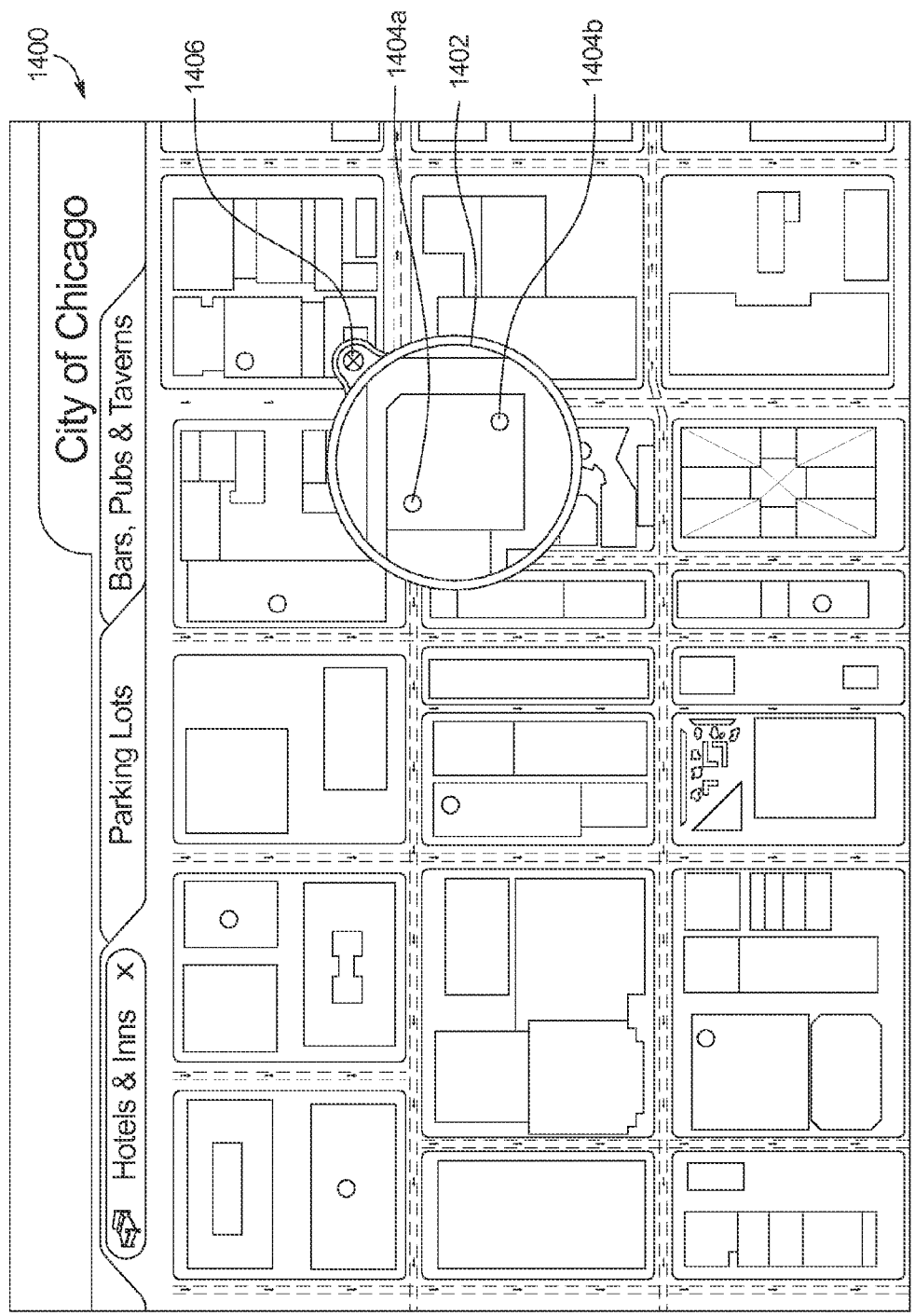
FIG. 14 is a schematic representation of the screenshot of FIG. 13, with the group marker viewed through a magnifier tool.

In one embodiment, when user clicks over a group marker, it causes the display of a magnifier tool 1402 as illustrated in the screen 1400 of FIG. 14. In the illustrated embodiment, the magnifier tool 1402 is positioned on the map over the group marker and displays a scaled-up (i.e., zoomed-in) view of the map area around the marker. Increased map zoom level inside the magnifier tool in one embodiment causes single group marker to be replaced with the group of standalone markers, including the two markers 1404a and 1404b illustrated in FIG. 14.

In one embodiment, the map zoom level inside the magnifier tool 1402 is set to maximal possible value, when all location markers, which are the members of the group, can still be placed inside magnifier tool window. In various embodiments, some of these markers displayed in the magnifier tool 1402 will be conventional, while others may still represent smaller groups.

In one embodiment, the magnifier tool 1402 is "glued" to the map. In this embodiment, when user moves the map, the tool moves along with its original position on the map. For example, in FIG. 14, if the user moved the map so the building within the magnifier tool 1402 was in the upper-left corner of the map, the magnifier tool 1402 would also move to be in the upper-left corner of the map. In one embodiment, the magnifier tool 1402 can be closed manually via "Close" button 1406. In one embodiment, the magnifier tool 1402 is closed automatically, whenever user performs an action that has the potential to modify the contents of the map inside the tool window. For example, if the user zooms the map in or out, if the system closes the group marker map layer or if the system updates the map layer filtering options, the system may automatically close the magnifier tool 1402. In one embodiment, the magnifier tool 1402 is closed when the user clicks over any other map marker outside the tool window.

In one embodiment, conventional markers inside the magnifier tool 1402 are used in the same manner as conventional markers outside the magnifier tool window. For example, if a user provides an input to place a mouse cursor over a marker within the magnifier tool 1402, the system disclosed herein causes the display of corresponding pop-up box. Likewise, in an embodiment, clicking a marker inside the magnifier tool 1402 displays the ad window, or in "Ad Compare Mode" (described elsewhere herein) adds the advertisement of the selected location to the deck.

In one embodiment, placing a mouse cursor over group markers displayed inside the magnifier tool 1402 evokes a similar behavior to placing a mouse cursor over group markers displayed outside the magnifier tool 1402. In one embodiment, however, clicking a group marker inside a magnifier tool 1402 is somewhat different than clicking a group marker outside the magnifier tool 1402. These differences are described with regard to FIG. 15.

Figure 15:
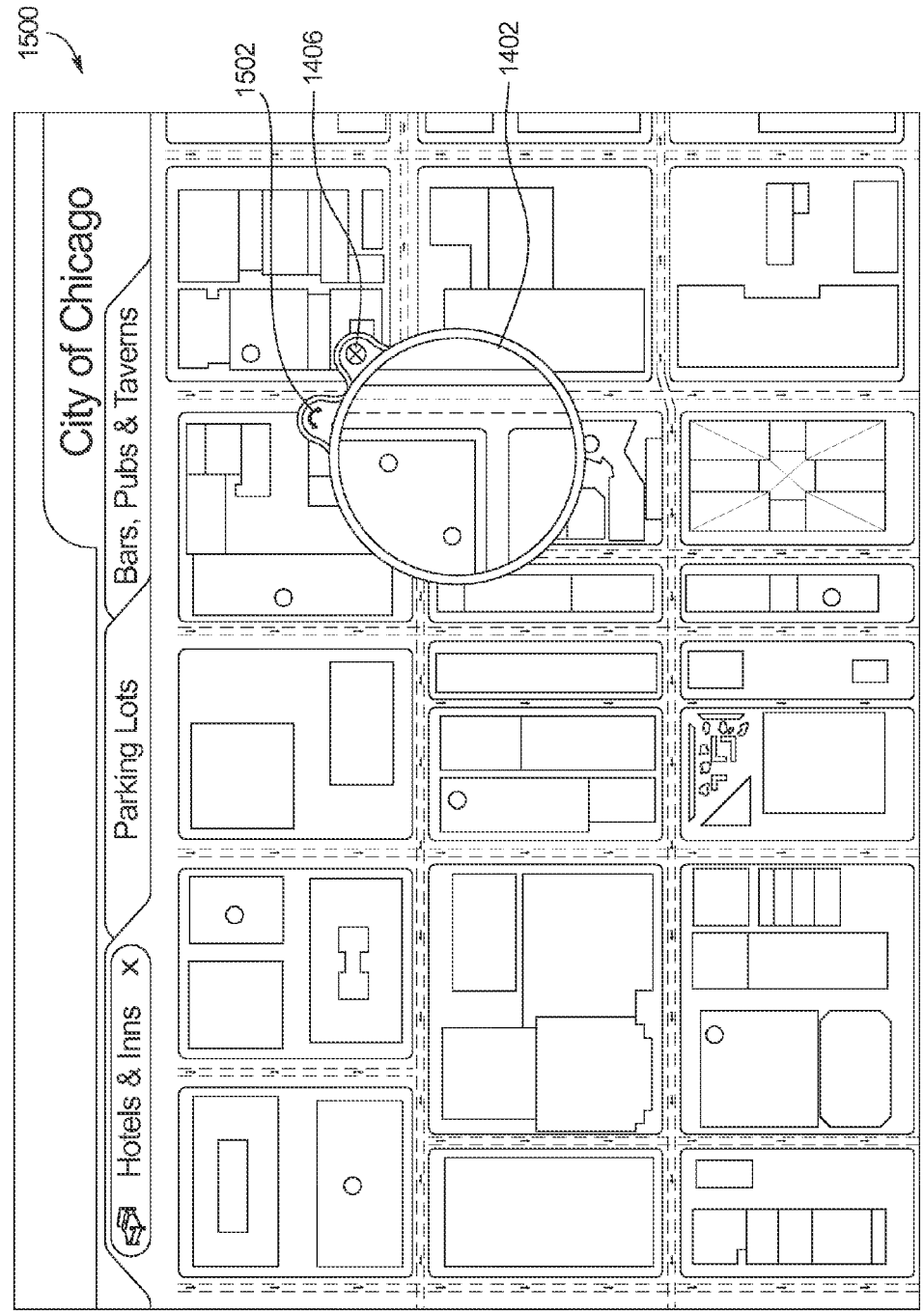
FIG. 15 is a schematic representation of the screenshot of FIG. 14, in which the user has clicked on the group marker.

In the screen 1500 of FIG. 15, a user has selected (e.g., by clicking) a group marker within the magnifier tool 1402. Upon such selecting, the disclosed system causes the map portion displayed inside the magnifier tool 1402 to be further zoomed in relative to selected group marker, so the group marker is replaced by the group of standalone or individual markers. Further, in the embodiment illustrated in FIG. 15, a "Go Back" button 1502 is displayed next to "Close" button 1406. In this embodiment, when a user provides an input to select "Go Back," the portion of the map displayed inside the magnifier tool 1402 is returned to its previous state. In other words, the "Go Back" button causes the area displayed inside the magnifier tool 1402 to revert to display one level of zoom up. In this embodiment, the disclosed system also combines any individual markers into a smaller number of group markers, where the group markers represent a plurality of individual markers.

It should be appreciated that the disclosed system enables a user to zoom in and out (e.g., "Go Back") any appropriate number of times, depending on the number of group markers and individual markers displayed in the magnifier tool 1402.

In one embodiment, at certain zoom levels all markers displayed inside the tool will be conventional, individual markers.

In various embodiments, the disclosed system operates according to certain rules, referred to as marker state inheritance rules. Specifically, in these embodiments, certain marker state inheritance rules describe or define how group markers inherit the traits of its children individual markers. In an embodiment, the marker state inheritance rules determine or define how group marker shape, size and animation method depends on the shape, size and animation of the individual member markers.

In one embodiment, marker state inheritance rules require that the shape of a group marker is inherited from the shape of the most significant member of the group. For example, if the group includes several "Storefront" markers which are displayed as diamond shapes and a single "Billboard" marker shaped as a bubble advertisement, the shape of the group marker in one embodiment would be set to "diamond." Similarly, in case of fuzzy (relevancy-based) search performed as described elsewhere herein, the size and shape of a group marker in one embodiment is set to the size and shape of the group member most relevant to the fuzzy search.

In one embodiment, group markers inherit the current state of a child marker. For example, if a user clicked a group marker to open the magnifier tool and thereafter the user clicked on a conventional marker inside the magnifier to open an ad window, the clicked conventional marker in one embodiment glows to illustrate that an advertisement is being displayed. In this embodiment, if the user thereafter closes the magnifier tool while the advertisement was still being displayed, the disclosed system displays the group marker as glowing, which indicates that the individual marker corresponding to the displayed advertisement is one of the markers represented by the glowing group marker.

In one embodiment, the same logic applies if a user has compared a plurality of ads for a plurality of individual markers as described elsewhere herein. In this embodiment, the individual markers whose advertisements are being compared are each glowing with a pulsing dashed outline, as described elsewhere herein. If the magnifier tool displaying that marker is closed, the group marker thereafter displayed containing that marker in one embodiment is displayed as having the same glowing/pulsating dashed outline effect.

In one embodiment, the disclosed system is configured to display a group marker as a "visited" group marker by displaying a dashed outline around the group marker when all of the member markers within the group marker have been visited. In one embodiment, when operating in "ad compare" mode as described elsewhere herein, the disclosed system displays a group marker as being "compared" by displaying a pulsating dashed outline effect when all members of the group marker have been added to a comparison list.

In another embodiment, if not all the member markers have been added to and advertising comparison list, a different animation is applied to the group marker. For example, a similar pulsating dashed outline may be displayed, but the dashes may be more sparsely spaced, to indicate that some of group members (but not all of them) have been added to a comparison list.

In one embodiment, certain markers disclosed herein can be associated with side tags, which are displayed when fuzzy search is used. For example, a marker for which a featured deal is available, as preferred search criteria, in one embodiment has a star displayed next to it as a side tag. In this embodiment, the disclosed system is configured to display a group marker containing the side-tagged marker as having the same side tag, indicating that at least one member of the group has corresponding featured property.

In various embodiments, a very large number of markers are positioned in a relatively small geographic area. For example, the Merchandise Mart in Chicago has more than 2000 businesses within an area the size of two blocks. Likewise, a hospital may have hundreds or thousands of doctors that wish to advertise independently within the same building. In various embodiments, certain of the logic described above could be problematic given the density of markers that may need to be displayed in a single magnifier tool. In these embodiments, the disclosed system is configured to display a different group marker indicating the presence of a large number of markers contained in the group. In one example embodiment, a flower group marker is displayed as a large dot surrounded by a plurality of smaller dots, indicating that the group marker contains a large number of member markers. Other shapes could also be used as appropriate to display such large set group markers.

In one embodiment, when a user clicks on a large set group marker, the disclosed system displays an advertising window including a list of advertisements for each of the member markers of the group marker. In this embodiment, the user can access each advertisement by scrolling through the list as a user would scroll through a typical web page of search results. In various embodiments, these large set group markers are used only in extreme cases, when even the most detailed map zoom level would prove cumbersome given the density of markers that need to be displayed.

The following constitutes a description of a specific embodiment of the disclosed Explorer tool, including the layout and functionality of an explorer tool that can be used to provide the functionality described above.

Figure 32:
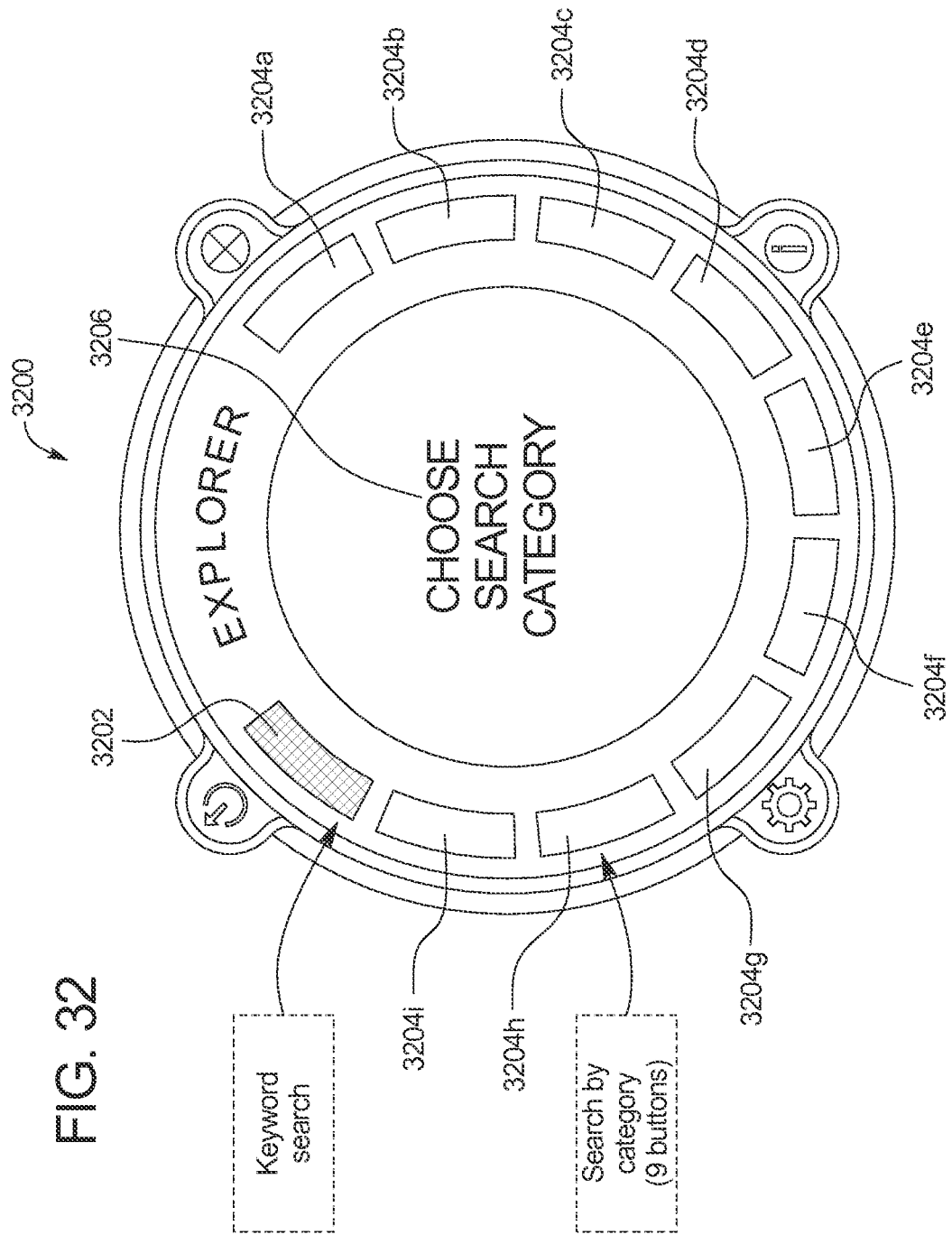
FIG. 32 is a schematic representation of an embodiment of the Explorer Tool disclosed herein prior to a user selecting any category.

In the particularly described embodiment, at an initial state with no search layers created, the explorer tool includes 9 colored buttons used to pick a top level category and display a pull-down window of their corresponding subcategories plus one more button (uncolored) used to activate keyword search method. FIG. 32 illustrates this embodiment 3200, with button 3202 illustrating the non-colored "keyword search" button and buttons 3204*a*, 3204*b*, 3204*c*, 3204*d*, 3204*e*, 3204*f*, 3204*g*, 3204*h*, and 3204*i* illustrating the colored category buttons. In this embodiment, when a category is preselected by user (user has pressed and holds mouse button over category button), the disclosed system displays the category name inside an inner circle-shaped panel 3206. Similarly, when the user selects the keyword search method, the phrase "Keyword search" can be displayed inside tool inner circle-shaped panel 3206. In one embodiment, the disclosed system enables the user to slide the mouse cursor over the outer dial buttons to quickly look up the category of his choice, which can be displayed in the circle-shaped panel 3206 or elsewhere on the screen.

Figure 33:
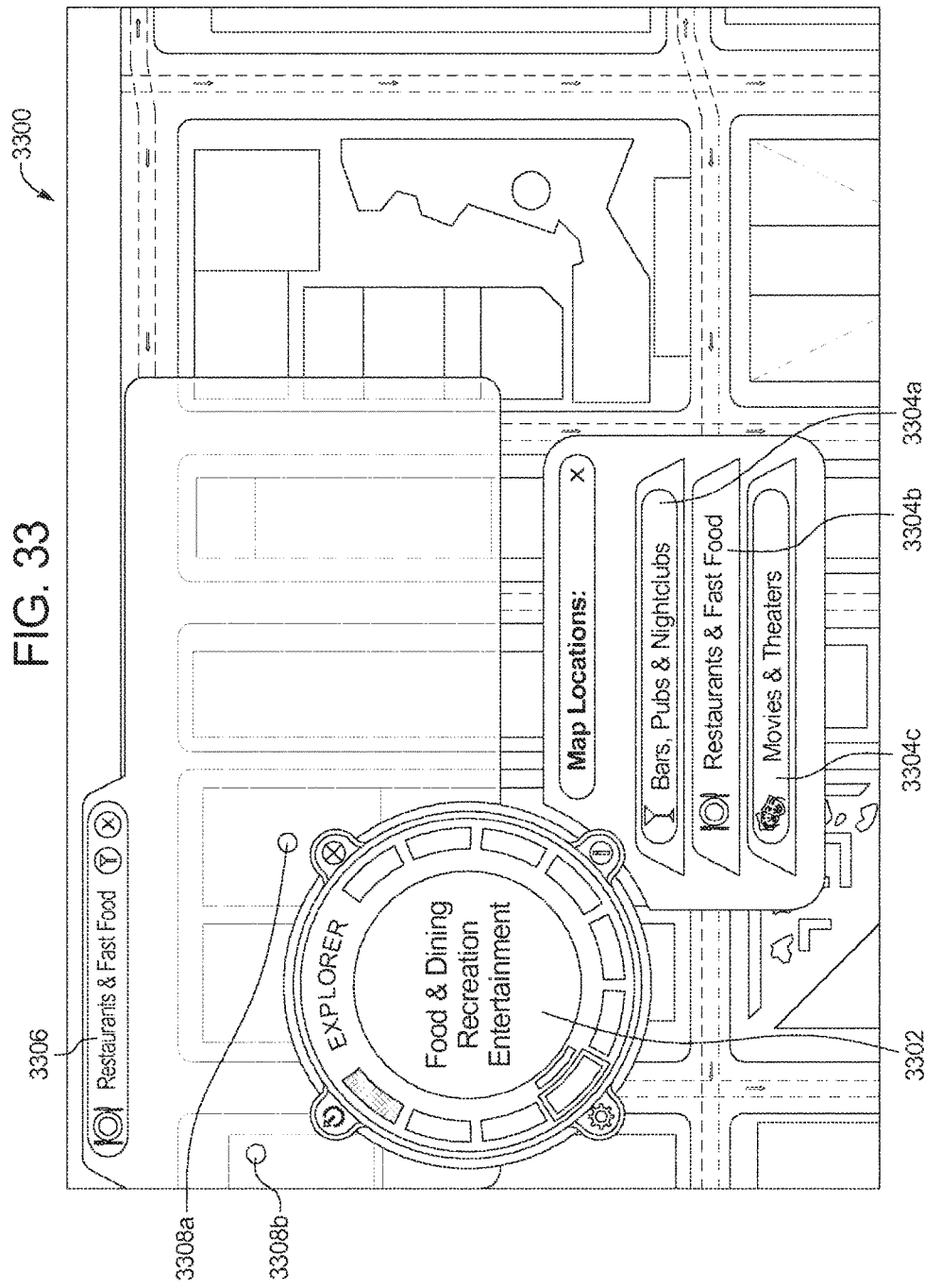
FIG. 33 is a schematic representation of a map as presented by an embodiment of the disclosed system in which a category has been selected and subcategory cards are being displayed.

In one embodiment, after the user has selected the search category and released the mouse button, the disclosed system displays the name of the selected category in the Explorer tool and displays an extendable panel with a plurality of compartments. In this embodiment, each compartment contains a subcategory "card". FIG. 33 illustrates an example screen shot showing an exemplary Explorer tool 3302 with the "Food & Dining Recreation Entertainment" category selected, and with the phrase "Food & Dining Recreation Entertainment" displayed in the Explorer tool as described above. As can be further seen from FIG. 33, subcategories 3304a, 3304b, and 3304c are illustrated as subcategories of the "Food & Dining Recreation Entertainment" category. In the illustrated embodiment, the subcategory 3304a is a "Bars, Pubs & Nightclubs" subcategory, subcategory 3304b is a "Restaurants & Fast Food" subcategory, and subcategory 3304c is a "Movies & Theaters" subcategory. It should be appreciated that in the illustrated embodiment, subcategory 3304b corresponding to "Restaurants & Fast Food" has been selected, and the same is illustrated in a tab 3306 at the top of the window 3300. In addition, locations 3308a and 3308b indicate matches—that is, items on the map that fall within the "Restaurants & Fast Food" category and that are displayed in the current map window.

In various embodiments, placing the mouse cursor over a subcategory card reveals "Filter" and "Add" buttons at the right side of the card next to its name. These buttons enable the user to filter or add items in the subcategory as described elsewhere herein. In an embodiment, the disclosed system enables the user to pull and drag the desired subcategory card towards the top side of the map window or simply click an "Add" button on the card to create a search layer for the selected category. In either case the selected category card is removed from its compartment and travels towards the top side of the map window until it reaches its final position on the search layer tab panel.

In one embodiment, after the selected subcategory card had reached its final position at the search layer tabs panel it starts to grow in size, expanding all the way to the bottom of map window until reaches the size of the window. At the same time map markers of business locations that belong to selected category are revealed over the map. One example of the display of such map markers is described in more detail with regard to FIG. 21 below. In one embodiment, after a search layer has been created, the disclosed system replaces the displayed "Add" button with a "Close" button. In this embodiment, both the "Filter" and "Close" buttons are revealed when user places mouse cursor over layer tab.

In various embodiments, the disclosed system can also display a "Filter" window to enable the user to input search criteria for a search layer and can be opened in several ways. Firstly, the user can set filtering options right before creation of new search layer instead of doing so after the layer has been already created. This enables the user to avoid wasting the time that would otherwise be required for unnecessary display of all location markers of that layer (which may result in substantial data download). To open the filter window prior to the creation of the search layer the user can click "Filter" button located at the layer card, as discussed above. In this case selected subcategory card gets extracted from its compartment, travels towards the screen center and converts to filter dialog window.

Figure 34:
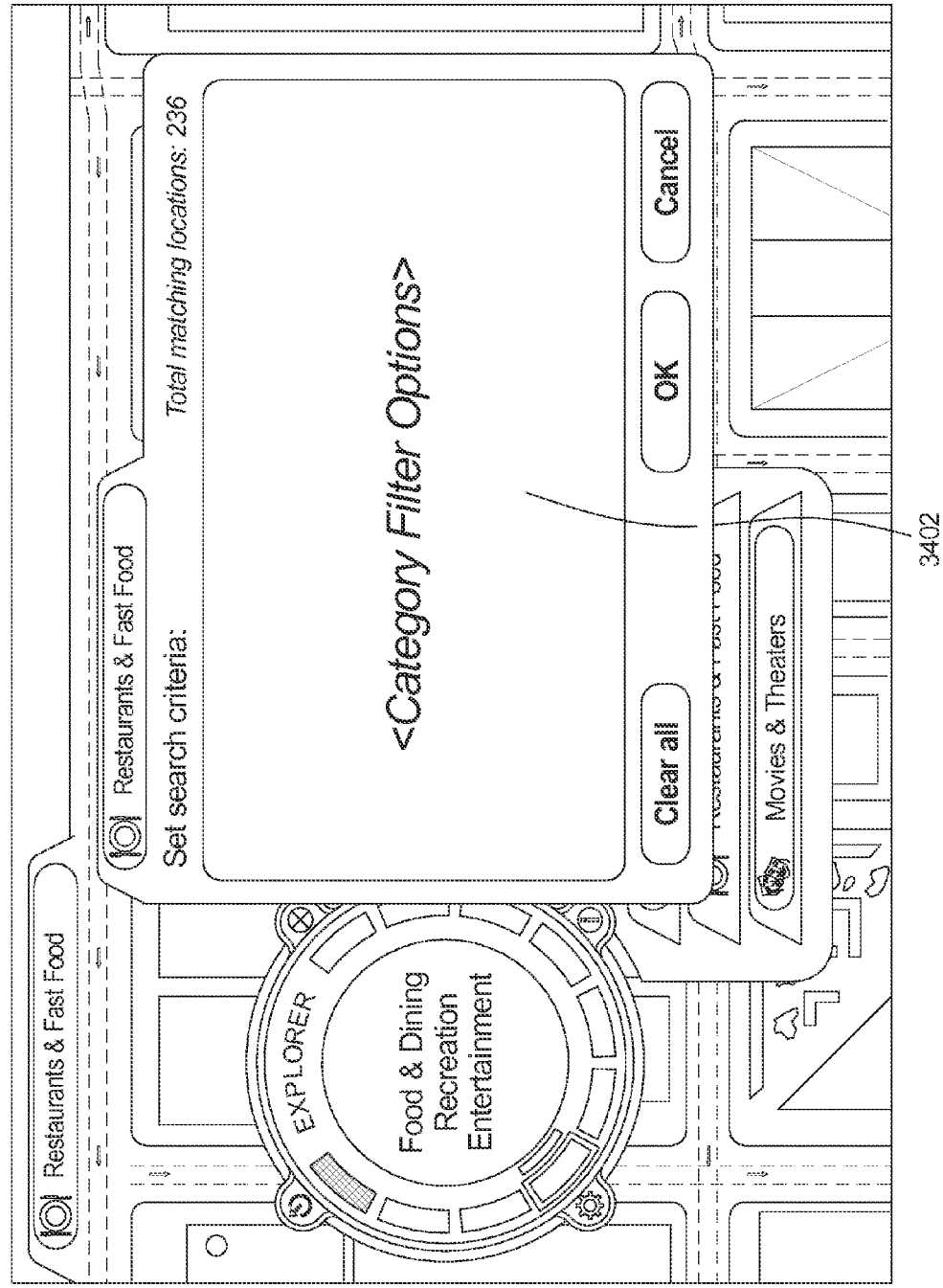
FIG. 34 is a schematic representation of a map as presented by an embodiment of the disclosed system in which the Filter option has been selected, and a Filter window opened, for a selected Subcategory.

FIG. 34 shows an example of a display 3400 with filter window 3402 displayed over the map and Explorer tool. In this embodiment, the user has selected the filter button of a layer card for the "Restaurants & Fast Food" subcategory, resulting in filter window 3402 for the "Restaurants & Fast Food" subcategory. In one embodiment, such as the embodiment illustrated in FIG. 34, after the filter window has been opened, all other tools and user controls outside the window are disabled and main application window underneath the filter window is dimmed. At this moment the user can define search criteria by setting restrictions on the values of parameters related to selected category and clicking the displayed "OK" button. This causes the filter window to be closed, converted back to category card and moved towards the search layer tab panel to complete creation of new search layer with preset filtering criteria. In another embodiment, the user can click "Cancel" button, which causes the filter window to be closed and converted to a category card, which is then placed back to its compartment.

The filtering criteria can alternatively be entered or modified for an existing search layer by placing mouse cursor over a layer tab and clicking the "Filter" button. In this case selected search layer shrinks down to subcategory card, which then travels towards the screen center and converts to filter dialog window in the same manner, as it has been already described above with regard to FIG. 34. Clicking "Cancel" button of the filter window unlike previously described use case, causes the same action as clicking "OK" button, except that any changes made to search options are canceled.

Still alternatively, instead of clicking the "Filter" button of the layer tab the user can select the "Filter" button on the Explorer tool itself.

Figure 35:
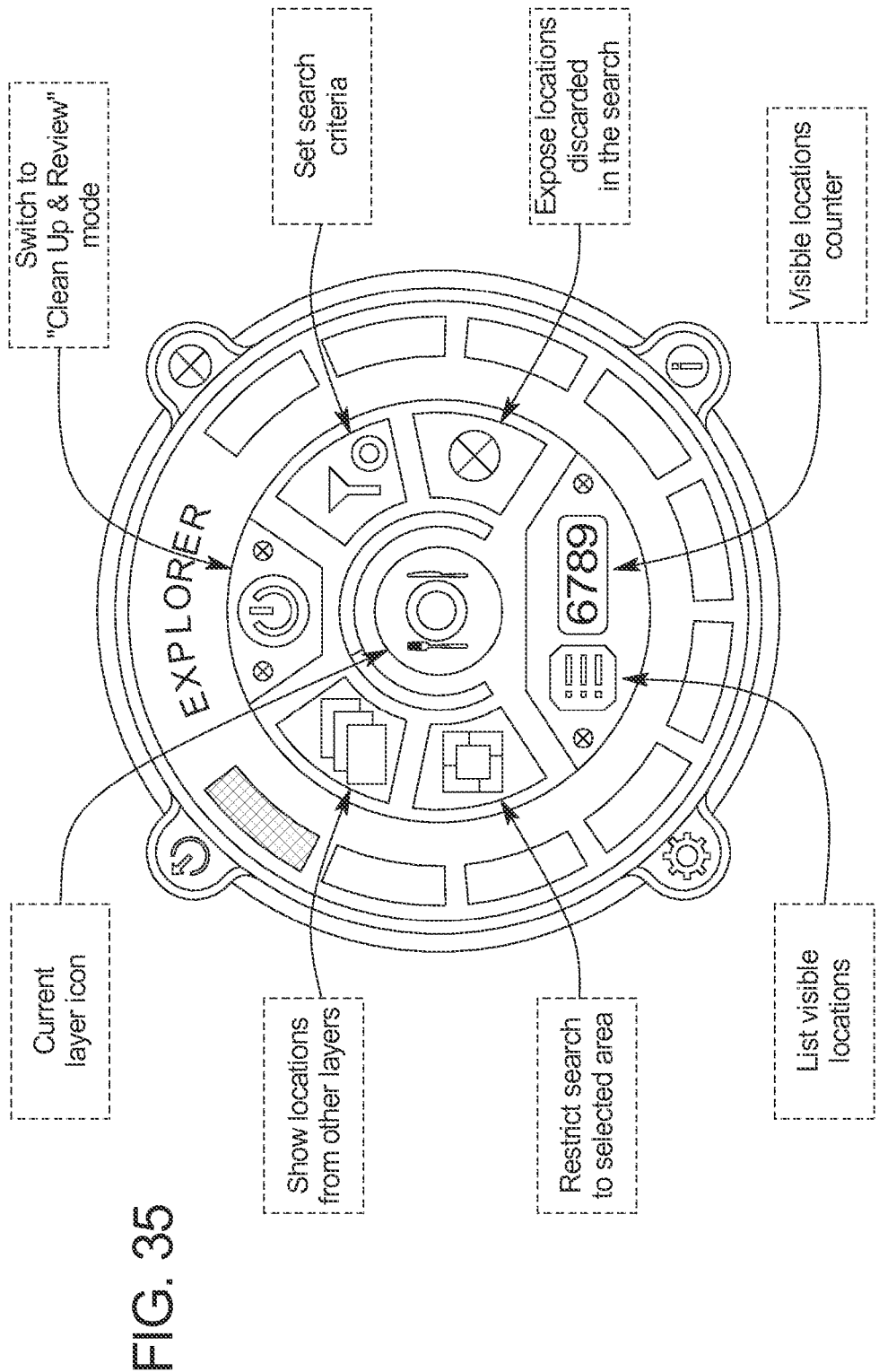
FIG. 35 is a schematic representation of an embodiment of the Explorer Tool disclosed herein displayed in Search & Edit mode.

In various embodiments, once at least one search layer has been created (as described above with regard to FIG. 32), and as soon as user closes an extendable panel with subcategory cards (as described above with regard to FIG. 33), the disclosed system changes the layout of the Explorer tool to reveal buttons and controls that can be used in a so-called "Search & Edit" mode. FIG. 35 illustrates a currently preferred embodiment of the Explorer tool with the changed layout following the closing of the extendable panel. In the illustrated embodiment, the following buttons on the Explorer tool are illustrated, and have the following functions:

Current layer indicator—displays subcategory icon of current search layer

Show locations from other layers—toggle button, which causes the system to turn the display of location markers from other (non-current) search layers on the map on or off. This button is disabled if no other search layers have been opened other than the current search layer.

Restrict search to selected area—toggle button that causes the system to turn the display of map markers located outside selected neighborhood or user destination on or off. This button is disabled if no neighborhood has been selected or if no user destination has been selected List visible locations—button that causes the disclosed system to display an Ad Browser window with the list of locations within the current search layer currently visible inside map window. In one embodiment, this button is not available (e.g., it is replaced with a "Zoom to nearest location" button) if no locations are currently visible in the current search layer.

Visible locations counter—counter that displays the number of currently visible locations in the current search layer.

Set Search Criteria—button that causes the system to open a search layer "Filter" window. In one embodiment, this button is associated with a multicolor LED indicator having either a green, yellow or red color. In this embodiment, a green indicator means that no search has been set for current search layer, a yellow indicator means the search criteria has been set for current search layer, and a red indicator means search criteria has been set for current search layer, but no locations currently match the criteria (nothing to show on the map).

Expose locations discarded in the search—toggle button that causes the system to turn the display of map markers of locations that do not match the search criteria for current search layer on or off. This toggle button is disabled if no search criteria have been set for current search layer.

Switch to "Clean Up & Review" mode—toggle button that causes the system to switch between "Search & Edit" and "Clean Up & Review" modes.

Figure 36:
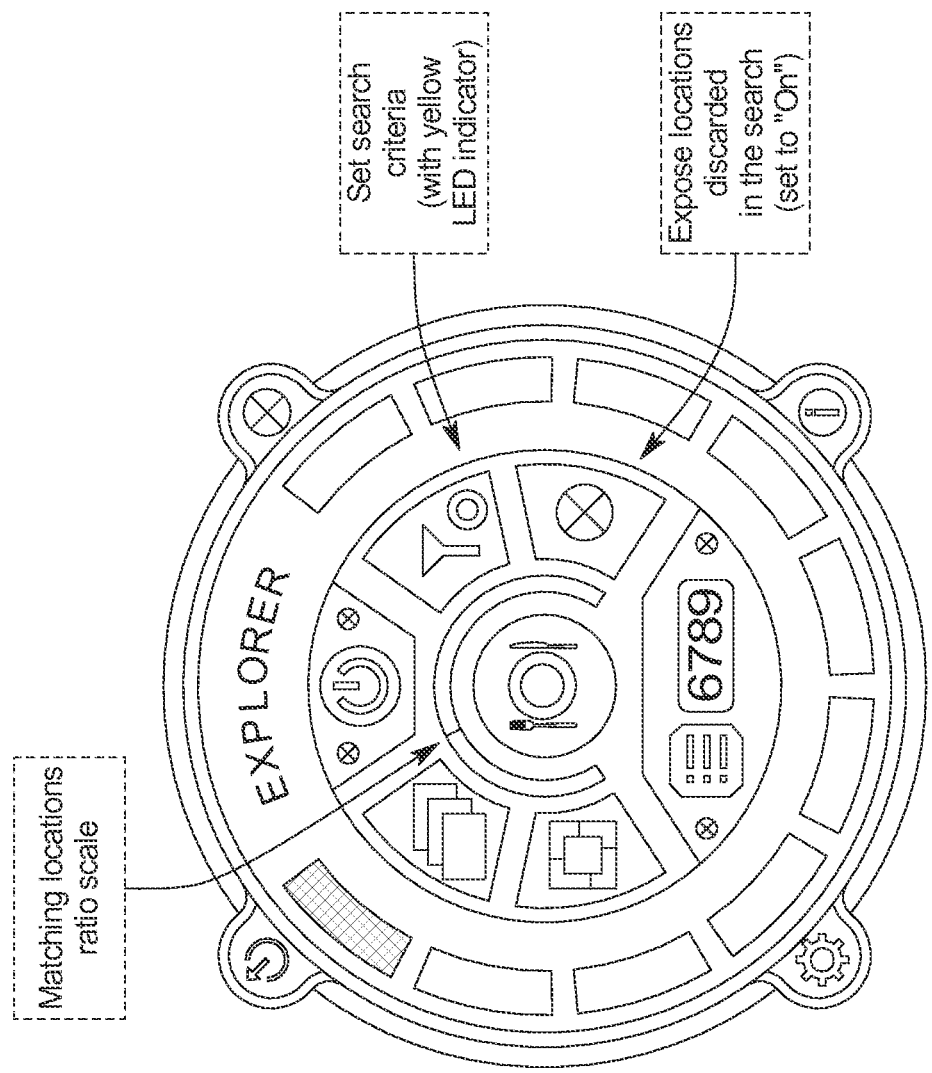
FIG. 36 is a schematic representation of an embodiment of the Explorer Tool disclosed herein displayed in Search & Edit mode after search criteria have been set.

In various embodiments, if the search criteria have been set for the current search layer and the "Expose locations discarded in the search" mapping mode has been enabled, the disclosed Explorer tool may additionally display a graphical scale indicating the ratio (percentage) of currently visible locations that match the criteria. FIG. 36 shows an example of this graphical scale, in which the smaller portion of the arc indicated to be the graphical scale indicates matched search results. In one embodiment, the matched portion of the graphical scale is colored green, and the unmatched portion is colored yellow, as described above.

Figure 37:
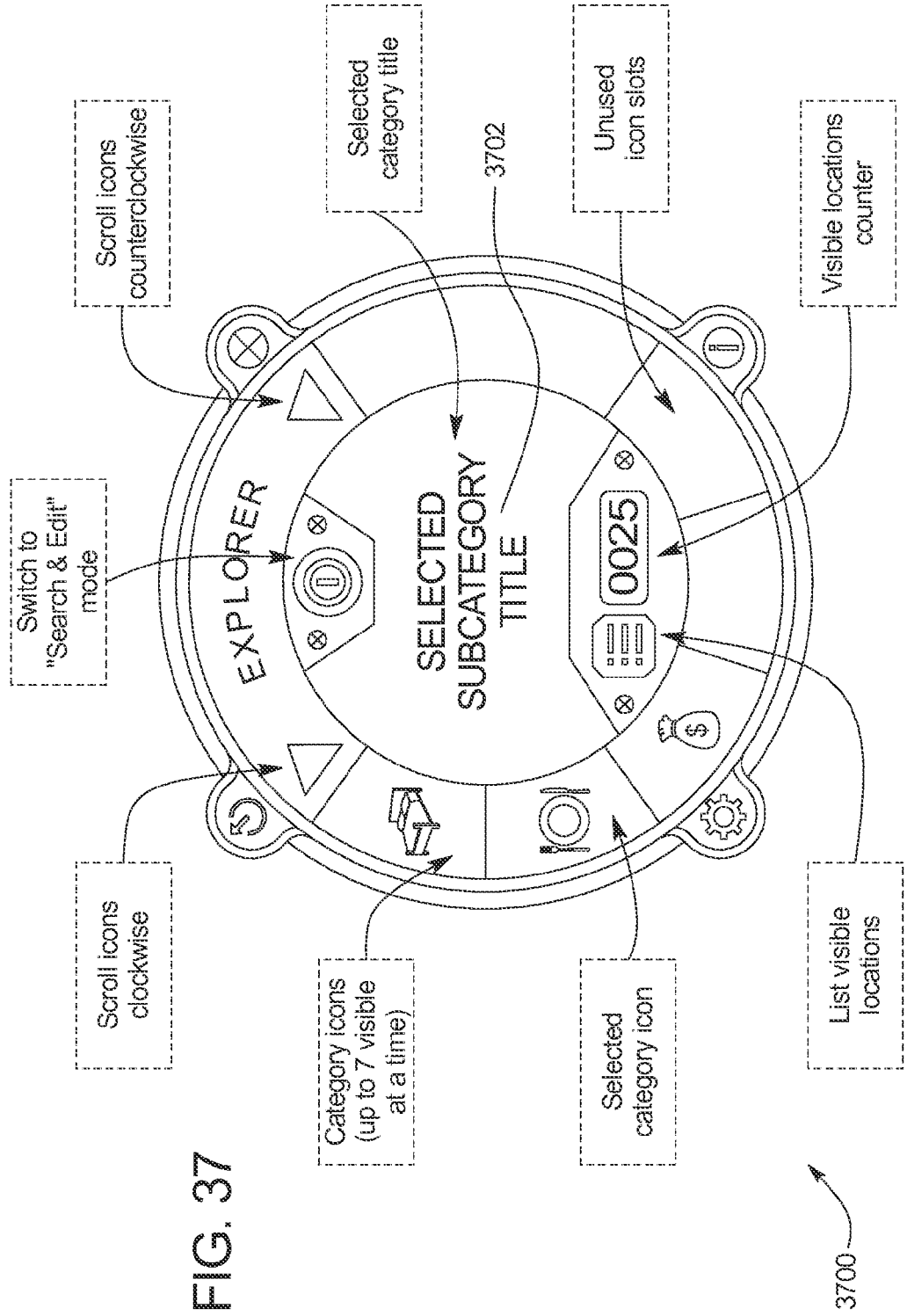
FIG. 37 is a schematic representation of an embodiment of the Explorer Tool disclosed herein displayed in Clean Up & Review mode.

In one embodiment, the disclosed Explorer Tool is configured to display a map legend, implemented as a dial, in Clean Up & Review Mode. In one particularly preferred embodiment, the Explorer Tool can display up to seven simultaneously visible category icons, although the maximum number of category icons can vary in different embodiments. If locations from more than the maximum number of categories have been pinned to the map, the dial can be rotated to reveal each category icon. FIG. 37 illustrates an example of such an embodiment of the Explorer Tool 3700 in Clean Up & Review mode.

In the embodiment of FIG. 37, the disclosed system enables the user to view the category for any icon shown on the map by clicking over the icon, which will cause the display of category name inside central circle-shaped tool panel 3702. In the illustrated embodiment, the user can display the list of visible locations of selected category by clicking "List visible locations" button. In this embodiment, "List visible locations" works in the same way as in "Search & Edit" mode except that only pinned locations will be listed, since all other map markers are not displayed on the map in "Clean Up & Review" mode. In one embodiment, if no locations have been pinned to the map upon switching to "Clean Up & Review" mode, then, all map legend icon slots will be empty and the central panel will display a message indicating that no locations have been pinned.

It should be appreciated that user search and map navigation actions that cause sending requests to remote server in order to update map content may take varying amounts of time to be processed. In one embodiment, during the processing of such requests, the disclosed Explorer Tool displays a progress indicator in place of a current search layer indicator, which preferably resembles radar device display in action.

Figure 16A:
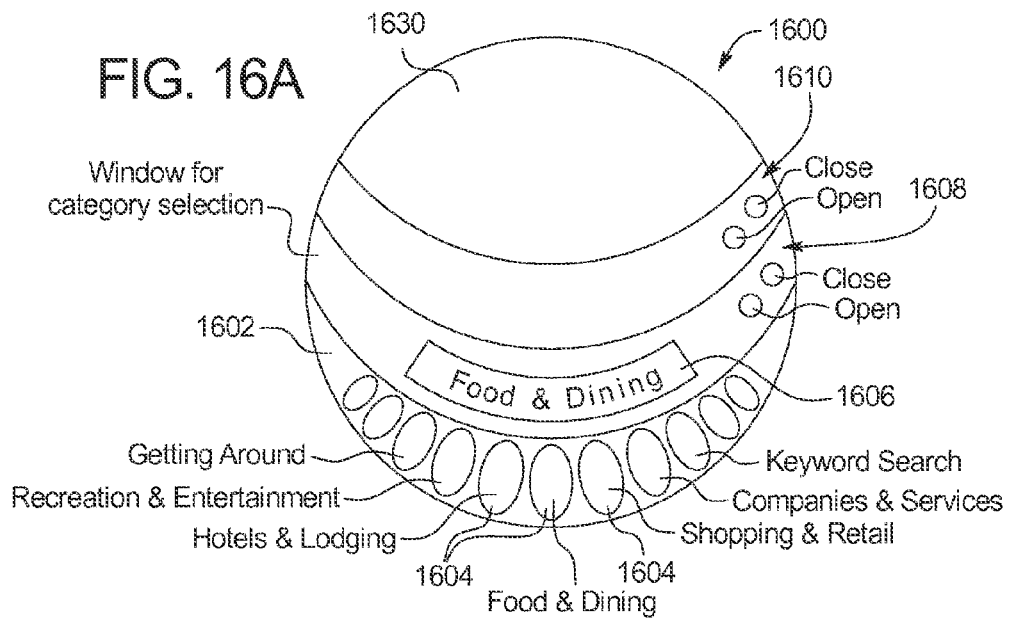
FIG. 16a is an illustration of one embodiment of a disclosed control in a fully nested or retracted position.
Figure 16B:
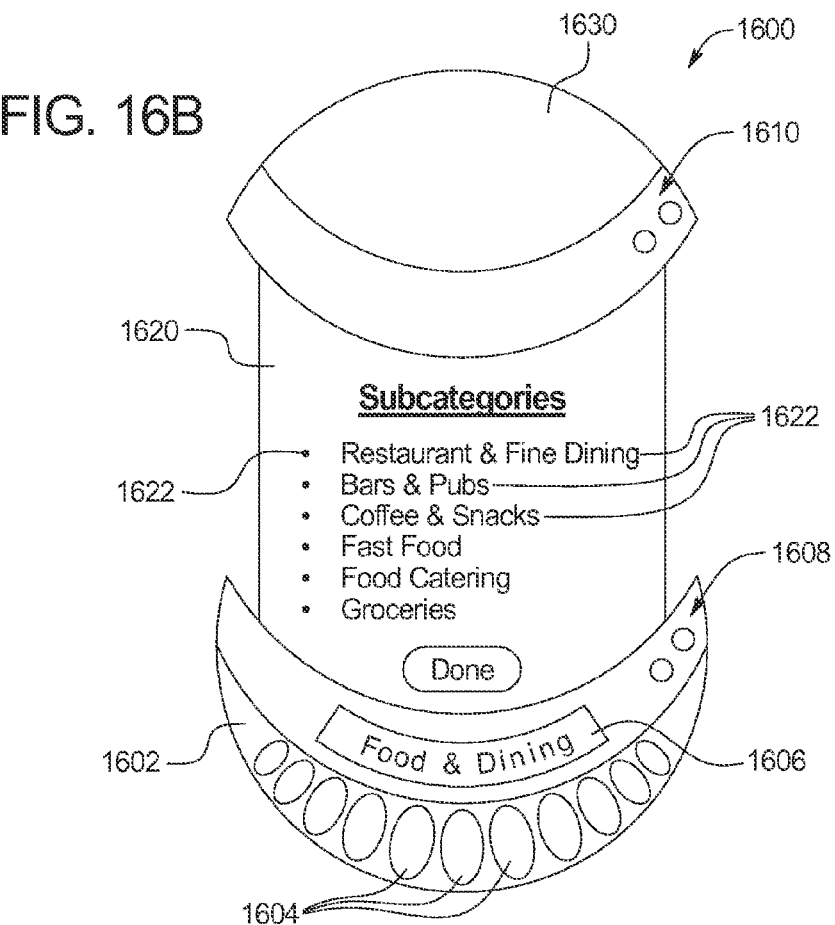
FIG. 16b is an illustration of the control displayed in FIG. 16a in a partially expanded position.
Figure 16C:
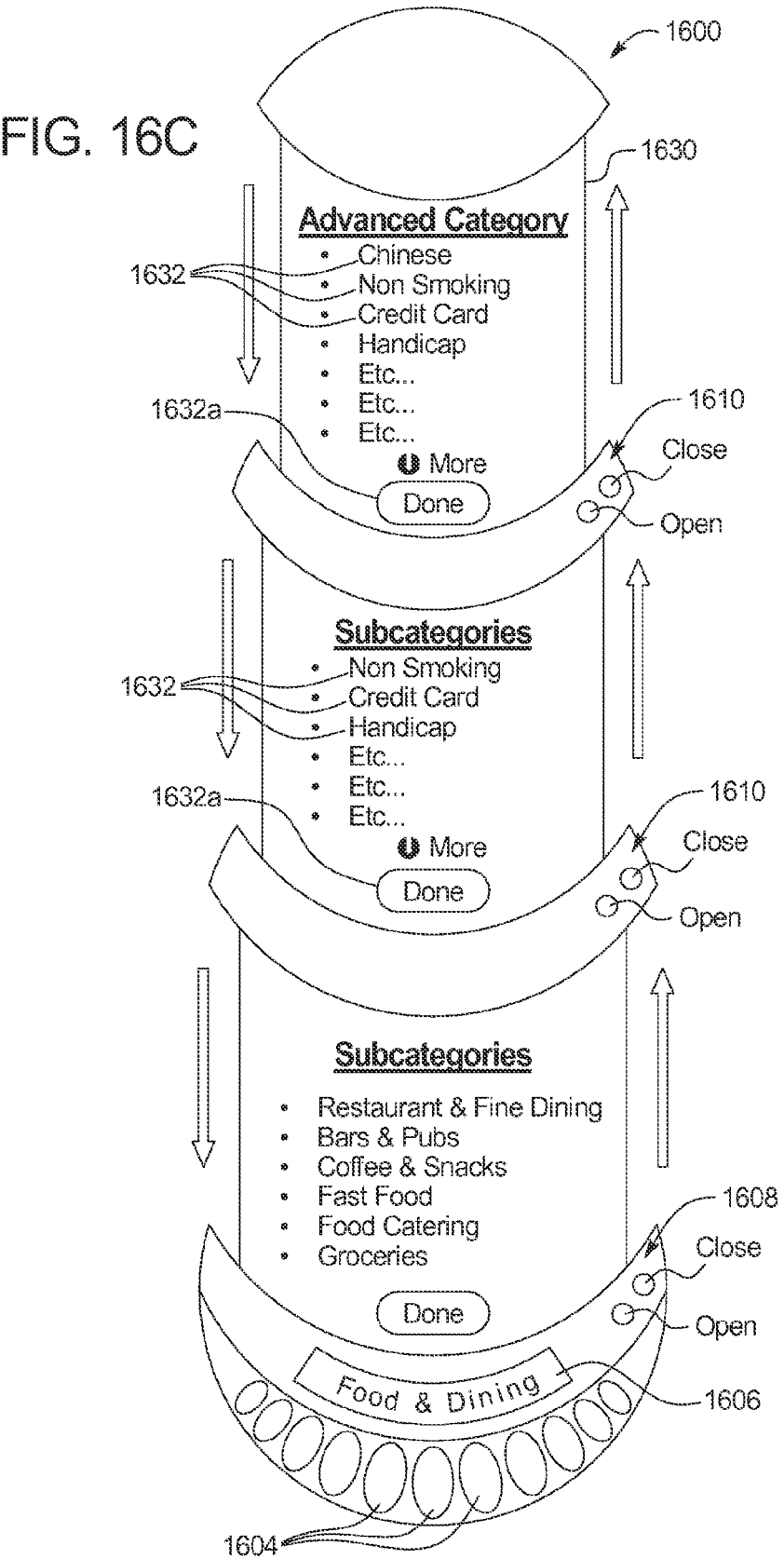
FIG. 16c is an illustration of the control displayed in FIGS. 16a and 16b in a fully expanded position.

In one embodiment, the system disclosed herein provides users with at least one control by displaying an image of a disc or circle with a plurality of nesting portions thereof. An example of this control is illustrated at FIGS. 16a, 16b, and 16c. As will be discussed below, FIGS. 16a, 16b, and 16c illustrate a single hierarchical control at various stages of extension or expansion.

FIG. 16a illustrates a nested control 1600 as disclosed herein. In the embodiment disclosed in FIG. 16a, the nested control 1600 is illustrated in a "down" or "closed" state, in which all the expandable portions of the circular control are retracted or nested, indicating that the user has not yet provided any input to activate the control. In the illustrated embodiment, the control includes an input section 1602 that includes a plurality of category selection areas 1604. In this embodiment, each category selection area 1604 is representative of a category of information, such that when selected, the control 1600 will display information pertaining to the selected category.

In one embodiment, each category selection area 1604 is labeled with the appropriate category. In an embodiment where the control 1600 is provided in a map navigation system, the category selection areas 1604 correspond to map-related categories such as Automotive, Travel, and Transportation; Postal, Communication, and Media; Food/Dining, Attractions, and Recreation; Shopping, Retail, and Consumer Goods/Services; Education, Health, and Personal/Human Services; Community and Government; Lodging, Housing, Storage, and Real Estate; and Money/Finance, Legal, and Business Services. In other embodiments, different or additional categories may be provided, depending upon the application for the control 1600.

In one embodiment, the category selection areas 1604 are color coded, with different colors corresponding to different categories. In an exemplary map embodiment, wherein control 1600 is used to provide information about features of a map, a Food and Dining category selection area is colored red. In this embodiment, one or more Food and Dining-related features of a map, such as restaurants, bars, or grocery stores, are indicated by a red indicator or map marker. In this embodiment, the correspondence of color codes between map indications and control inputs enables the user to easily navigate the control 1600 and the map.

In various embodiments, the control 1600 includes a display area 1606 that is used to display information associated with the control. In one embodiment, the display area 1606 is configured to display information about which category is currently selected. For example, if a user selects a Food and Dining category, the display area 1606 displays "Food and Dining." In the embodiment illustrated in FIG. 16a, the user has selected Food and Dining input category selection area 1604, and the display area 1606 of control 1600 correspondingly displays "Food and Dining."

In an embodiment, the control 1600 includes open/close input area 1608. In the illustrated embodiment, selecting the open icon (represented as a circle in FIG. 16a) causes the control to expand or open as described in detail below. In one embodiment, prior to opening or expanding the control 1600, a user must have first selected a category, and if the user has not, selecting the open portion of the open/close input area 1608 will have no effect. In this embodiment, the display area 1606 displays the selected category prior to the user selecting the open portion of the open/close input area 1608. Further, in this embodiment, the open/close input area 1608 is grayed out until a category has been selected. In another embodiment, if a category has not selected a category prior to selecting the open portion of the open/close input area 1608, a default category is used upon expansion of the control 1600.

In the embodiment illustrated in FIG. 16a, sub-category open/close input area 1610 is also illustrated. As will be explained below, when a user provides an input to the sub-category open/close input area 1610, the user can cause a sub-category menu to be further extended, to provide more detailed information about a selected menu entry for a particular selected category.

Item 1620 of FIG. 16a is a sub-category portion of the control 1600. In the illustrated embodiment, item 1620 is illustrated as being nested, closed, or not expanded in FIG. 16a. When opened or expanded as described below, control portion 1620 extends from the circular portion of the control 1600 and displays a plurality of pieces of information or sub-categories about the selected category. In one embodiment, control portion 1620 is expanded by providing an appropriate input to open/close input area 1608. Similarly, control portion 1630 is also a nested, closed, or non-expanded portion of control 1600. In the illustrated embodiment, control portion 1630 can be expanded to provide additional information about a selected sub-category, as will be described in more detail below. In one embodiment, the control portion is expanded by providing an appropriate input to open/close input area 1610.

FIG. 16*b* illustrates an embodiment in which the Food and Dining category has been selected, and the open portion of the open/close input area 1608 has subsequently been selected. In this embodiment, control portion 1620 has expanded upward, evidencing a nested arrangement within the control 1600. In this embodiment, sub-categories 1622 are illustrated on control portion 1620 depending on the category selected. For example, in the illustrated embodiment, sub-categories Restaurants and Fine Dining; Bars, Pubs, and Taverns; Coffee, Snacks, and Fast Food; Catering; and Grocery are illustrated as being sub-categories 1622 of the selected Food and Dining category.

In the illustrated embodiment, each sub-category is associated with a selection input 1624, which is illustrated as a selectable circle or bubble. In this embodiment, when a sub-category is selected, the selection input 1624 displays the selection, such as by appearing to have been filled in or shaded. In another embodiment, each sub-category can be selected by providing an input to select the sub-category, such as by clicking the sub-category word. In this embodiment, the system is configured to display an indication that the sub-category is selected, such as by highlighting, outlining, or otherwise indicating one from among the plurality of sub-categories.

Also in the illustrated embodiment, the open/close input area 1610 is displayed as being a portion of the expanded control portion 1620, consistent with the illustration of area 1610 in the non-expanded embodiment of FIG. 16*a*. In this embodiment, selecting the close portion of the open/close input area 1610 causes the expanded control portion 1620 to retract or nest within the control 1600. Also in this embodiment, after a sub-category has been selected as described above, selecting the open portion of the open/close input area 1610 causes the control portion 1630 that s nested within portion 1620 to further expand upward, revealing further information about the selected sub-category.

FIG. 16*c* illustrates an embodiment of the control 1600 in a state after expanding by selecting a category and then after further expanding by selecting a sub-category. In the illustrated embodiment, control portion 1630 has expanded upward so as to no longer be nested in portion 1620. In this embodiment, a plurality of further options 1632 is displayed to the user of the system. Specifically, the further options 1632 are options associated with a selected sub-category 1622 that was selected when the open portion of the open/close input area was selected. In one embodiment, the disclosed plurality of further options 1632 includes at least one "more" option 1632*a*, displayed to the user in the event that the selected sub-category includes too many options 1632 to display at one time in the portion 1630. In this embodiment, selecting the "more" option 1632*a* causes a plurality of additional options to be displayed, such as by displaying a scrolling effect. In another embodiment, one or more scroll controls, such as a scroll bar, are displayed in area 1630.

In an embodiment, selecting one of the further options 1632 causes the disclosed system to display information about the selected option outside of the control 1600. For example, if the sub-category "Restaurants" was selected, and the additional option 1632 for "Chinese" was thereafter selected, the disclosed system may display information about Chinese restaurants to a user of the system. In an embodiment where the control 1600 is used in conjunction with an interactive map, one or more indications may be displayed on the map indicating the location of Chinese restaurants. In another embodiment, the selection of "Chinese" in the more options 1632 may result in the display of information about Chinese restaurants without displaying the location of the restaurants on a map. It should be appreciated that depending on the environment in which control 1600 is displayed, the information displayed about the selected option 1632 may be tailored to the particular environment.

In one embodiment, while in its fully extended form as in FIG. 16*c*, the control 1600 enables a user to simply select a different sub-category 1622 without first retracting the portion 1630. In this embodiment, selecting the different sub-category simply causes the portion 1630 to display a different series of further options 1632, such as by immediately displaying a change or by quickly retracting and then extending area 1630 with the new further options 1632. In another embodiment, the user must retract the area 1630 by selecting the close portion of open/close input area 1610 prior to selecting a different sub-category 1622, then must select the open area of open/close input area 1610 after selecting the new sub-category 1622.

In one embodiment, a display area 1606 is included in the area 1620 to display information about a selected sub-category 1622. In another embodiment, a display area 1606 that is part of area 1620 displays information about a selected further option 1632 in the event such display is selected. For example, if the "Chinese" further option is selected for the sub-category "Restaurants," a display area similar to display area 1606 positioned on area 1620 may display a message such as "Chinese Restaurants Indicated On Map" to indicate that the map is presently displaying an indication of Chinese restaurants in the area of the map.

In various embodiments, the control 1600 is not circular in shape, but is some other geometric shape such as a square or an octagon, from which the extension portions 1620 and 1630 can extend. In various embodiments, control 1600 is a geometric solid, such as a cylinder, and nested geometric solids can extend therefrom. In still other embodiments, the control 1600 is another geometric solid, such as a prism, an elliptical solid, or some other appropriate geometric shape in which sections can nest. In various embodiments, more or fewer areas such as areas 1610 and 1620 are nested in the control 1600, depending upon the number of levels of hierarchical information to display.

In various embodiments, information relating to selected sub-categories or further options is displayed within the control 1600, such as on display area 1606. In other embodiments, information about selected sub-categories or further options is displayed in one or more display areas associated with the control 1600, such as on a map associated with control 1600. In various embodiments, control 1600 can be used to display hierarchical information not related to maps, such as hierarchical information related to file systems, folder structures, or other hierarchical organizations of information.

In one embodiment, the control 1600 is implemented as a physical device having a plurality of nesting elements driven by actuators. For example, a two-level control may include two cylindrical portions driven by a plurality of actuators, with input devices such as touch screens associated with each cylindrical portion. Specifically, each cylindrical portion corresponding to portions 1620 and 1630 may include a touch screen and display configured to display an image of a plurality of selections, and to receive user input in the form of touch inputs to the touch screens.

In one embodiment, an entry at the bottom of the plurality of sub-categories 1622 or the plurality of further options 1632 is a "Done" entry, which, when selected by the user, causes the appropriate portion 1620 or 1630 to expand into the control 1600. In one embodiment, selecting a "Done" entry (or the close portion of open/close input area 1608 or 1610) causes the portion 1620 or 1630 associated with that entry and all higher-level portions to collapse. For example, in the fully expanded embodiment of FIG. 16c, selecting the close portion of open/close input area 1608 causes the portions 1620 and 1630 to both collapse into the control 1600, resulting in the embodiment displayed in FIG. 16a.

In one embodiment, category selection areas 1604 are color coded to indicate which of a plurality of categories can be selected. In this embodiment, some or all of the information displayed about selected category/sub-category/further information is displayed as color-coded to the category selection areas 1604. In another embodiment, a string is displayed indicating each category that can be selected, and some or all information displayed as a result of selecting category/sub-category/further information is not displayed as color-coded to the category selection areas 1604.

In one embodiment, a further input area (such as a search bar or other input control) enables a user to define a particular search to be performed based on selected categories/sub-categories/other information. For example, if a user has selected the "Chinese" other information, an input control such as a search bar in one embodiment enables the user to search for Chinese restaurants that allow carry out by typing "carry out" into the control.

It should be appreciated that the control 1600 described herein is usable with the various map embodiments disclosed herein, as well as with other computer-based user interfaces. While the control 1600 has been described largely based on an exemplary embodiment in which map-related information can be displayed, other computer-based information repositories can also be searched or filtered using control 500.

In an embodiment, when a user provides an input to select subcategories and/or advanced elements from the advanced element list, the disclosed system enables the user to select the "finish" button, and displays the tool as sliding together into a compressed shape, revealing only the choice the user made. In this embodiment, this keeps the map as unobstructed as possible while keeping the user informed of his or her previous choices (and, consequently, the elements that are being displayed on the map). In one embodiment, the disclosed system also displays a miniaturize button to keep it visible and available while keeping map objects and location choices clear from clutter.

It should be appreciated that the controls illustrated in FIGS. 16a through 16c may be modified to implement any of the tools disclosed herein, such that any of the tools disclosed herein are implemented, at least in part, by a circular or disc shaped control from which various portions extend in a direction dependent on the position of the control on the screen.

Types of Advertisements Offered

In various embodiments, the system disclosed herein provides various mechanisms for clients (sometimes referred to as customers) of the system to generate advertising revenue for real-world businesses based on a virtual presence in the virtual city model. In one embodiment, the disclosed system enables the selection between four different types of advertisements—pinpoint ads, signpost ads, billboard ads, and storefront ads.

Briefly, in this embodiment, pinpoint ads are complimentary advertisement opportunities provided to companies or other entities whose real-world presence is reflected in a virtual map. In an embodiment, these so-called pinpoint ads are provided for free so that users of the system will be aware of the presence of the real-world entity while browsing the interactive map.

In one embodiment, signpost ads are special advertisements available to entities with a virtual presence in the computerized map with groups of minor locations throughout the map. For example, an urban transit agency with bus and train stations in a metropolitan area in one embodiment can purchase signpost ads so that a plurality map markers representing the stations (with little actual advertising content) can be seen when browsing the map.

In one embodiment, billboard ads are customizable advertisements that can be purchased by real-world entities with a virtual presence in the online map, and can be displayed at a neighborhood and a city scope. In this embodiment, billboard ads are highly flexible and customizable, so that the advertiser can specify with relative detail the appearance of the ad for its real-world presence.

In one embodiment, storefront ads are the most comprehensive type of advertisement offered to entities with a presence in the city, and are highly customizable in appearance and with multimedia content. In various embodiments, as described below, a storefront ad enables an entity to advertise at a neighborhood and a city scope, and to provide highly customized, multimedia advertising material to the users of the virtual map.

In one embodiment, in which the four advertisement types introduced above are provided, each type of advertisement differs from the others in one or more of a plurality of different aspects.

In one embodiment, the various types of advertisements differ with regard to how and when the location corresponding to the advertisement is shown on the map. As an example, the different types of advertisements can vary by size and shape. In general, the shape of a marker for an advertisement graphically indicates the amount of information available in the advertisement according to advertisement type. As another example, marker color identifies location top level category, which can be chosen from among the various categories discussed elsewhere herein or from other categories as appropriate. In one embodiment, the marker corresponding to an advertisement may vary by having different rules defining visibility scope, such that different advertisements are displayed at different zoom levels. In one such embodiment, city-level advertisements are shown marker shown at all zoom levels and map modes, neighborhood level advertisements are shown in neighborhood mode (as described elsewhere herein) and in city mode (as described elsewhere herein) beginning at a certain map zoom level. In one embodiment, site level advertisements are displayed when a user has accessed a three-dimensional layout mode to explore a particular building on the virtual map.

In one embodiment, each marker representing an advertisement is given a shape to correspond to a sub-category icon, when the location is pinned to the map. In a further embodiment, pin markers have a custom look, such as by being displayed as a corporate logo, in place of a default sub-category icon. In various embodiments, markers for advertisements are displayed as being animated such as by glowing or sparkling. In one such embodiment, this animation effect is applied at particular points in time to indicate that a time-based opportunity exists, such as discount offers, hot deals, coupons, and the like. In one embodiment, this feature is enabled in the "Show Promotions" mode described elsewhere herein.

In an embodiment, for a particular advertisement advertising an entity at a particular location, the system displays the name of the location on the map next to the advertisement marker. In a further embodiment, the name is only displayed if a certain zoom level has been indicated by the user. In an embodiment, this feature is enabled only for storefront ads as described in detail below. In addition, the availability of this feature may be limited by constraints, such as size constraints, of the map, such as in a situation in which a building footprint is already occupied by another business name or names.

In an embodiment, one or more locations corresponding to one or more advertisements have lightweight thematic animations displayed near them on the map. In this embodiment, the animations are typically related to promotional campaigns, and are typically only shown at certain zoom levels. In a specific embodiment, these thematic animations are only available for storefront ads.

The following description explains the user experience of one embodiment of the system disclosed herein when the user positions a mouse cursor over a location marker. It should be appreciated that while the following description refers to a mouse-based input device, other input devices, such as touch screens, could also be used. In these embodiments, various touch screen gestures, such as a single tap, correspond to the described positioning of a mouse cursor over a location marker.

In an embodiment, when a user positions a mouse cursor over a location marker on the disclosed map, the disclosed system causes the display of a location sign, which is a small pop-up window displayed next to the hovered-over marker. In this embodiment, the sign window includes a title bar, which contains location name and category icon. In various embodiments, the sign includes one or more lines of text placed under underneath the title, which in these embodiments can contain certain information about the location corresponding to the hovered-over marker. In one such embodiment, the system loads this location information from a so-called location data profile stored about the various locations on the map, to generate textual representations of slogans, catch lines, hours of operation, promotional text, or other information about the location.

In an embodiment, the disclosed system displays different information to the user when the user has selected the location using a mouse or other input device. In various embodiments, where touch screens or other input devices are used, various gestures (such as a double-touch gesture) can have the same effect as the selection operation described below.

In an embodiment, when the user selects a location, the disclosed system displays a pop-up window, whose size and content varies depending on advertisement type. In addition, depending on the type of advertisement purchased and provided by the selected location, the content and functionality presented to the user can vary such that different types of advertisements may be more effective but may cost more to purchase.

In this embodiment, each advertisement type includes a basic or minimal set of features, which can be further customized by adding on optional add-on features available with specific advertisement types. The following description highlights some of the features of different types of advertisements of one embodiment of the system offering the four types of advertisements introduced above.

In one embodiment, so-called pinpoint ads are non-commercial in nature. In this embodiment, pinpoint advertisements are provided to users of the disclosed computerized map system as complementary advertisements for prospective clients, with the expectation that the prospective clients will become full clients and will convert the pinpoint ads into commercial ads. In an embodiment, a pinpoint advertisement does not specify a business or location name. Instead, a pinpoint ad in this embodiment provides minimal information, such as information about the location category (such as 'Bank", "Restaurant", and the like). In this way, the system incentivizes purchasing a commercial advertisement by providing the purchaser with a way to specifically mention his or her business. In one embodiment, pinpoint ads also do not include location displays, and they do not provide the advertiser with add-on options. In this embodiment, the purpose of pinpoint ads is to provide location awareness for users of the computerized map system while attracting prospective clients who wish to advertise on the map. In one specific embodiment, markers for pinpoint ads are displayed as doughnut-shaped icons, are visible in Neighborhood view only, have a relatively small window size, have a relatively small font size, specify only the category of the advertised business, and do not display additional text or add-ons.

In one embodiment, pinpoint ads include only a so-called sign view, which is a view that can be seen when the user performs a particular type of input action such as the hovering action described above.

In an embodiment, so-called signpost ads are designed for showing generic objects of the same type, which have limited amount of associated useful information and do not require a full-featured display. For example, signpost ads may be natural fits for businesses wishing to advertise ATMs, parcel drop-off locations, newspaper stands, bus stops, and the like. In one embodiment, signposts are not available as standalone ads. They are intended for purchase by a single entity for use in multiple locations, such as by the operator of a transit system or the operator of a network of ATMs. For this reason, signpost ads may be frequently added in groups of locations that belong to the same classification category. In one embodiment, a multi-location advertisement package hosts one or more signpost groups related to different categories. In a specific embodiment, markers for signpost ads are displayed as having a target shape, and are usually visible in city and neighborhood views at all map zoom levels. In this embodiment, the signpost ads, in sign view, display a relatively small window, enable the display of a company name, a location name, and a category name, use relatively small title font, and display additional text depending on the category (for example, one line of text indicating the time of pickup for a parcel drop-off service). In a further embodiment, when the user selects a signpost ad using a different kind of input (such as a click input discussed above), the display view is initiated. In this embodiment, the display view is available for some kinds of ads (such as signpost ads) but is not available for other kinds of ads (such as pinpoint ads). In the display view, one embodiment of a signpost ads can display an object factsheet depending on the category (such as the bus stop name, route map, and timetable), may include certain special features, and may have a relative dimension of approximately ⅓ of the minor dimension of the window displaying the computerized map. In an embodiment, a signpost ad enables the user of an add-on in the form of a custom pin marker, which can be a company logo or other relevant icon, rather than a generic marker.

In various embodiments, so-called billboard ads are designed for businesses that want to advertise locally (such as in their neighborhood) at reasonable advertising prices. In one such embodiment, a billboard ad is displayed on the computerized map interface as a bubble icon, and is visible only at a certain map zoom levels. In one embodiment, the sign for the billboard ad (i.e., that is displayed when the user hovers over the marker for the ad) is a medium window size, displays the business or location name as the title, and is a medium font size. In this embodiment, the sign view also enables the display of one line of text, such as the string "Hours of operation—8:00 am to 6:00 pm." In a further embodiment, an additional line of text may be provided for, so that the purchaser of a billboard ad has an additional advantage with regard to information communication over the lower-tier advertising options. In one embodiment, in ad display mode (i.e., when the user clicks the marker for the billboard ad), a window is displayed that includes the business or location name, its address, its phone number, an image file providable by the business owner, and a fact-sheet as applicable. In an embodiment, this window is displayed in display mode as being 50% of the minor dimension of the computerized map display window. In one embodiment, purchasing a billboard ad enables the user to have the additional option to purchase a custom pin-marker add-on described above. In one embodiment, the billboard ad also provides for an option to purchase an additional line of text in the sign view, and in the display view enables the purchase of space to display an email address, a web link, and VoIP and Real Time Video Chat features by which the user of the computerized map can contact the business directly from his or her computer. Further, the billboard ad may provide the purchaser with the option to additionally purchase a larger description section (such as 1000 character section) with limited rich text functionality (i.e., limited ability to use bold, underline, italic, etc.) In various embodiments, additional add-ons for purchase by the advertiser include the ability to display additional features, the ability to include a membership section in which members of an affinity group are provided with special offers, the ability to select a coupon or promotion section in which a line of text can be displayed in the location sign indicating that a coupon or promotion is available, and the ability to add links to partners. In one embodiment, the billboard signs of the disclosed system also enable the advertiser to purchase a visibility upgrade, in which the location is indicated with a bigger size marker and can be visible at both a neighborhood view and a city view at all map zoom levels. In one embodiment, certain add-on features become available to an advertiser only after purchase of visibility upgrade option.

In various embodiments, the disclosed system also enables a client to purchase a so-called storefront ad. In one such embodiment, a storefront ad is a versatile multimedia advertisement designed for businesses that want to advertise at both a neighborhood and city scope, and offers a rich set of advertising options as is described in more detail below. In one embodiment, a storefront ad marker is displayed as a diamond, and is visible in a city and neighborhood views at all map zoom levels. In one embodiment, in sign view (such as when the user hovers over the marker) the storefront ad is displayed in a relatively large window, and includes the business or location name, in relatively large font. In this embodiment, in sign view, the disclosed system also displays two lines of text, up to 40 characters each, describing the advertised business or location. These two lines can be used to specify something about the location (such as the type of cuisine or the awards won by a restaurant), to provide a tag line, or to display other desired information. In one embodiment, in the display mode (such as after a user has clicked a storefront ad marker), the displayed window includes information about the business or location name, address, phone number, URL or web link, email address. In this embodiment, the display window also includes a gallery of pictures, and can display a fact sheet about the location or business. In an embodiment, a fact-sheet can also be provided, and a relatively long description can be provided and formatted with limited HTML formatting. In an embodiment, this display window is relatively large, such as 66% of the minor dimension of the window displayed by the map system disclosed herein.

In an embodiment, purchasing a storefront ad enables a user to also purchase one or more add-ons to further incentivize users of the map system to visit the advertising business. For example, the disclosed system in one embodiment provides a client with the option to purchase an add-on marker, which could enable the use of a company logo, could enable the display of the location name next to the marker on the map in various levels of detail (even without the user hovering over or otherwise providing inputs to the system disclosed herein), or could enable the advertiser to specify a promotional map animation particular to the advertised business or location. In various embodiments, depending on the price paid for the add-on the promotional advertisements could vary in complexity or interactivity. In various embodiments, the purchase of a storefront ad also enables the client to purchase an additional line of text for display in sign view. In one embodiment, the disclosed system enables the purchase of a number of add-ons to the display view of a storefront ad. For example, the VoIP and Real Time Video Chat feature described above could be purchased, additional pictures could be purchased, the ability to add music, sound and voiceover could be purchased, the ability to display video on the display view could be purchased, the membership section described above could be purchased, a coupon/promotional section adding a line of text to indicate promotions could be purchased, and/or the ability to provide a set of partner links could be purchased. In one embodiment, purchasing a storefront ad also enables the user to specify a second category listing, which may beneficial in directing more users of the disclosed system to the client's advertisements. In one embodiment, the storefront ads of the disclosed system also enable the advertiser to choose a less expensive local ad visibility scope, in which case the location is indicated with a smaller size marker and can be visible only at a certain map zoom levels. In one embodiment, certain add-on features are not available to an advertiser if he has chosen to purchase local scope storefront ad.

In various embodiments, aspects of the ads purchased by the client can be changed by the client as desired. In one such embodiment, the disclosed system provides a web-based interface through which the client can specify changes to its managed advertisements. In one embodiment, the disclosed system provides tiers of frequency with which the ads can be changed depending on the prices paid for the ads. In various embodiments, some of the aspects of an ad can be changed (such as the display view) and some of the aspects cannot (such as the sign view).

It should be appreciated that the specific types of advertisements described above are exemplary, and are not intended to be limiting. The instant disclosure contemplates that ads of varying levels of customizability could be sold at different prices depending on the features offered in various combinations in addition to or instead of the combinations described above.

Information Comparison Features

By implementing the above-described controls and features, the disclosed system advantageously enables users to readily compare advertising information provided by each of a plurality of businesses in the computerized map system disclosed herein. In various embodiments, this feature is referred to herein as "Ad Compare Mode."

Specifically, in one embodiment, the system disclosed herein is configured to display informational pop-up windows to provide a user with detailed information about various map objects. In this embodiment, the pop-up windows are displayed upon a user clicking on a map object, but it should be appreciated that other gestures or inputs could also trigger the display of such informational pop-up windows. In one embodiment, the map objects that trigger the display of a pop-up window are representations of physical objects, such as three-dimensional images of buildings, bus stops, and the like. In another embodiment, the map objects that trigger the display of these pop-up windows can be computer-generated objects such as search results, icons (such as map markers) or other computer-created artifacts.

In one embodiment, the system disclosed herein provides a so-called pinning feature in which a user can create, save, print and share custom maps, which contain and/or highlight specific map objects, relevant to user needs. In this embodiment, the specific map objects are those objects that the user has previously "pinned" for later display and use. In various embodiments, the disclosed system is configured to display a user's annotations to a map as being associated with that user. For example, in one embodiment a particular user's annotations are highlighted in a particular color, enabling the annotations of multiple users to be viewed simultaneously and easily distinguished from one another. In one embodiment, a user cannot alter the annotations of another user. In one embodiment, one user can alter the annotations of another user. In one embodiment, a user can control whether other users can alter that user's annotations. In various embodiment, the disclosed system enables a user to search another user's annotations, such as by searching for a particular user's favorite restaurants.

In one embodiment, the system enables creation of a customized map based on the assumption that the user will utilize category- or keyword-based search functions, will explore the search results by clicking over map objects and studying informational window content, and will gradually add objects to custom map according to some informal user criteria. In another embodiment, in which the assumptions about the user's interaction with the disclosed system are believed to be slightly more realistic, the disclosed system is designed with the realization that the creation of custom map in most cases is a multistage and iterative process. Under this assumption, when a user is dealing with multiple choices it is believed that he or she will typically do preliminary research by making a list of potential targets and will then narrow the list down by comparing and discarding the targets that do not comply with the initial search criteria (whether the computerized search accurately reflected that criteria or not). Moreover, it is assumed that during the process of creating a custom map, the user may desire to modify his or her search criteria (for example by using other search keywords, or adjust filtering options) in order to add more potential targets to a preliminary list and then repeat the list paring-down or shrinking step again. It is believed that this flow is often followed because users frequently do not initially know exactly what they are looking for or because the user may have several contradictory search criteria with fuzzy priorities (for example—hotel location, comfort level and pricing). That these priorities and criteria change frequently during search processes is an indication that a trade-off is often determined along the way in a relatively subjective manner.

The above beliefs factored in to the configuration of the disclosed system in that the disclosed system in one embodiment enables the user to effectively and conveniently review the list of preselected targets by providing a convenient way of comparing object information displayed in informational pop-up windows. It is believed that presently, the only way to effectively review such information in a map environment is for the user to click object markers on the map (or items at the search results panel) one by one and review pop-up window content, closing the window each time. Moreover, the result of such repetition is usually a brief description, while more detailed information is displayed on a separate web page that must be visited in a separate and distracting manner.

The disclosed system attempts to solve certain problems in the prior art by providing users with robust object information comparison options. In one embodiment, the disclosed system enables comparisons to be made from any kind of map and/or window manipulations, be it clicking over objects, map repositioning, window closing/opening, or moving windows around the screen.

The disclosed system recognizes that comparing informational windows can be effective if the system enables the user to either open the windows side by side or to quickly switch informational window content "in place." In one embodiment, the disclosed system enables the user to quickly switch informational window content about different map objects in place, such that the user does not need to shift his or her gaze between windows during comparison. In a further embodiment, the disclosed system provides easier information consumption by displaying windows whose information is laid out in the same way, such as by displaying a business name, operating hours, or service pricing, in the same location of a window regardless of what map object is being viewed.

In various embodiments, the disclosed system enables a user to display various objects across various categories at the same time and on the same map. In one such embodiment, category comparison, such as comparison of a restaurant with a bus stop, is not desired and does not make sense. To prevent the comparison of "apples to oranges," the disclosed system in one embodiment prevents a user from comparing items in different categories to one another. However, in this embodiment, the disclosed system enables the user to quickly and easily switch between categories, such that comparisons of restaurants can be quickly followed by comparisons of movie theaters, as an example. In one embodiment, therefore, the disclosed system maintains a set of lists of objects being compared, with each list in the set corresponding to a category of map objects.

In one embodiment, the disclosed system enables in-place information view to implement object comparison feature, restricting such allowed comparisons to items of a single category. It is believed that this embodiment remedies the problem of differing informational window layouts, as such differences in layout are believed to exist most prevalently between categories as opposed to within a category. In one embodiment, the disclosed system displays informational windows of standard base map object types (such as buildings, streets or bus stops) as having the same size and layout if they are for map objects of the same category.

As discussed elsewhere herein, the amount of information displayed may vary not only based on category of the map object, but also based on the advertising option purchased by the business owner. For example, some of the higher tiered advertising options described herein enable the user to provide more information, and to provide information in different fields, even within the same category.

The disclosed system in one embodiment overcomes the potential issue of varying content based on advertising tier in a number of ways. Specifically, in one embodiment the disclosed system sets an informational window size for all compared objects to the size of the largest window of the compared objects. In one embodiment, the system also positions smaller layouts in different places on the map window such that similar types of information (such as business name) are displayed on the same place in the window). In one embodiment, the ad windows are also designed so that as much of the common information as possible is positioned in the same place in the windows, such that switching between windows is as visually cohesive as possible.

In one embodiment, the object information windows for one or more map objects is able to have multiple pages of information. For example, selecting a map object for an airport may result in an object window that displays a list of all flights leaving on a given day from the airport. The disclosed system takes this possibility into account with regard to enabling easy comparison of informational windows by forcing the current object page to be persistent through the object switch function. In this embodiment, if a user is looking at the second page of information about a map object and switches to information about another map object, the disclosed system remembers that the user was looking at the second page of information so that when the user switches back, the second page is still being displayed.

Figure 17:
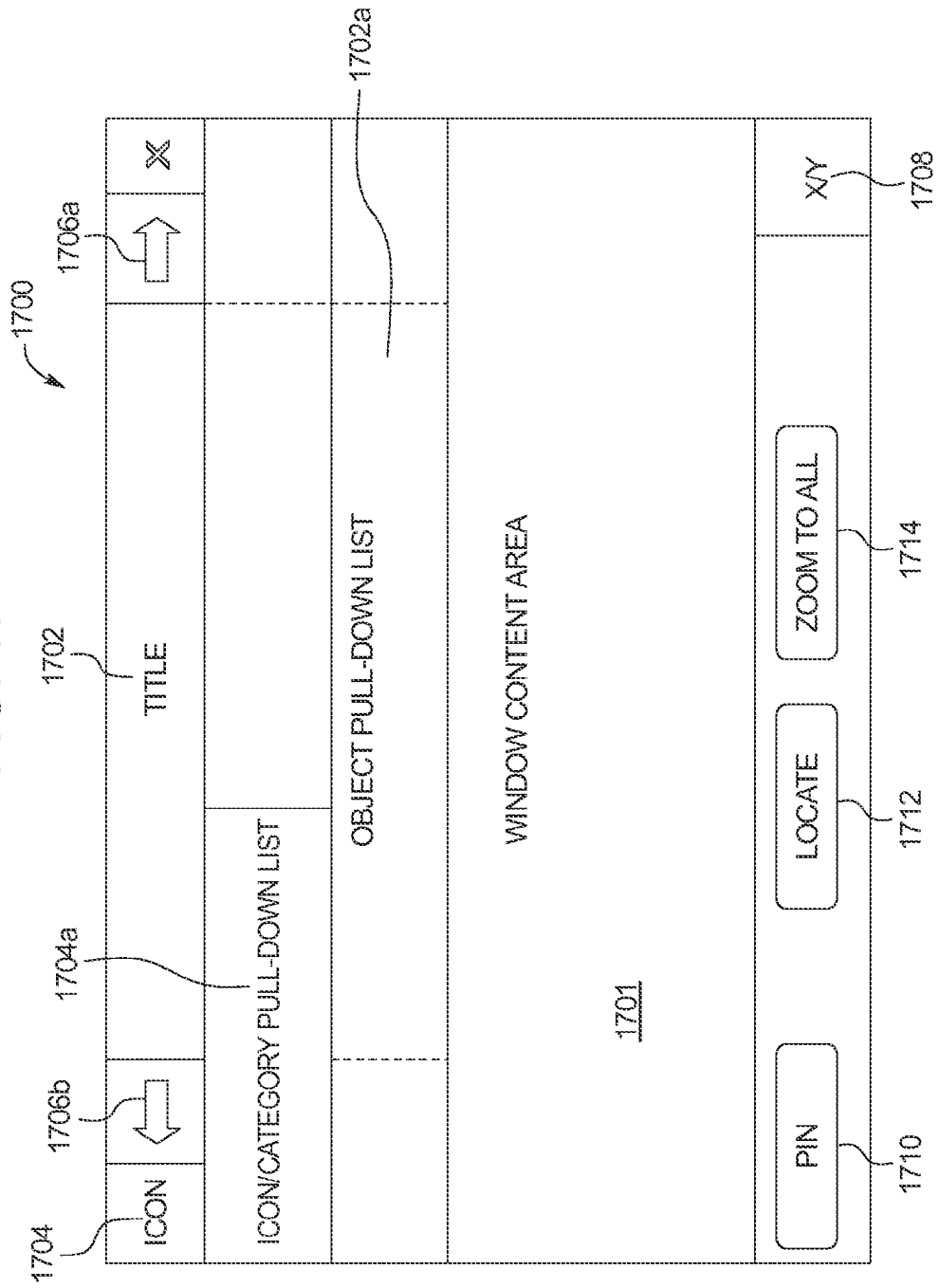
FIG. 17 is a schematic illustration of the functional layout of an alternative embodiment of an ad browser window displayed the system disclosed herein.

FIG. 17 illustrates an alternative of further embodiment to that described above with regard to the functional layout of an informational window displayed by one embodiment of the system disclosed herein. Specifically, FIG. 17 includes a screen shot 1700 of the template of an informational window that can be used to display information about map objects. The informational window 1700 includes a window content area 1701 for displaying content about a map object and a title area 1702 for displaying the title of the information window based on the selected map object. By selecting the title area 1702, the disclosed system displays an object pull-down area 1702a, which displays a list of pinned map objects within a given category of objects. The user can then select the various objects, by title, and switch to displaying information about that object in the window content area 1701.

Informational window 1700 also includes an area 1704 that the user can select to pull down an icon/category pull-down list 1704a. By selecting items in the icon/category pull-down list 1704a, the user can provide inputs to cause the system to switch between viewing pinned objects of different categories.

Forward arrow 1706a and back arrow 1706b enable the user to switch information displayed in window content area 1701 by cycling through the pinned objects of a given category. In one embodiment, the forward and back switching is done based on the order of the map objects in the list displayed in the object pull-down list 1702a.

In the illustrated embodiment, Current/Total area 1708 is a count indicator with the notation "X/Y." In this embodiment, the letter Y indicates the total number of pinned objects of the current category indicated by the area 1704. In this embodiment, X indicates which of those Y objects is currently being displayed in the window content area 1701. In an example of this embodiment, if the third object out of 10 total objects for a given category is being displayed, area 1708 displays the string "3/10".

Pin button 1710 enables the user to pin an object displayed on the map, such that the user can use the various previously discussed controls to navigate pinned objects. Locate button 1712, when selected by the user, causes the disclosed system to reposition the displayed map to an appropriate position to display the object whose information is currently being displayed in the window content area. Zoom to All button 1714, when selected by the user, causes the disclosed system to move and zoom the map to an appropriate position and zoom level to cause all the pinned objects within the current category, as indicated by area 1704, to become visible in the map window.

In the embodiment illustrated in FIG. 17, the controls displayed in association with the informational content area enable users to interact with the disclosed system according to a number of rules and workflow definitions. The following rules and workflow definitions are exemplary and can be varied in different embodiments depending on the type of behavior desired.

In the embodiment of FIG. 17, some of the window controls are disabled or invisible in certain states. For example, if only one category of objects has been pinned, the area 1704 to enable switching between categories is grayed-out in one embodiment.

In the embodiment of FIG. 17, the disclosed system is configured such that only one window instance of the window 1700 can be opened at a time. In this embodiment, if an object marker has been clicked on the map while the window 1700 is open and being displayed, the window must be closed and reopened, such as automatically or by the user, to display the clicked object content.

In one embodiment, when the user has opened a window 1700, the window does not move along with movements to the map, such that when the user pans or zooms around the map, the window 1700 stays in the same place. In one embodiment, the system enables the user to move the window 1700 by dragging it by the title bar. In this embodiment, the map under the window can then be panned and zoomed separately.

In one embodiment, if the system has previously displayed the window 1700 in response to a user clicking an object that is not currently pinned, certain of the illustrated controls will be disabled, hidden, or are otherwise displayed differently than illustrated in FIG. 17. For example, in one embodiment of the disclosed system, if an object has been clicked but no objects have pinned, the category icon pull-down list control 1704a is disabled and the area 1704 displays a regular category icon image. Also in this example embodiment, when an object has been clicked but no objects have pinned, the title pull-down list control 1702 is displayed as a regular text title, and the object pull-down list is disabled. In this situation, the next button 1706a and the previous button 1706b are disabled, since there is no set of pinned objects to cycle through. Since no objects are pinned, the Zoom to All button 1714 is also disabled. Likewise, the Locate button 1712 is disabled, and the area 1708 is not shown, again reflecting that no objects have been pinned and no objects can be cycled through. In this embodiment, the Pin button 1716 is displayed as pulled, or extending from the screen, indicating that the information currently displayed in window content area 1701 is about a map object that is not pinned.

In an embodiment where one or more objects have been pinned, certain of the controls described above as being disabled are enabled to enable cycling through and sorting by pinned map objects. In this situation, the category icon pull-down list control 1704a is enabled so long as objects from at least two categories are pinned. When selected, that control 1704a displays category icons corresponding to the categories of pinned objects, and may also contain an indication of the name of the category. Similarly, the object pull-down list 1702a is enabled so long as more than one map object of the selected category type is pinned. When selected, the object pull-down list 1702a in one embodiment displays titles of pinned objects within the category indicated in area 1704. If multiple objects are pinned in the selected category, the next button 1706a and the previous button 1706b are both enabled facilitate cycling through pinned objects of that category. Likewise, the "Zoom to all" button 1714 in one embodiment is displayed and enabled and the current/total indicator 1708 is displayed if multiple objects of the current category are pinned. In this embodiment, wherein the information displayed in the window content area 1701 is about a pinned item, the pin button 1710 is displayed as being pushed, such that clicking the button again un-pins the map object.

In one embodiment, the disclosed system displays the locate button 1712 as enabled when the current object becomes invisible due to map panning or zooming. In this embodiment, when the locate button 1712 is pressed (and the map is moved to focus on the current object), the disclosed system is configured to disable the locate button 1712.

In one embodiment, the next button 1706a and the previous button 1706b enable a cyclic browsing flow, in which when the last object in the list has been reached, the first object will be displayed upon a user clicking the next button 1706a.

In one embodiment, when the object category is switched via Icon Pull-down list control 1704a, the size of the window may change due to different window layouts defined for different categories. In one embodiment, when a map object is pinned or unpinned using the Pin button 1710, the size of the window may also change. In one embodiment, the size of the window increases when an object is pinned, and the size of the window decreases when the pinned object is unpinned. In an embodiment, this functionality can be seen when a category contains a group of objects with different types of ads and the current object window has window size smaller then maximum size within the group.

In one embodiment, an indicator of the current object, such as an outline of the current object, on the map is animated to enable the user to associate the opened window with the object on the map. In this embodiment, the disclosed system displays this animation as a slow glow, a slow rotation, or a slow pulse of an icon on the map. In one embodiment, where the windows 1700 have at least some transparency, the animation of the object markers will be displayed as being visible through the window 1700, enabling the user to easily tell the context of the currently-viewed portion of the map.

Ad Browser

In various embodiments, the disclosed system provides a tool referred to as the Ad Browser tool. In these embodiments, the Ad Browser enables users to explore, select, and compare business or other types of ads in an advantageous manner.

In one embodiment, the disclosed system displays the Ad Browser tool as a pop-up informational window that showcases advertizing content associated with business, public, or government locations represented as map elements in the disclosed map. In various embodiments, these locations are indicated within the map as map markers, and the system causes the Ad Browser window to be displayed when a user clicks over a map marker that includes associated advertising content.

In various embodiments, as discussed above, the disclosed system displays map markers on the map as a result of using the search feature, which is provided by the Explorer Tool, and allows a user to discover various map locations according to his or her preferences or search criteria. As described above, the map elements that can be displayed within the disclosed map are divided into a handful of general top level categories, each of which, in turn, is comprised of more specific subcategories. In one embodiment, as described in detail above, a basic map search results in the display of map markers of a single subcategory, such that when several searches are layered over the map as separate sets of map markers (search layers), map markers of different subcategories can be simultaneously displayed.

In one embodiment, the disclosed system enables the Ad Browser to run in two different operational modes: a "Normal" mode in which a user can pick any location within a search layer and view its ad content in a pop-up window and a "Compare" mode in which the system enables the user to pick several map locations associated with one or more layers and displays a comparison of the selected ads by displaying a stack of ad windows.

In various embodiments, locations selected by the user for comparison for some other reason in the Ad Browser can be pinned using a "Pin" feature. In these embodiments, pinned locations are labeled on the map via special icon marker, associated with the subcategory of the pinned location. In an embodiment, the disclosed system is configured to continue to display pinned location markers on the map, even after the user closes a corresponding search layer. Consequently, pinned locations can be used later on for reviewing location information and/or comparing location information with other discovered locations of the same subcategory. In addition, by pinning locations to the map a user can create custom situational maps pertinent to his or her goals or interests.

In one embodiment, the "Pin" feature enables a user to create, save, print and share custom maps, which contain or highlight only specific map locations relevant to user needs. On general workflow tracking a user's creation of a custom map includes the following steps:

1. The user utilizes category- or keyword-based search;
2. The user explores search results by clicking over discovered locations and studying their associated information; and
3. The user gradually adds locations to custom map according to some informal user criteria.

In a further workflow, supported by the disclosed system, accommodation is made for the fact that creation of custom maps is in many cases a multistage and iterative process. The disclosed system thus accommodates the fact that users often do some preliminary research by making a list of potential targets and then narrow down the research by comparing and discarding the targets that do not adequately match search criteria. Moreover, the disclosed system enables the user to create customized search results by continually modifying his or her search criteria to add more potential targets to a preliminary list and thereafter to repeat the list shrinking process. In an embodiment, the disclosed system enables to create multiple different layers for multiple different searches of varying priorities, even when those searches include contradictory search criteria. In this way, the system disclosed herein enables users to make trade-offs with regard to their search results (such as tradeoffs of hotel quality versus price). The disclosed system provides a convenient way to compare location information, displayed in pop-up windows, and thus enables the user to effectively and dynamically review lists of preselected targets.

One shortcoming of known map systems is that locations must be clicked one by one, and information reviewed about those locations in separate pop-up windows. Moreover, known maps provide only a very brief description, while more detailed information is displayed elsewhere on a separate web page. In such systems, there are a number of negative implications associated with this functionality:

- Some location markers can be obscured by opened pop-up window and we have to close it first to get to the map. This adds an extra step and slows the work down;
- It may be difficult to remember which markers have already been clicked, especially when we have a number of them on the map. Also, markers can be hard to find if we have overlaid search results from several categories, which can make the map quite busy. It becomes even more challenging, if the map is intermittently obscured by a pop-up windows, since the user has to keep the map in his or her brain during this time;
- Map markers may be located at a distance from each other. Thus, in known systems, it may be impossible or highly inconvenient to see all locations of interest on the map at the same time, since at low map zoom levels the map may display substantial numbers of irrelevant markers and become almost unusable. Therefore, in this case known systems force the user to constantly reposition the map in order to find the same location over and over again. Particularly when the user is exploring a specific local area at high map zoom level in order to find and add more locations to a comparison list, it is extremely inconvenient to move away from the viewed area to compare newly added locations with other, more remote, locations. Continuous map repositioning also adds time-consuming extra step to the process and takes the user from his or her main pursuit, that is, location information analysis and comparison.
- Finally, in known systems, the user is often forced to close currently opened informational window to get to the next one. In this scenario, known systems are disadvantageous because additional time needs to be spent closing and opening windows.

The disclosed system remedies many of these problems. IN various embodiments, the disclosed system enables comparing informational windows by either displaying them as opening side by side or by enabling the user to quickly toggle informational windows "in place," as will be described in more detail below. In a first embodiment, the disclosed system enables side-by-side comparisons but requires that the system constrain itself by screen space. In a second embodiment, in which the disclosed system enables toggling between windows, advantages can be realized from the fact that there are no space limitations and the user does not need to constantly shift gaze between windows during comparison. As a result, in one embodiment, the disclosed system displays informational windows having identical or nearly identical layouts, such that titles, pictures, and the like are always in the same position of the window. In this embodiment, comparing information by toggling windows in place becomes very convenient, since each informational field within a window, such as, for example, working hours or pricing, etc., always stays at the same screen position regardless of actual content.

In one embodiment, the disclosed system enables several search layers to be displayed over the map at the same time, where each search layer includes locations of a specific subcategory. In this embodiment, the disclosed system only enables the comparison of map elements within a single category, since users typically would not want to compare among a plurality of categories. Of course, the disclosed system enables the user to switch between search layers to compare and select locations of different subcategories in a concurrent manner. Thus, in various embodiments, the disclosed system enables the user to work with several lists simultaneously (e.g., one list per search layer), and quickly switch between these lists in the various categories.

In various embodiments, advertisement layouts may vary within a single subcategory due to differences among ad packages and actual ad package options, chosen by an advertiser. The different types of advertisements that can be purchased have been described elsewhere herein. In these embodiments, the disclosed system facilitates easy comparison of these advertisements by providing one or more of the following features:

- setting informational window size to maximum among all instances of compared ads;
- proper positioning of smaller (basic ad) layouts inside enlarged window frame, used by advanced ads;
- consistent ad window layout design for different types of ad packages within one subcategory, where informational fields shared by several ad layouts always stay at the same relative window positions;
- using alternative ad window layouts for Ad Browser "Compare" mode in order to make all layouts of one subcategory in this mode spatially compliant with each other.

In various embodiments, the "Compare" feature is closely interrelated to the "Pin" feature because pinned markers are frequently the result of a user comparing advertisements for map elements of a particular category. Thus, the result of comparing advertisements is often a map with a plurality of pinned locations, which constitute customized maps specific to a particular user. In various embodiments, the disclosed system enables users to print or share these customized map by email, social networks, or other communications mechanisms. Moreover, the disclosed system enables a user to iteratively update and change customized maps previously created, as the user's goals in creating a customized map change over time.

In one embodiment, the disclosed system provides an alternative to adding pinned locations to a comparison list one-by-one. In this embodiment, the disclosed system enables the user to select an option to add all pinned locations to a comparison list. In an alternative embodiment, the disclosed system provides the user with an option to add only those pinned locations that are visible, only those pinned locations in a particular neighborhood, only those locations that are sufficiently close to a particular location, or only those pinned locations that satisfy some other appropriate kind of criteria, to a comparison list These embodiments advantageously eliminate the necessity to look up the same pinned locations each time a user wishes to compare them with something else.

The following paragraphs provide further detailed functional specifications of the Ad Browser features.

As noted above, the disclosed system enables a plurality of layers to be stacked on top of a particular map. In one embodiment, each layer has one instance of Ad Browser window associated with it. Further in this embodiment, Ad Browser window instances are created and destroyed simultaneously with the layers and are thus independent from other Ad Browser window instances. In one embodiment, an Ad Browser window is defined by at least some or all of the following parameters:

display status (open or closed),
 content and view (current viewable section/page of displayed ad),
 operational mode ("Normal" or "Compare"),
 window size (regular or reduced), and/or
 window coordinates (relative to map window).

In one embodiment, the initial state of a newly created Ad Browser window instance is defined by at least some or all of the following parameter values:

display status—closed;
 content and view—undefined (identified each time when the window is opened or updated);
 operational mode—normal;
 window size—regular; and/or
 window coordinates—undefined (computed when the window is opened for the first time initially the window should be centered relative to parent map window).

In one embodiment, when a window is closed, all parameters are reset to their initial values, except window coordinates. In this embodiment, the disclosed system maintains window coordinates for closed windows whenever possible such that the next time the window is opened, it is be placed at the same coordinates it had previously been displayed at. In one embodiment, when a window is open, the value of this parameter is changed by the user each time he moves the window across the screen. The disclosed system in various embodiments is also configured to alter window coordinates if the window goes out of view based on user activity.

Referring now to the embodiment of FIG. 21, any search layer that includes an open instance of an Ad Browser window is marked via special icon, located at the layer tab area next to the layer title (subcategory name). The shape of the icon indicates window operational mode. Specifically, in the embodiment of FIG. 21, the window opened with current search layer in "Normal" mode, is indicated via the "window frame" icon 2100, while the window, opened at non-current search layer in "Compare" mode (hidden), is indicated via "two overlapped window frames" icon 2102.

In one embodiment, to display a hidden Ad Browser window of a non-current search layer, the disclosed system enables the user to select a layer as current by clicking the layer's tab. Alternatively, the user may double-click a map marker of a noncurrent search layer (hereinafter referred to as a "foreign marker"), or click "Show Ad" button at the foreign marker "Location Sign" pop-up box as described elsewhere herein. In the latter case the layer is automatically set as current, which causes its associated window instance to be opened (if it has not been opened before) and displayed. After that, the window content is updated to display the ad, associated with clicked marker, and the size of displayed window is set to "regular." In one embodiment, when layers are being toggled, a toggled-to window is moved to the coordinates at which the window has been last seen before being hidden.

In one embodiment, when a user clicks over a map marker, which associated search layer doesn't have an open Ad Browser window, the disclosed system opens a window in "Normal" operational mode. One embodiment of this "Normal" operational mode is illustrated in FIG. 22. FIG. 22 illustrates a schematic representation of an advertisement 2200 for "Bob's Bar and Grill," displayed in "Normal" mode. In the illustrated embodiment, advertisement 2200 includes the following interface elements:

location subcategory icon 2202;
 "Compare/Normal" mode toggle button (in pulled position) 2204;
 blank area (dashed outline), used to display notifications and for dragging the window 2206;
 location "Pin/Unpin" button 2208; and
 window close button 2210.

Additionally, the window has "Reduce/Expand" button 2212 located at the bottom right corner of the window. The functionality enabled by these various buttons and controls is detailed below.

In the embodiment of FIG. 22, the window inner area features hypermedia content, associated with clicked location and may contain additional user interface controls, which are specific to ad package type and options chosen by advertiser.

In one embodiment, the disclosed system enables the user to activate an Ad Browser "Compare" mode by selecting a "Compare" button 2204 located at the window control panel of an ad window. In the embodiment illustrated in FIG. 22, the button 2204 is a two-positional switch, which allows user to toggle between "Normal" (pulled position, as illustrated in FIG. 22) and "Compare" (pushed position) modes. In one embodiment, once the button has been pushed, its graphical label changes accordingly to indicate the "switch to Normal mode" action.

In "Compare" mode, the ads being compared are displayed as a "deck of cards". An example of an Ad Browser window 2300 in compare mode is displayed in FIG. 23. After the user selects button 2204 to switch to Compare mode from Normal mode, the deck contains a single ad. Subsequent clicks over map markers of current search layer append their associated ads to the top of the deck instead of just updating ad window content, which is implied behavior in "Normal" mode. If a user clicks over the map marker, which has been already appended to the deck, the deck is scrolled until corresponding ad appears at the top of the deck. As noted above, in one embodiment ads associated with foreign markers (i.e., markers of different categories) can not be added to the deck, since they always have to be displayed in the Ad Browser window instance of another search layer.

The Ad Browser window in "Compare" mode is schematically illustrated by window 2300 of FIG. 23. Specifically, FIG. 23 illustrates an Ad Browser in Compare mode after the user has appended a second ad to the deck, as indicated by the indicator 2302b that the currently viewed card is card 2 of 2.

In addition to user interface elements already discussed in the "Normal" mode discussion with regard to FIG. 22, the window 2300 includes the following controls, located above the control panel:

"Show Next/Previous Ad" buttons 2302a—used to go through the deck back and forth by moving the topmost ad to the back of the deck and vice versa;

"Current/Total" counter 2302*b*—indicates the order number of currently displayed (topmost) ad and total number of cards in the deck; cards are numbered in the same order as they are appended to the deck; if later on the user removes a card from the deck, then all cards with numbers higher, then the number of recently removed card, are renumbered accordingly.

In addition, in the embodiment of FIG. 23, the disclosed system displays an "Append Pinned Locations" button 2304. In one embodiment, the disclosed system automatically enables this button if current search layer already has locations, which have been pinned to the map by a user, and at least one of these locations is missing in the deck. When user appends pinned locations to the deck with button 2304, the disclosed system in one embodiment provides the user with the option to append either all missing locations, or just the locations that are visible at current map view.

In one embodiment, the disclosed system enables the user to remove location ads from the deck one by one by clicking window "Close" button 2210, which in one embodiment causes the topmost location ad to be discarded. In one embodiment, the disclosed system causes the Ad Browser window to close when the last ad is removed from the deck. Alternatively, the user can toggle the Ad Browser window back to "Normal" mode, in which case all location ads, except the topmost, will be removed or closed. After that the user can close the window by clicking "Close" button.

In one embodiment, when a user toggles the Ad Browser window mode back to "Normal", the disclosed system essentially clears the compare deck. Thus, when the user provides an input to toggle back to "Compare" mode again, the deck will be displayed at its initial state with a single location ad in it. In various embodiments, this behavior may not be desirable, since the "Normal" button can be simply pushed rashly or by accident, which will cause the list of compared locations to be irreversibly lost. In an embodiment, therefore, to avoid this scenario, the Ad Browser provides a safety check. Specifically, in this embodiment, the disclosed system maintains the most recent compare deck is in memory until the user closes the Ad Browser window or updates its content by clicking over another map marker. Consequently, in this embodiment, when the user toggles the window mode from "Compare" to "Normal", and then back to "Compare", recent compare deck will be restored.

In one embodiment, if the user is manipulating advertisements using the Ad Browser, the disclosed system still enables the user to perform other actions, such as using tools or otherwise interacting with the map. For example, the user can move or zoom the map in various ways using the Navigator Tool. Likewise, the user can change the search criteria of current search layer or set various map marker display modes using the Explorer Tool. In various embodiments, performing these actions at the time when the Ad Browser window is open, causes certain side effects with regard to the map marker, associated with currently displayed ad. For example, in one embodiment, the following situations may arise if a user tries to perform certain navigator actions while the Ad Browser is open:

1) The map marker, associated with currently displayed ad, may go out of view after a user repositions the map using the mouse or the Navigator Tool;

2) The map marker, associated with currently displayed ad, unless pinned, may vanish upon the Ad Browser window close after a user does one of the following:

(a) zooms out the map beyond the local ad display threshold, provided, that currently displayed window is associated with the local ad (which marker is displayed on the map only at high map zoom levels); and/or (b) changes the search criteria of current search layer in such a way, that displayed ad no longer satisfies the criteria, provided, that "show discarded locations" option of the Explorer Tool is set to OFF state.

In one embodiment, to warn the user about these situations, the Ad Browser in one embodiment displays relevant notification message in the designated area of the window control panel. In addition, in one embodiment, the action button is displayed next to the message text, which allows the user to fix the situation. For example, in one embodiment, the system is configured to display a message that informs the user that the "Map marker is currently out of view! Move the map to reveal the marker." In another embodiment, the disclosed system displays a message that informs the user that the "Map marker may vanish upon window close! Use pin or lower the altitude to see local ads." Finally, the disclosed system in one embodiment displays a message that the "Map marker may varnish upon window close! Use pin or map the ads discarded in the search."

As described above, some of the embodiments of the system disclosed herein include a "Locate" button, a "Descend" button, and/or a "Show Discarded Locations" button. A more detailed description of these buttons follows.

In various embodiments, the disclosed system displays an enables the user to activate a "Locate" button. In "Normal" mode, activation of this button causes the disclosed system to pan the map a the position where the location marker becomes visible. In this embodiment, the map zoom level is not changed unless the system determines that the currently displayed window is associated with the local ad, and that the current map zoom level is beyond the local ad display threshold. Otherwise, the disclosed system sets the zoom level to local ad display threshold. In this embodiment, the system chooses the marker position in such a way that it is not obscured by the Ad Browser window and resides in the close proximity to it.

In various embodiments, when the user activates the "Locate" button in "Compare" mode, the disclosed system is configured to position the map in such a way that all compared locations become visible at a current map view. In this embodiment, the system does not alter the map zoom level is not changed unless it is necessary in order to fit all location markers within the map window.

In various embodiments, when the user activates the "Descend" button, the disclosed system is configured to descend to a local ad display level keeping the mark at the same position. In various embodiments, when the user activates the "Show Discarded Locations" button, the disclosed system is configured to turn on the display of locations that don't satisfy the search criteria set by user for current search layer. In one embodiment, locations, which have been discarded in the search, are indicated on the map via hollow markers with dashed outline.

In various embodiments, once the user performs suggested action, the disclosed system displays the message and the action button as fading away from the control panel. Alternatively, the message may fade away automatically when it becomes irrelevant. Finally, there may be more then one message, associated with the marker. In this case deferred messages are kept and displayed to the user one after another as soon as the user completes suggested action.

In one embodiment, since the size of an Ad Browser window is relatively large, a user may have to move it around the screen, or close it entirely, in order to see and access location markers. Moreover, in various embodiments, while the system is operating in "Compare" mode, the user can not close the Ad Browser window without loosing compared locations. This can make appending of new locations to a compare deck quite cumbersome, and furthermore it may be impossible to see the map markers of the locations being compared all together.

To overcome this situation, one embodiment of the disclosed Ad Browser provides the "Reduce/Expand" toggle button, illustrated as button 2212 in FIG. 22, located in the bottom right corner of the window. In this embodiment, the Reduce/Expand button 2212 enables the user to provide an input to shrink the ad window to a relatively small size. In reduced size state, the disclosed system provides a relatively minimal amount of information, such as location name, tag line, and one or more additional text fields, which are most useful from comparison point of view. In a further embodiment, the actual list of displayed fields depends on the subcategory associated with current search layer. In one such embodiment, the disclosed system just displays two items in the reduced window. For example, in one embodiment, the disclosed system displays the reduced window including working hours, pricing, and the like for an advertised business.

In various embodiments, when the disclosed system is displaying the Ad Browser window as open for current search layer in "Normal" or "Compare" mode, the disclosed system displays the map marker(s) currently associated with the displayed/compared ads as animated according to an animation scheme described below. In these embodiments, the disclosed system attracts user attention and provides visual connection with the associated ad windows through the animation of displayed or compared ads.

In one embodiment, in "Compare" mode, the disclosed system displays map markers associated with compared locations using a pulsating animated dashed outline effect, drawn around the map marker as it is schematically illustrated on the map.

In one embodiment, in both "Normal" and "Compare" modes, the disclosed system is configured to display the body of a current map marker associated with a displayed/topmost ad as animated using a "glow" or "sparkle" animation effect.

In one embodiment, the disclosed system animates map markers in a "Compare" mode using both described methods at a single time.

In various embodiments, the animation frequency displayed by the disclosed system is selected is such a way that it is not too high to irritate a user's view, and not too low so the user would fail to notice it with his peripheral vision.

In various embodiments, map markers of locations that have been viewed in the Ad Browser at least once are indicated via a static dashed outline. In this embodiment, indicating the markers as described enables a user to track visited locations on the map. In an embodiment, the indication of visited locations can be turned on or off by toggling corresponding button of the Explorer Tool.

In one embodiment, on low map zoom levels, the disclosed system enables several markers to be grouped and displayed as a single marker to avoid marker overlapping and to reduce clutter. In this embodiment, with regard to the Ad Browser, the disclosed system is configured to display a group marker icon that is inherited from its child markers according to the following rules:

1. If a group marker contains current map marker associated with a displayed/topmost ad, its body is animated via "glow/sparkle" method.

2. If a group marker contains at least one map marker, associated with one of compared ads, it is indicated on the map via an animated (pulsating) dashed outline. In addition, if the group marker contains two or more compared markers, the total number of such markers within the group is indicated by a numeral in association with a group marker, such as by displaying the numeral in the bottom-right corner of the group marker. In various embodiments, group marker numbering ensures that the user will be able to quickly identify all compared locations on the map instead of trying to find missing markers if the number of visible markers does not match the expected number of markers.

3. In one embodiment, if all locations associated with the map markers contained in a group have been visited, the disclosed system is configured to indicate the marker a via static dashed outline, provided that none of these locations is currently placed to a compare deck. Otherwise, the rule #2 is applied.

The disclosed system in one embodiment enables a user to create a customized map tailored to his or her specific desires. For example, the disclosed system enables the user to navigate or search a map to generate a starting point or a contextual center. Alternatively, the disclosed system enables the user to select a starting point or a desired location on the map by selecting a particular neighborhood or area of a geographic area, thus providing context to the remainder of the use of the system.

Thereafter, the search and navigation tools enable the user to locate map objects by category, subcategory, name, address, or proximity to other objects. Using the various information comparison features, the user can thereafter compare multiple objects with one another to determine which object he or she is most interested in. Also, by taking advantage of the client-related features described herein, such as the ability to purchase advertisements of varying complexity and sophistication, the advertisers can ensure that the user has the most appropriate and accurate information needed to make informed decisions related to map elements. In addition, where searches are performed returning multiple results, the disclosed system enables users to quickly page through the results, comparing them quickly based on the system's efforts to display like information in similar places on the screen as the user cycles through the search results.

Having searched for and found map elements that are of interest, the disclosed system provides a mechanism for memorializing the search results, including by enabling a user to pin one or more map elements for future use. Thus, the disclosed system enables the user to create customized maps for any purpose. For example, if a user is planning a recreational trip, the user can search for and pin map elements of varying types and in different categories to plan out the entire trip. Likewise, if the user is preparing map as a set of recommendations for restaurants, as an example, the disclosed system enables the user to create a user-friendly reference guide detailing the location and information about the plurality of restaurants.

In various embodiments, the map provided by the disclosed system can be viewed as a portal with its own identity. In this embodiment, once the user provides inputs to enter a specific place represented by a map element, the system provides an experience that looks and feels like the entered place.

In various embodiments, some of the purposes of the system disclosed herein are to (1) create neighborhood atmosphere; (2) provide for intuitive and relevant search; (3) provide for an enticing interplay between elements of the map; (4) bind the look and feel of a real (brick and mortar) location to the virtual (map) location. In these embodiments, the following general features enable the above-noted purposes: (1) the disclosed system displays neighborhood boundaries as very distinct; (2) the system enables users to zoom in and show detailed areas in a neighborhood as stand-alone maps; (3) the disclosed system provides for display of transportation lines and stops even if such information is not always sitting on the top or visible layer of the map; (4) the disclosed system provides for a newsstand that is a 3D object that enables electronic access to local newspapers, flyers, and magazines, as well as provides links to websites associated with the creators of those electronic media; (5) the disclosed system provides a gift shop with specialty items and designed emails that users of the system can utilize to share information from the map with friends and family; (6) the disclosed system may display very light and subtle animations throughout the map to create atmosphere, such as a few scattered birds flying about, a carriage going down a street, a wave in a lake, a boat bobbing in the water, or a change in seasons or time of day.

The disclosed system in one embodiment further enhances the likelihood of a user exploring a neighborhood without having a particular destination in mind by providing access to a neighborhood history feature that includes voiceover video or series of pictures with sound, music and effects. In this embodiment, if a neighborhood includes historical buildings, the neighborhood history feature provides information about those buildings.

In the above discussion, it should be appreciated that the discussion of a "neighborhood" is used as exemplary only. In other embodiments, the disclosed map is displayed to be constrained to other geographic areas, such as districts, wards, communities, boroughs, and/or zip codes.

The disclosed system in various embodiments also provides access to a partners or specials page, in which non-competing businesses provide package deals to users of the disclosed system (such as a theater offering parking at a certain garage and dinner at a restaurant at a special price). In one embodiment, the disclosed system is configured to highlight these packaged deals for easy recognition by the user.

In one embodiment, the disclosed system provides games that can be played online or printed out, such as by providing instructions for a user to complete a treasure hunt either on the virtual map or in the real-world city represented by the virtual map.

In various embodiments, the disclosed system is configured to provide a two- or three-dimensional map that presents the user with necessary information with an emotional pull to entice people to feel and touch as they explore. In these embodiments, slowly adding features and advertisers entices users to repeatedly return to the disclosed system to see what is new. The disclosed system both (1) enables users to find whatever they are looking for in the easiest way possible and (2) provides users with an experience in which they are completely surprised and never know what to expect.

Figure 38:
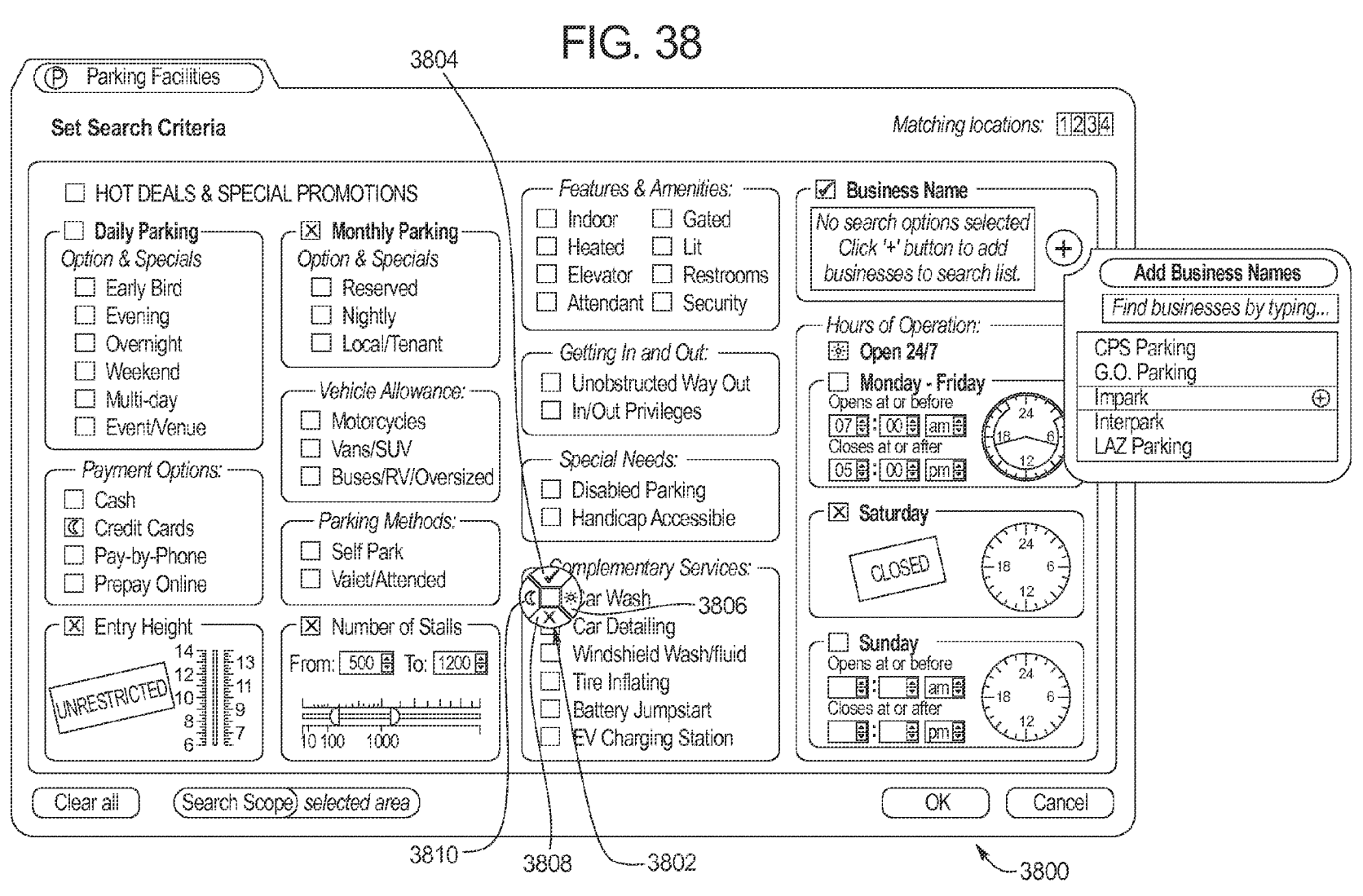

With regard to the filtering discussed at various points herein, a particular embodiment of that filtering can be understood with regard to FIG. 38. FIG. 38 illustrates an example embodiment of a "Filter" window 3800 layout for a "Parking Facilities" subcategory. In the embodiment of FIG. 38, the following restrictions on parking facility parameters has been set:

Discard locations with Entry Height Restrictions
Avoid facilities that take payments via credit cards
Discard locations that have Monthly parking option
Require locations that have number of stalls between 500 and 1200
Require parking facilities of specific company (about to be set to "Impark")
Require weekday working hours to be at least between 7 a.m. and 5 p.m.
Prefer 24/7 locations
Discard facilities that are open on Saturday
Search scope toggle set to "selected area" (that is search only within current neighborhood or user destination, if selected; otherwise—search the city).
Values of all other parameters are of no importance (i.e., they are not set)

The Illustration also shows an example of control 3802, which allows to set one of four search restrictions. Specifically, the control 3802 enables the user to select Require 3804, Prefer 3806, Discard 3808, or Avoid 3810. In the illustrated embodiment, the control 3802 can be displayed for each of the checkboxes on screen 3800, such that each input parameter can be Required, Preferred, Discarded, or Avoided. In one embodiment, control 3802 is displayed when user places mouse cursor over parameter check-box.

In sum, the system disclosed herein provides a substantial advantage over known map systems by enabling easier browsing and searching, by providing tools that facilitate efficient searching and comparison of search results, and by enabling users to memorialize the results of their interactions with the system through tools such as pins. The information grouping disclosed herein, such as by grouping map elements according to neighborhoods or categories, also presents a substantial advantage over known electronic map solutions.

The above description of is exemplary of the features of the system disclosed herein. As noted, the disclosed system could be used to sell any type of information to any type of purchaser of information, and is not limited to selling sales leads. Moreover, the functionality of the above-described system is not limited to the functionalities indicated herein. It should be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A computerized map display system comprising:
   at least one processor;
   at least one display device;
   at least one input device; and
   at least one memory device which stores a plurality of instructions which, when executed by the at least one processor, cause the at least one processor to operate with the at least one display device and the at least one input device to:
   generate a map environment, wherein generating the map environment includes:
      displaying a map display window, the map display window including a map;
      displaying a plurality of different virtual map tools, the plurality of different virtual map tools configured to provide map manipulation functions, wherein each of the plurality of different virtual map tools:

(i) is configured perform a map-related user task,
(ii) is displayed as a compact virtual gadget, and
(iii) is user-moveable around the map display window, and displaying a virtual tool drawer, the virtual tool drawer configured to display a storing of the plurality of different virtual map tools, wherein the virtual tool drawer is positioned along a border of the map display window, wherein the virtual tool drawer includes a tool compartment containing a plurality of tool-shaped slots, and wherein the virtual tool drawer further includes a control panel;

update the map environment based on at least one user input, wherein updating the map environment includes:
(a) storing a user selection of at least one from a plurality of categories, at least one of the plurality of categories including a plurality of subcategories,
(b) storing a user selection of at least one of the plurality of subcategories;
(c) receiving a user search string via at least one of the plurality of different virtual map tools;
(d) displaying at least one of the plurality of map elements that satisfies the user search string;
(e) determining at least one category or subcategory that is similar to but does not exactly match the user search string; and
(f) displaying at least one of the plurality of map elements having the determined similar category or subcategory that also satisfies the user search string.

2. The computerized map display system of claim 1, which uses fuzzy logic to determine the at least one category or subcategory that is similar to but does not exactly match the user search string.

3. The computerized map display system of claim 2, wherein the plurality of instructions, when executed by the at least one processor, cause the at least one processor to operate with the at least one input device to receive a user selection indicating how to determine similarity.

4. The computerized map display system of claim 1, wherein the plurality of virtual map tools includes at least one selected from the group consisting of a navigation tool and an explorer tool.

5. The computerized map display system of claim 1, wherein the plurality of virtual map tools each has an identical footprint.

6. A computerized map display system comprising:
at least one processor;
at least one display device;
at least one input device; and
at least one memory device storing a plurality of instructions which, when executed by the at least one processor, cause the at least one processor to operate with the at least one display device and the at least one input device to:
display a map display window, the map display window including a map;
display a plurality of different virtual map tools, the plurality of different virtual map tools configured to provide map manipulation functions, wherein each of the plurality of different virtual map tools:
(i) is configured perform a map-related user task,
(ii) is displayed as a compact-size virtual gadget, and
(iii) is moveable around the map display window; and
display a virtual tool drawer, the virtual tool drawer configured to display a storing of the plurality of different virtual map tools, wherein the virtual tool drawer is positioned along a border of the map display window, wherein the virtual tool drawer includes a tool compartment containing a plurality of tool-shaped slots, and wherein the virtual tool drawer further includes a control panel that includes:
(a) an open/close control, configured to open and close the tool compartment upon user selection thereof,
(b) an alignment control, configured to arrange the plurality of different virtual map tools along the border of the map display window upon user selection thereof, and
(c) a show/hide control, configured to toggle visibility of any of the plurality of tools on the map display window, upon user selection thereof.

7. The computerized map display system of claim 6, wherein at least one of the plurality of different virtual map tools includes an expand/restore toggle, the expand/restore toggle configured to enable a user to:
selectively expand a size of a selected virtual map tool and reduce a size of at least one unselected virtual map tool, and
restore the plurality of different virtual map tools to the same size.

8. The computerized map display system of claim 6, wherein the plurality of different virtual map tools includes at least one selected from the group consisting of:
a navigator tool, configured to enable a user to:
move around the map,
identify cities, buildings, streets, intersections, businesses, and/or organizations by name and/or address,
identify local geographic area boundaries, and
navigate to a selected area;
an explorer tool, configured to enable the user to:
input a search criteria, and
display, on the map, locations corresponding to the search criteria;
a magnifier tool, configured to enable the user to:
place the magnifier tool at a specific location on the map, and
display, on the map, a mini-map that represents a zoomed view of the specific location;
a planner tool, configured to enable the user to:
perform distance measurement and optimal route planning;
a communicator tool, configured to enable the user to:
print, e-mail, and/or save images of the map,
publish said images on web sites and social media networks, and
share a live-view of the map with another user;
an organizer tool, configured to enable the user to:
save a plurality of customized maps for subsequent use, and
organize the plurality of customized maps according to user needs;
a news tool, the news tool configured to:
provide links to local media, and
enable the user to search and browse city news, events, local promotions and advertisements, and neighborhood guides; and
an analyst tool, configured to enable the user to:
receive population data, crime level data, average household income data, and other statistical data, as dictated by geographic area.

9. The computerized map display system of claim 8, wherein the navigator tool includes a plurality of control blocks including:
an altitude control block, configured to alter a viewing altitude of the map, wherein the altitude control block includes a graduated scale that indicates a perceived altitude above ground and a plurality of altitude ranges;

a navigation path block, configured to generate a user navigation path, the user navigation path formed by recording each change of position and/or viewing altitude of the map;

a map objects locating block, configured to:
 locate a selected object from a plurality of objects, by address and/or name of the selected object, and navigate to a location of the selected object;

a user tracking block, configured to track a GPS location of the user on the map;

a territory breakdown block, configured to:
 identify a selected boundary area defined by a boundary of a local geographic area, including city neighborhoods, districts, wards, communities, boroughs, and zip codes, and
 navigate to the selected boundary area; and a user destination control block, configured to:
 manage user-selected destinations, and
 navigate to user-selected destinations.

10. The computerized map display system of claim 8, wherein the explorer tool is further configured to use the search criteria to conduct a category-based search of business locations,
 wherein business locations are divided into a plurality of top-level categories,
 wherein each of the plurality of top-level categories includes a plurality of subcategories,
 wherein the user can search for specific types of business locations by selecting at least one of the plurality of top-level categories and at least one of the plurality of subcategories associated with said at least one of the plurality of top-level categories, and
 wherein business locations associated with a particular top-level category are displayed, on the map, via a plurality of markers having a color associated with the top-level category.

11. The computerized map display system of claim 10, wherein the explorer tool is further configured to use the search criteria to conduct a keyword-based search of business locations,
 wherein search keywords are used to generate a set of potential subcategories, and
 wherein the user may choose a selected subcategory from the set of potential subcategories.

12. The computerized map display system of claim 10, wherein the search criteria includes both a plurality of strict constraints and a plurality of fuzzy constraints, wherein the system is configured to conduct a search of business locations that satisfy all of the plurality of strict constraints and at least one of the plurality of fuzzy constraints,
 wherein the plurality of strict constraints include at least one of:
  a require-strict constraint, the require-strict constraint configured to narrow search results to a plurality of locations that match a specified attribute, and
  a discard-strict constraint, the discard-strict constraint configured to remove, from search results, the plurality of locations that match the specified attribute, and
 wherein the plurality of fuzzy constraints include at least one of:
  a prefer-loose constraint, the prefer-loose constraint configured to prioritize relevance of the plurality of locations that match the specified attribute, and
  an avoid-loose constraint, the avoid-loose constraint configured to deprioritize relevance of the plurality of locations that match the specified attribute.

13. The computerized map display system of claim 12, wherein the plurality of markers include a plurality of graphical tags, wherein each of the plurality of graphical tags indicate relevance of the plurality of locations, and wherein relevance is identified by a shape.

14. The computerized map display system of claim 10, wherein search results are indicated on the map via a plurality of interactive location markers,
 wherein each interactive location marker is associated with a commercial advertisement having an advertisement type and an advertisement content,
 wherein the advertisement type is ordered by significance, the significance related to an advertisement cost, and
 wherein the advertisement content is displayed in a pop-up window upon user interaction with each interactive location marker.

15. The computerized map display system of claim 14, wherein the advertisement type is visually identifiable by a shape of the interactive location marker, wherein the advertisement type dictates the size and layout of the pop-up window, and wherein the advertisement type sets a maximum altitude at which the interactive location marker remains visible on the map.

16. The computerized map display system of claim 14, wherein the pop-up window is configured to operate in normal mode and compare mode,
 wherein normal mode enables the user to select one interactive location marker and view the interactive location marker's advertisement content in a single pop-up window, and
 wherein compare mode enables the user to select several interactive location markers and display a comparison of the several interactive location markers' advertisement content in a scrollable stack of pop-up windows.

17. The computerized map display system of claim 14, wherein a group of interactive location markers is shown on the map as a single interactive marker, the group of markers comprising at least two overlapping interactive location markers within a same subcategory,
 wherein a shape of the single interactive marker is dictated by a most significant advertisement type from the at least two overlapping interactive location markers, and
 wherein user interaction with the single interactive marker causes the system to display the magnifier tool, wherein the magnifier tool is configured to display the mini-map that represents the zoomed version of the map enabling the user to see the at least two overlapping interactive location markers, hidden under the single interactive marker, as stand alone markers.

18. The computerized map display system of claim 8, wherein the explorer tool includes a search/edit mode and a clean/review mode,
 wherein the search/edit mode enables the user to:
  create a plurality of search layers, the plurality of search layers configured to identify a plurality of location markers associated with at least one of a plurality of location subcategories, wherein the plurality of search layers are graphically depicted as tab-shaped labels along the border of the map display window, form search criteria by setting constraints over the plurality of location subcategories, such that the system plots search layers that satisfy the constraints, and select pertinent locations, from the plotted search layers, by pinning the pertinent locations to the map, wherein the location marker of a pertinent location is replaced by an icon related to an associated location subcategory, wherein the clean/review mode enables the user to create custom map views that include pertinent locations, and wherein the user may switch between the search/edit mode and the clean/review mode at any time without informational loss.

19. The computerized map display system of claim 18, wherein during the search/edit mode, the explorer tool includes:

a search layer creation block, configured to create a search layer by selecting a location subcategory from a plurality of location subcategories by either:

direct subcategory selection, or indirect subcategory selection based on user-entered search keywords;

a search criteria setting block, configured to set constraints over the selected location subcategory, a search results mapping block, configured to toggle visibility of:

locations associated with other search layers, indicated on the map by semi-transparent markers, locations previously discarded for not satisfying search criteria, indicated on the map by crossed markers, and locations outside a local geographical territory or a user-selected destination area, and a search results listing block, configured to display a list of selected search layers plotted on the map.

* * * * *